Aug. 2, 1938.　　　C. W. GREEN　　　2,125,438

CASH REGISTER

Original Filed March 27, 1931　　38 Sheets-Sheet 1

Inventor
Charles W. Green
By
His Attorney

Aug. 2, 1938.  C. W. GREEN  2,125,438
CASH REGISTER
Original Filed March 27, 1931    38 Sheets-Sheet 2

Inventor
Charles W. Green
By *Carl Beust*
His Attorney

Aug. 2, 1938.　　　　C. W. GREEN　　　　2,125,438
CASH REGISTER
Original Filed March 27, 1931　　38 Sheets-Sheet 6

Inventor
Charles W. Green
By
Carl Benst
His Attorney

Aug. 2, 1938. C. W. GREEN 2,125,438
CASH REGISTER
Original Filed March 27, 1931 38 Sheets-Sheet 7
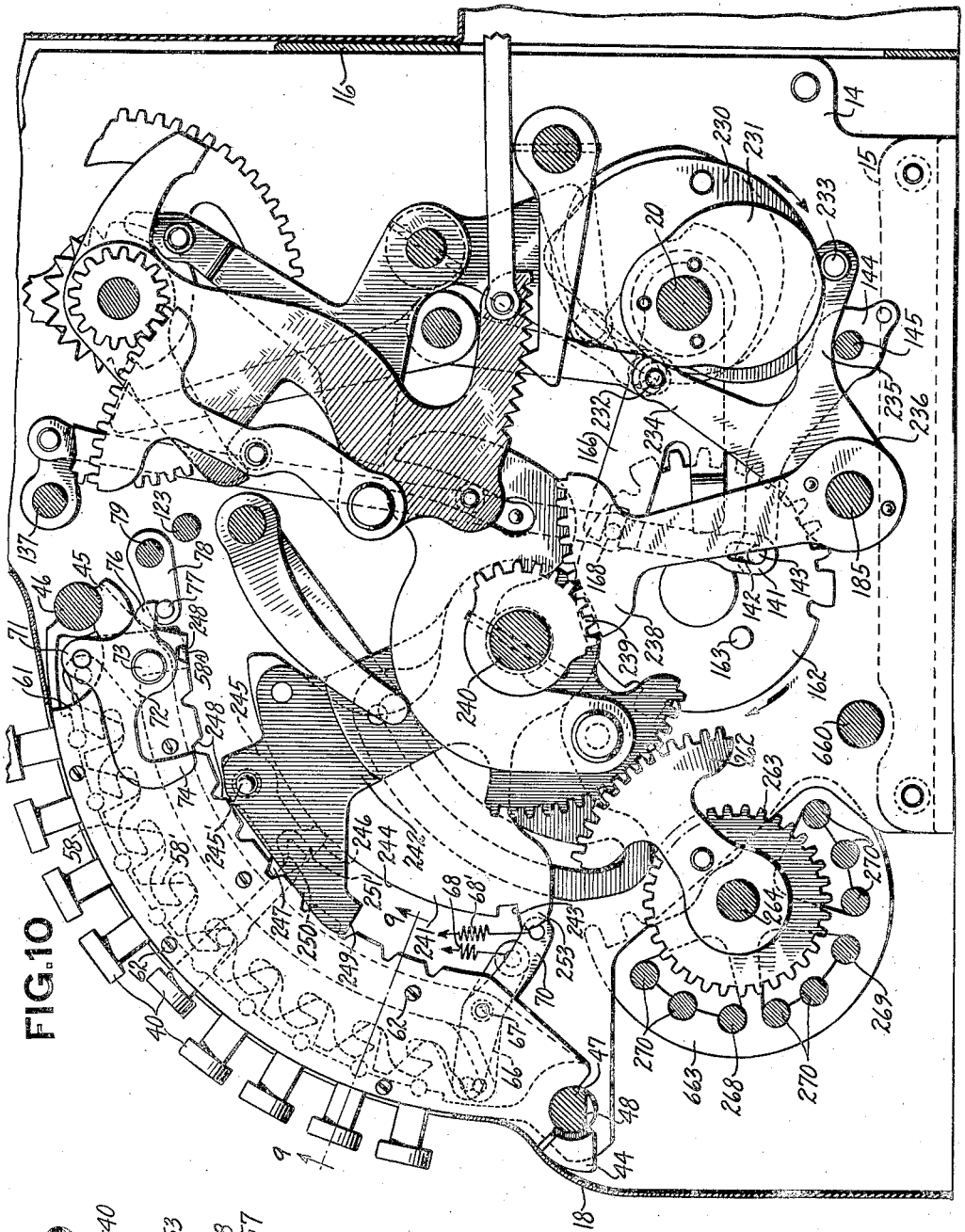
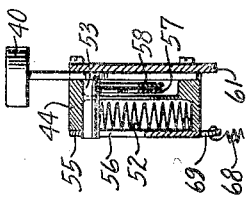
Inventor
Charles W. Green
By
His Attorney

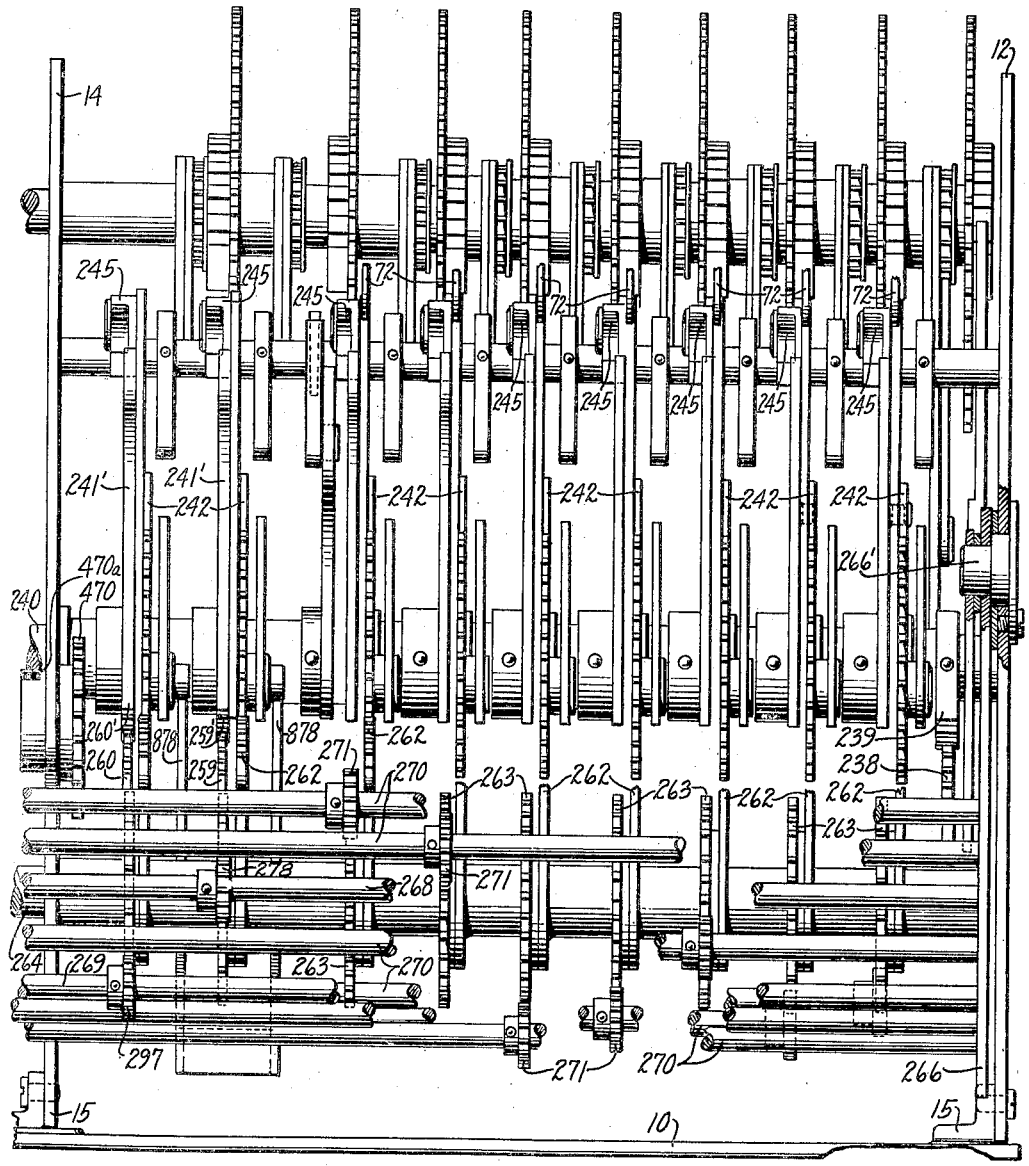

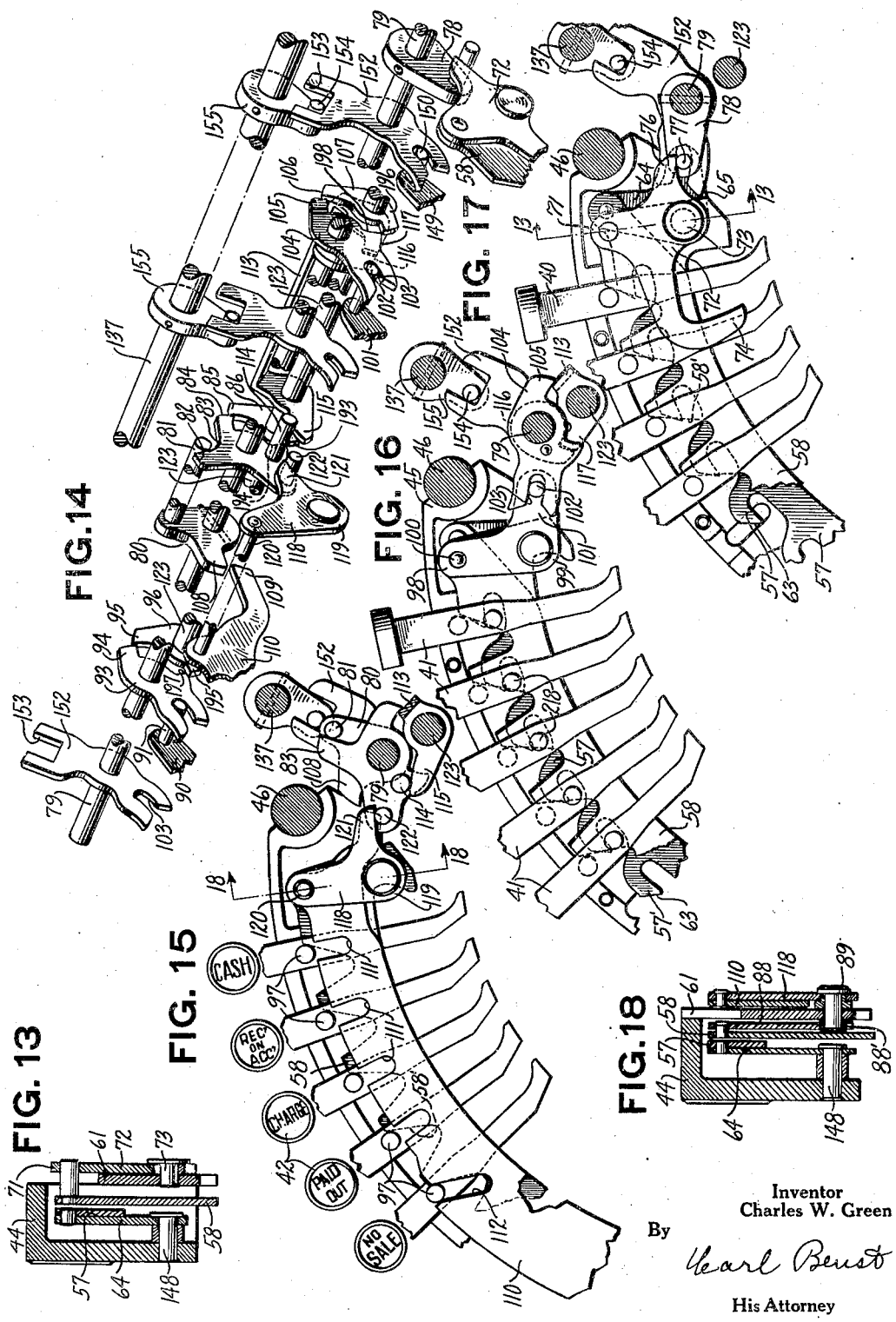

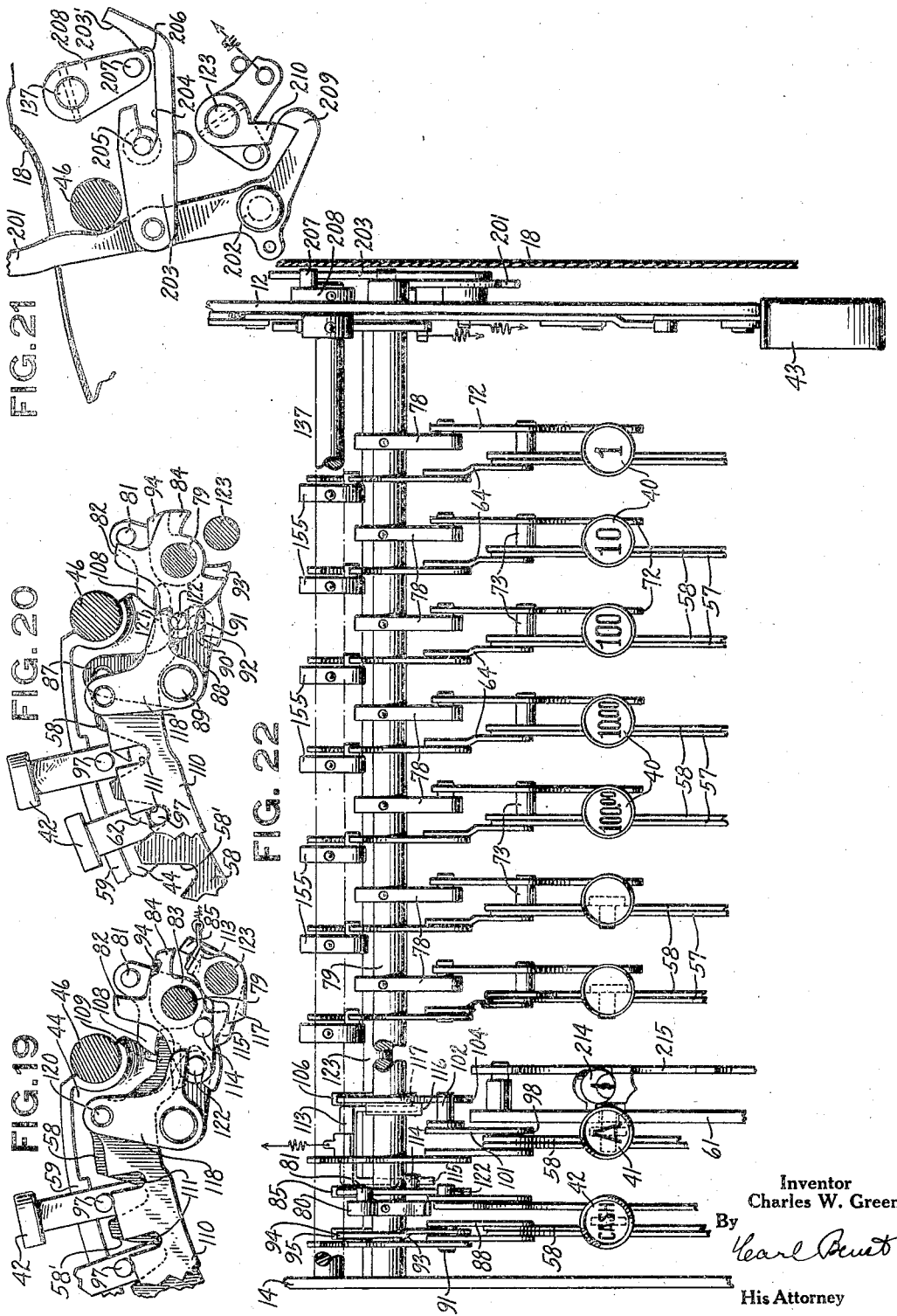

Aug. 2, 1938.   C. W. GREEN   2,125,438
CASH REGISTER
Original Filed March 27, 1931   38 Sheets-Sheet 12
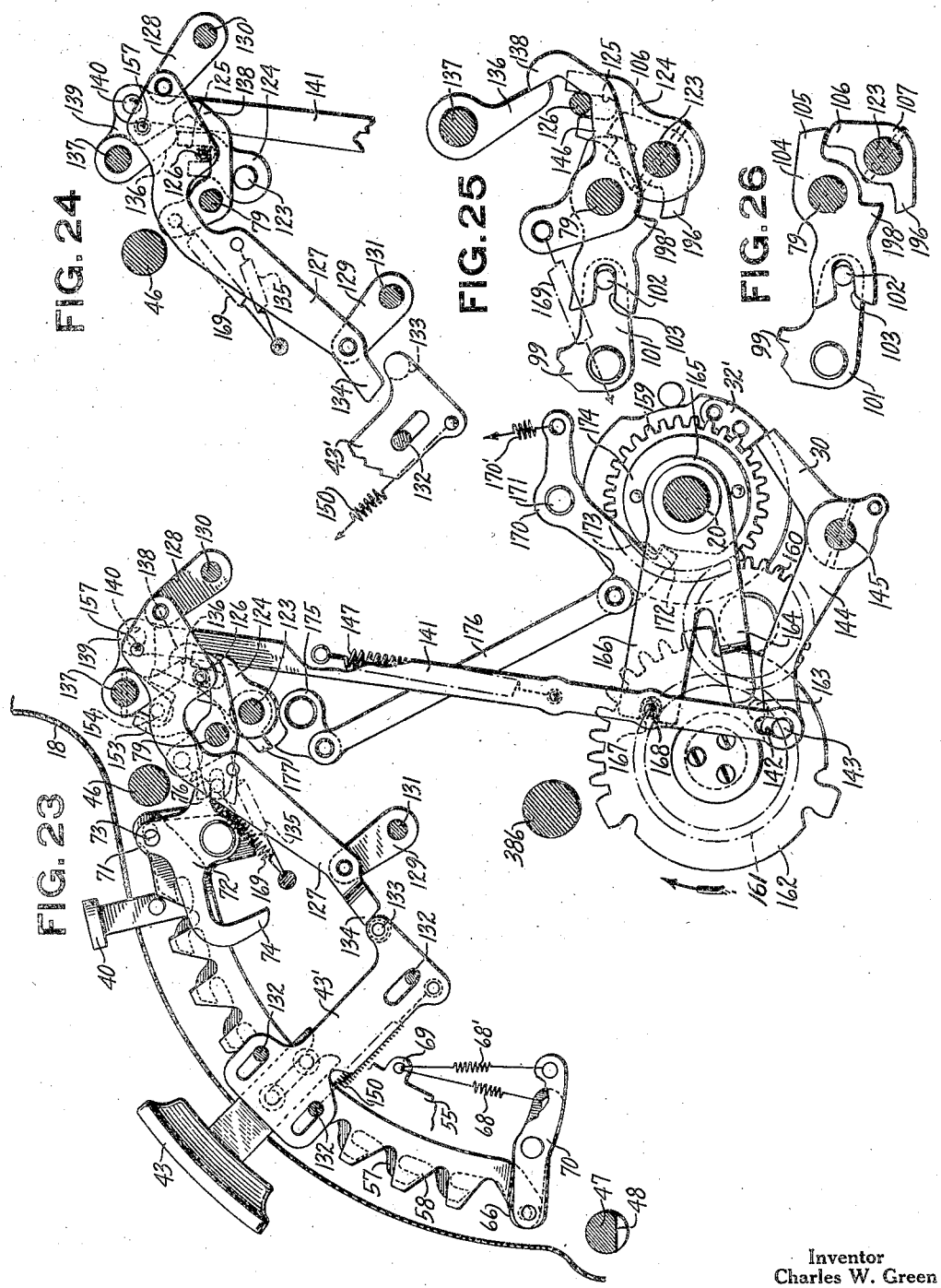
Inventor
Charles W. Green
By Earl Beust
His Attorney

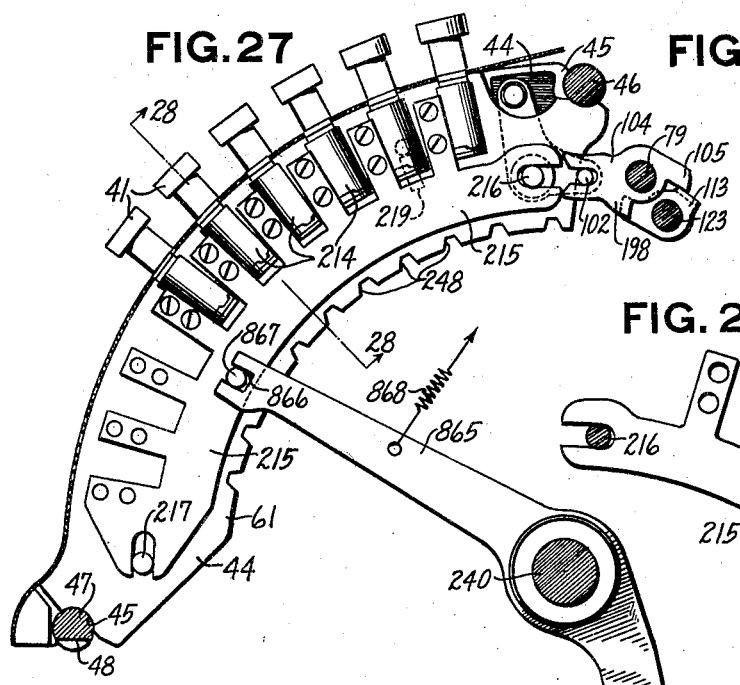
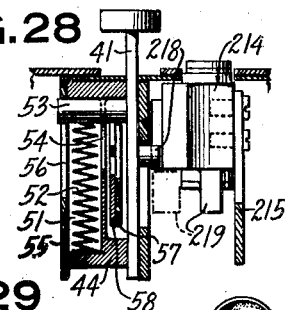
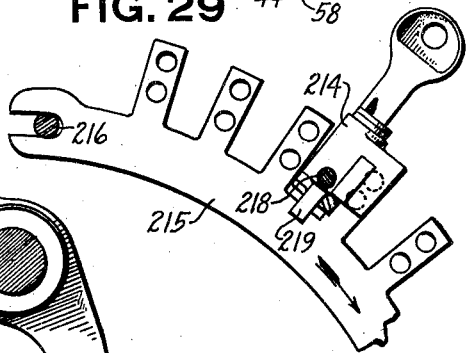
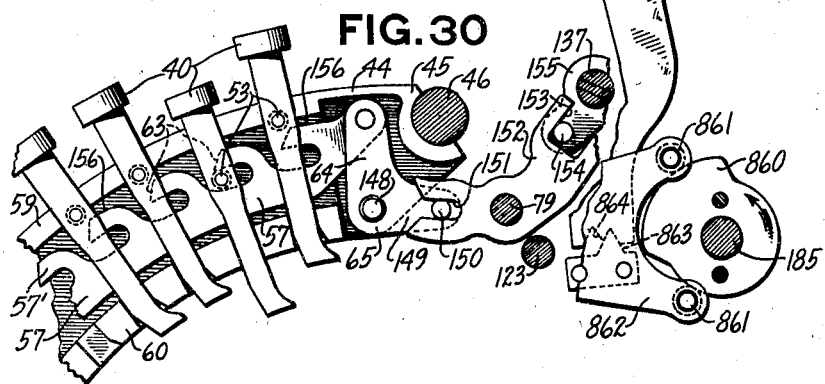
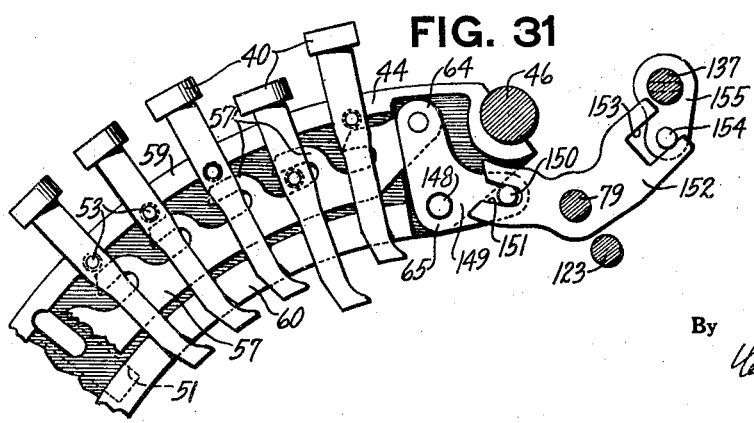

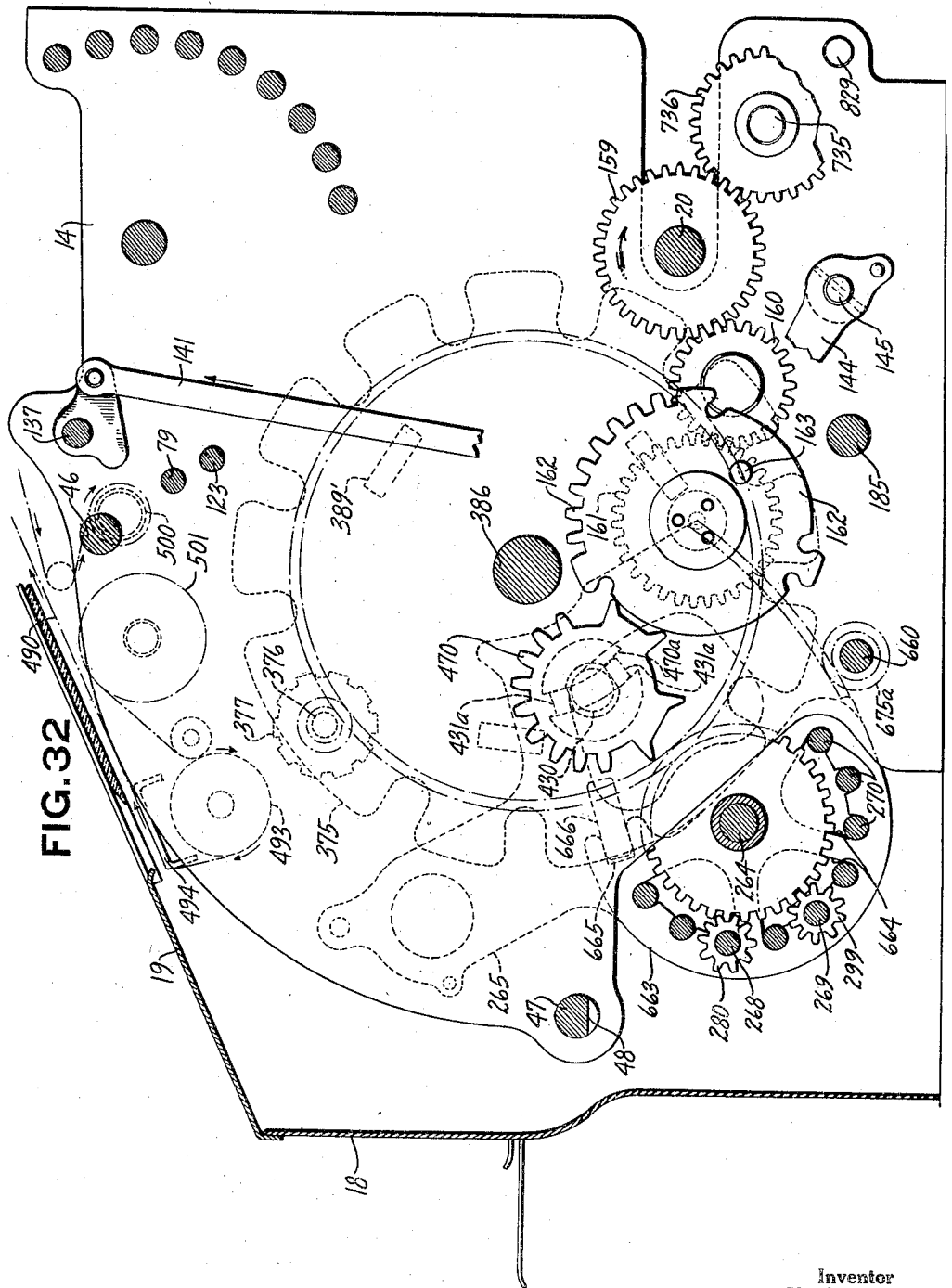

Aug. 2, 1938.   C. W. GREEN   2,125,438
CASH REGISTER
Original Filed March 27, 1931   38 Sheets-Sheet 15
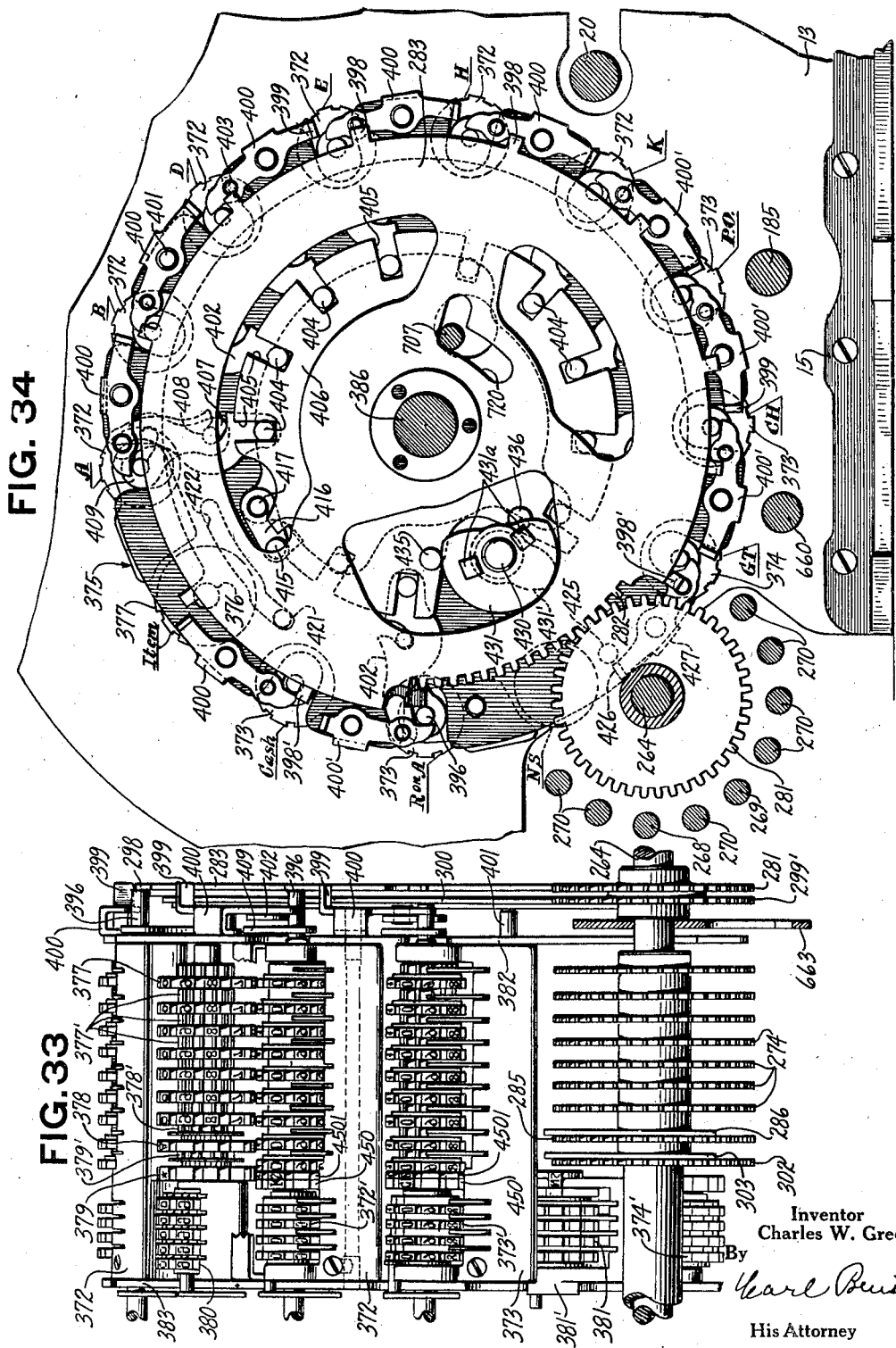
Inventor
Charles W. Green
By
His Attorney

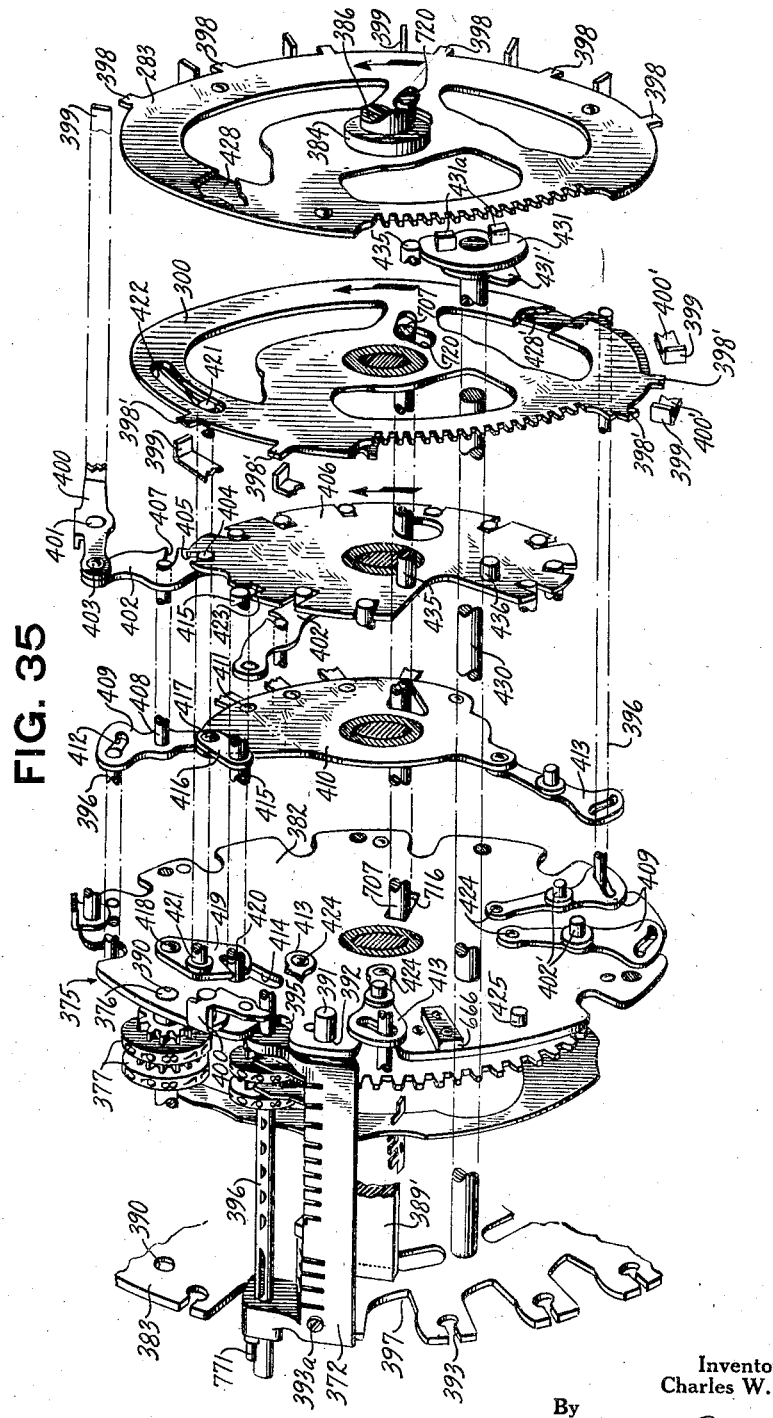

Aug. 2, 1938.  C. W. GREEN  2,125,438
CASH REGISTER
Original Filed March 27, 1931   38 Sheets-Sheet 17
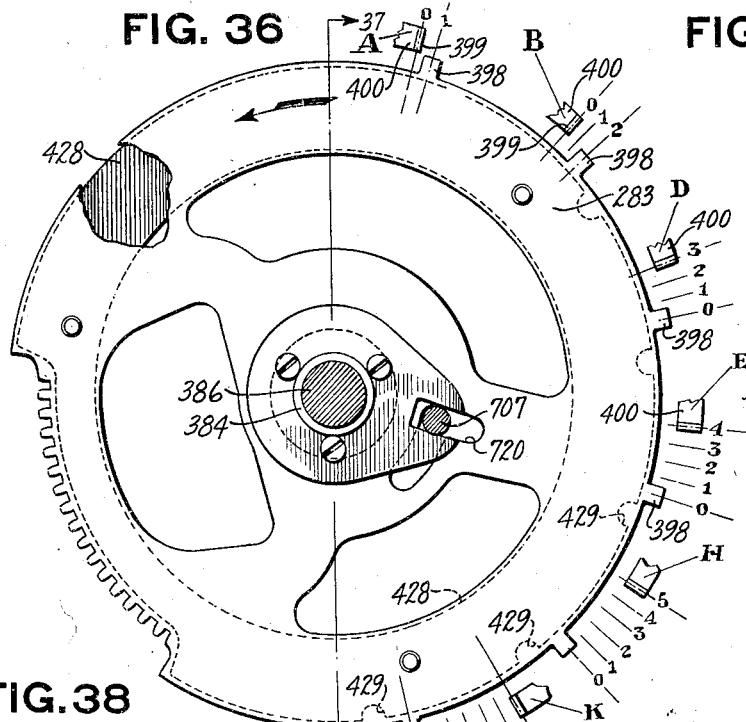
FIG. 36
FIG. 37
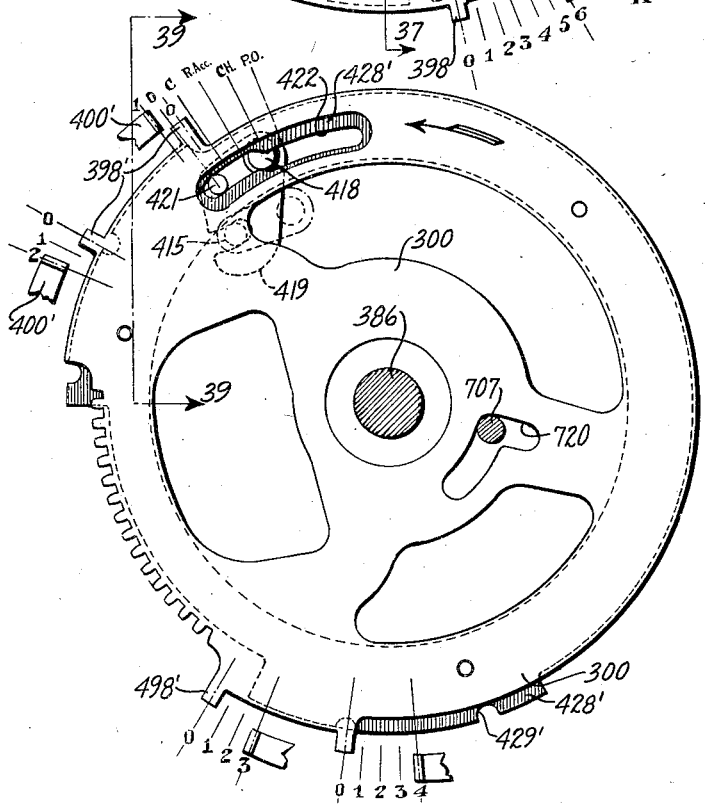
FIG. 38
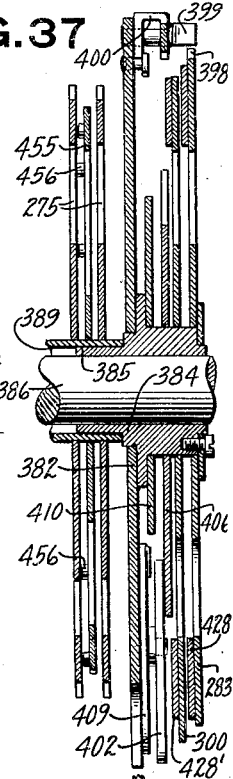
FIG. 39
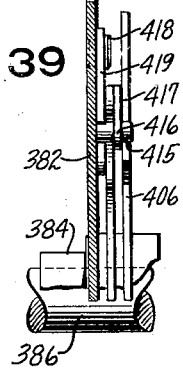
Inventor
Charles W. Green
By Carl Benst
His Attorney Aug. 2, 1938.  C. W. GREEN  2,125,438
CASH REGISTER
Original Filed March 27, 1931  38 Sheets—Sheet 18
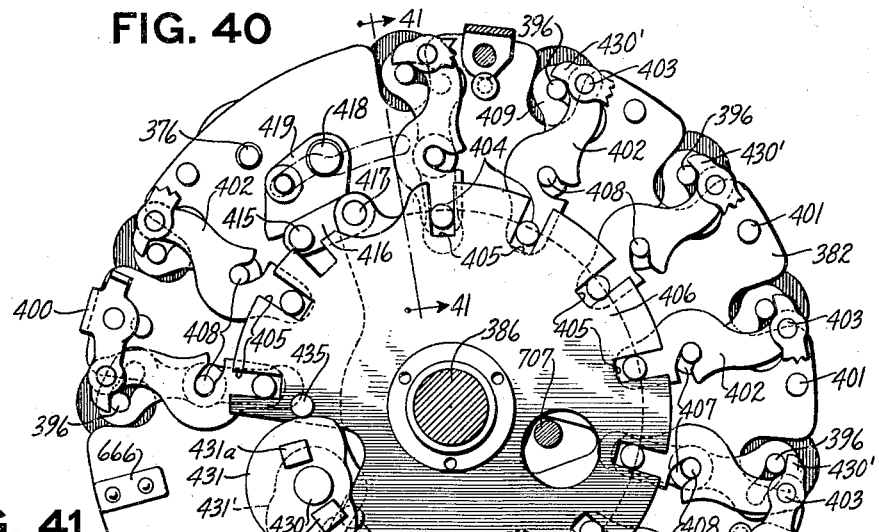
FIG. 40
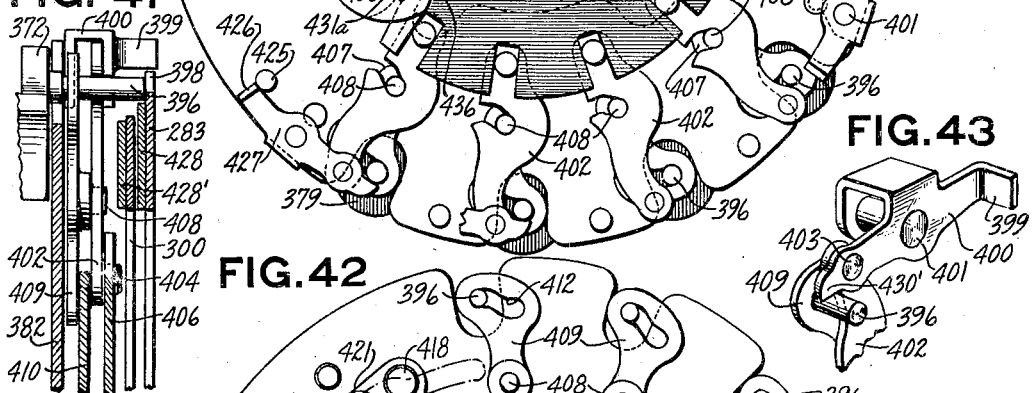
FIG. 41
FIG. 43
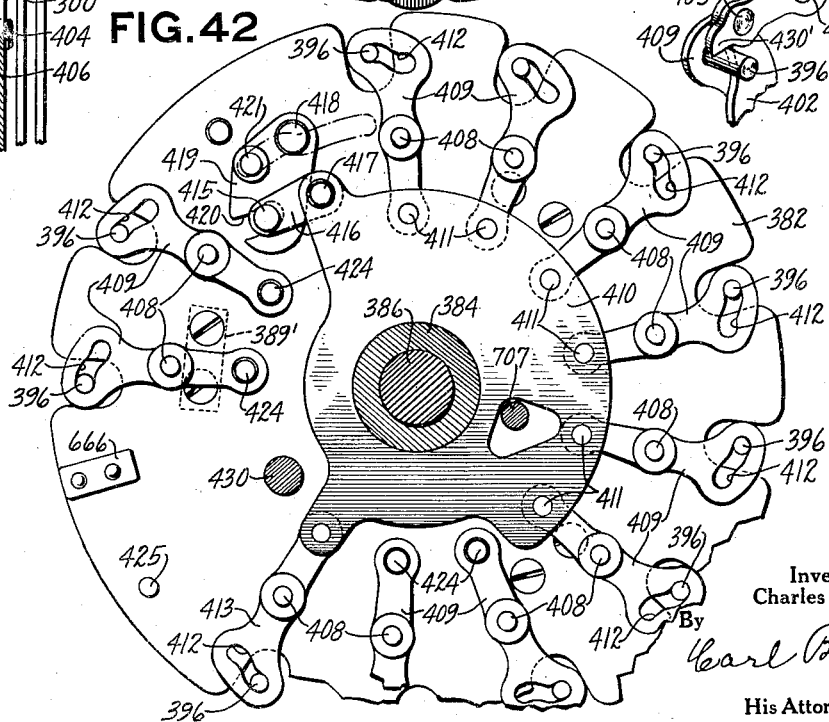
FIG. 42
Inventor
Charles W. Green
By Carl Beust
His Attorney Aug. 2, 1938.  C. W. GREEN  2,125,438
CASH REGISTER
Original Filed March 27, 1931   38 Sheets-Sheet 19
FIG. 44
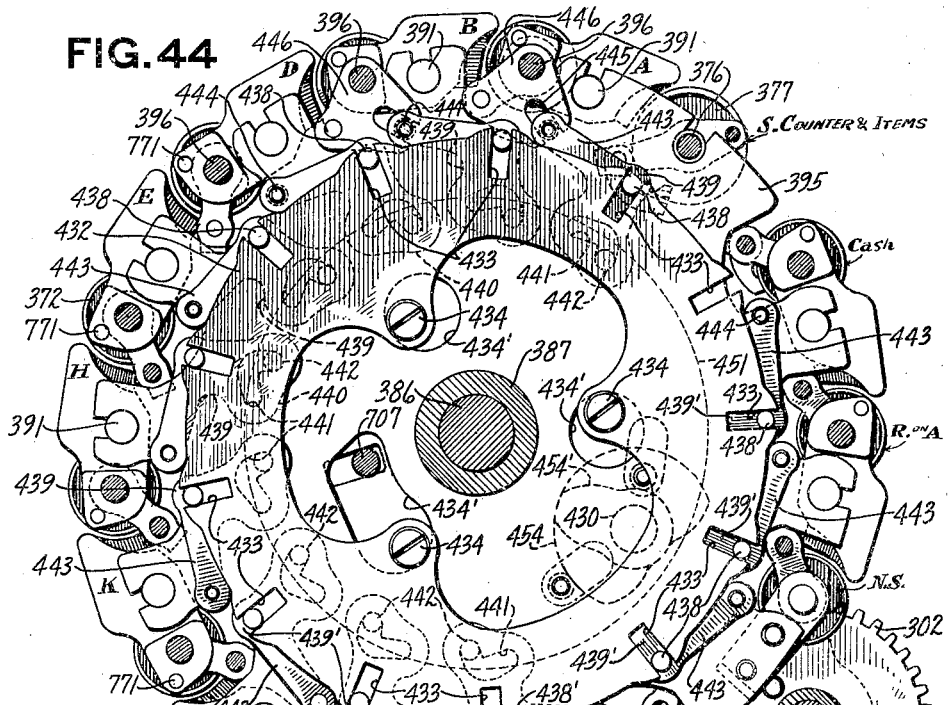
FIG. 45
FIG. 46
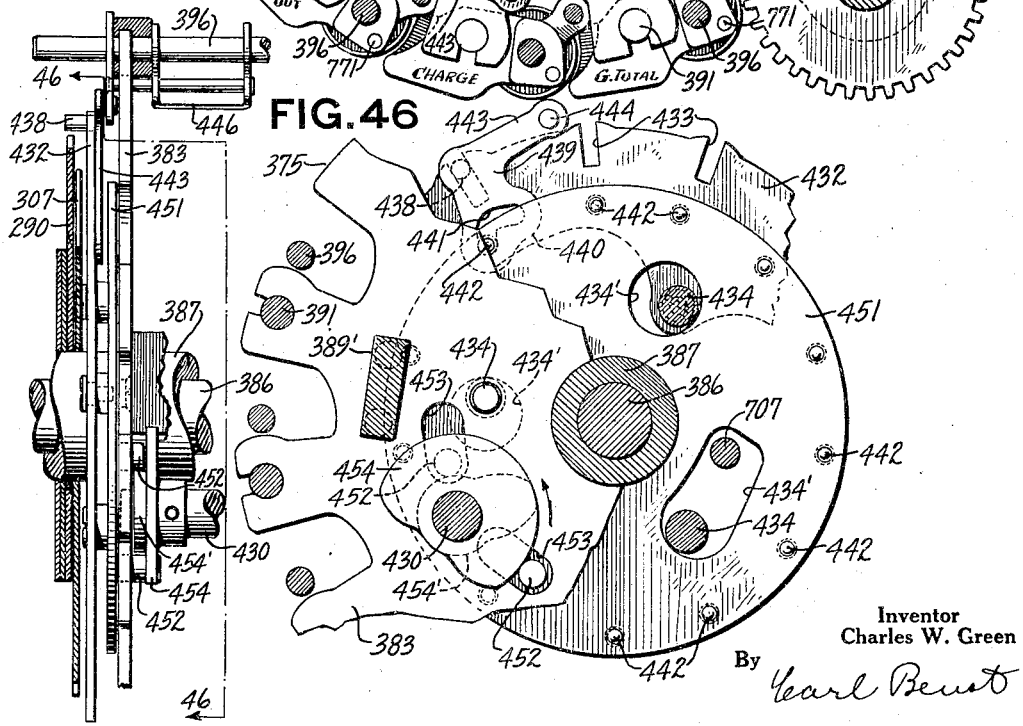
Inventor
Charles W. Green
By Earl Beust
His Attorney Aug. 2, 1938.  C. W. GREEN  2,125,438
CASH REGISTER
Original Filed March 27, 1931   38 Sheets-Sheet 20
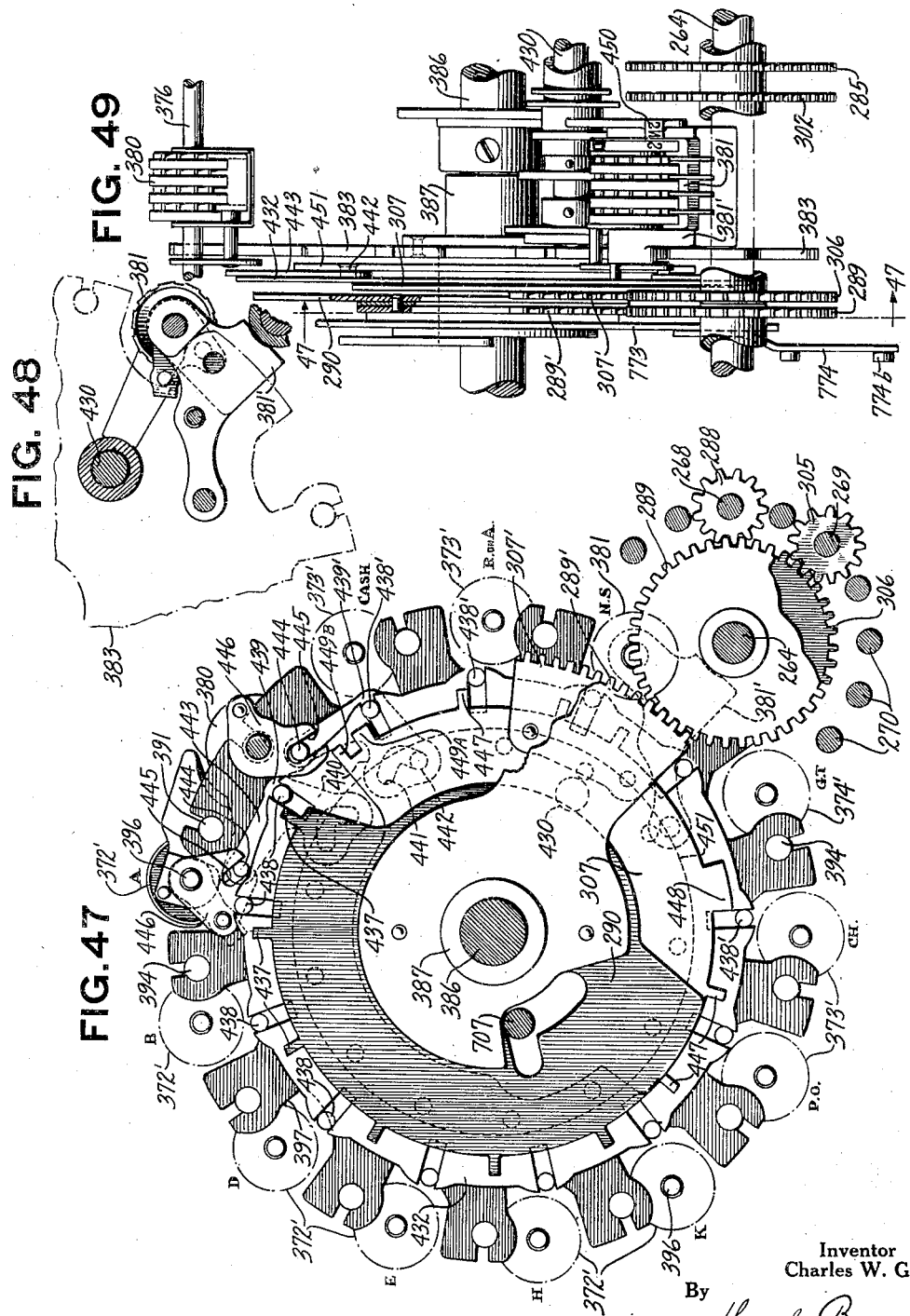
Inventor
Charles W. Green
By Carl Bernst
His Attorney Aug. 2, 1938.  C. W. GREEN  2,125,438
CASH REGISTER
Original Filed March 27, 1931   38 Sheets-Sheet 21
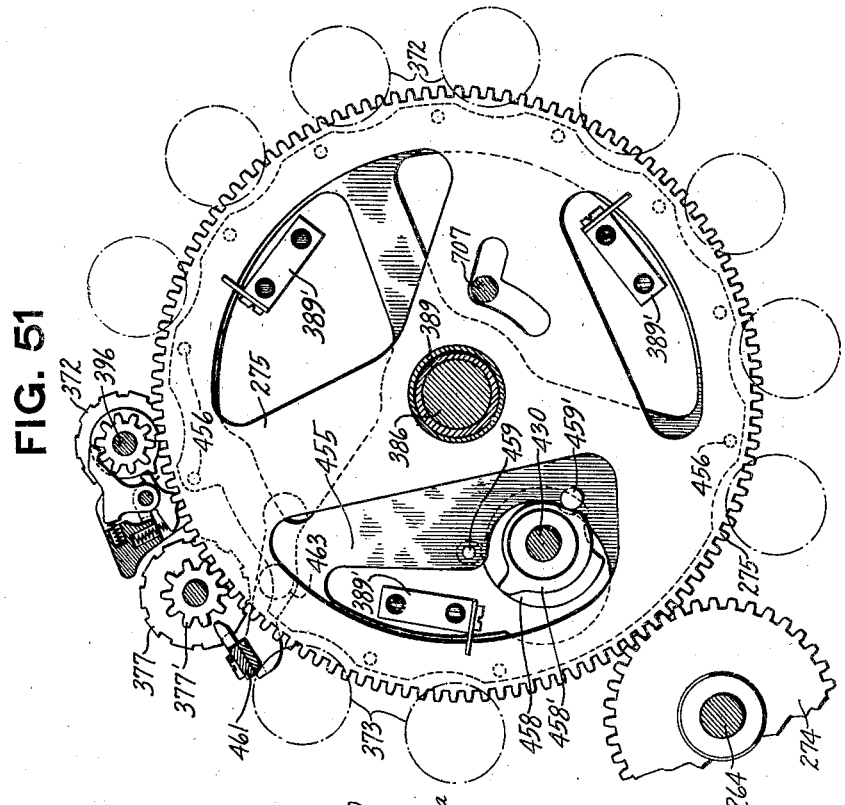
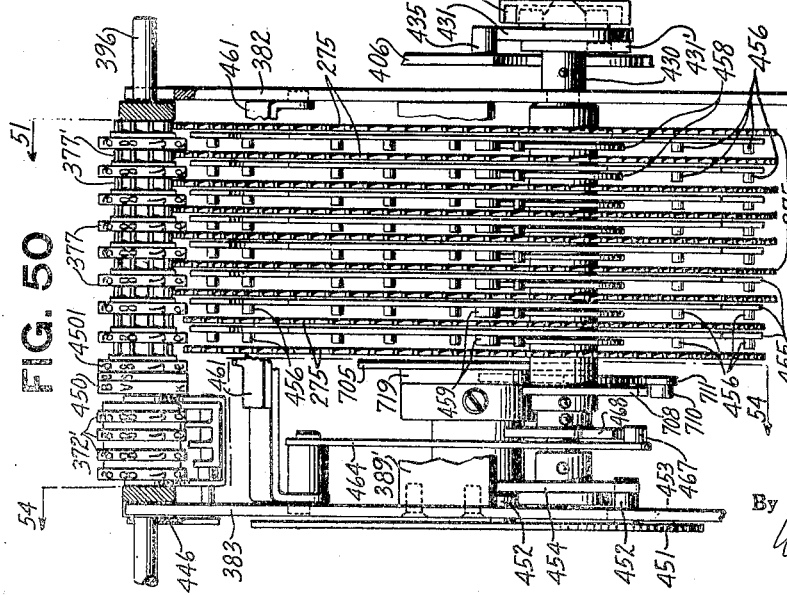
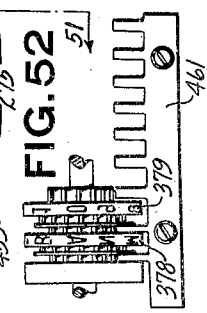
Inventor
Charles W. Green
By
His Attorney

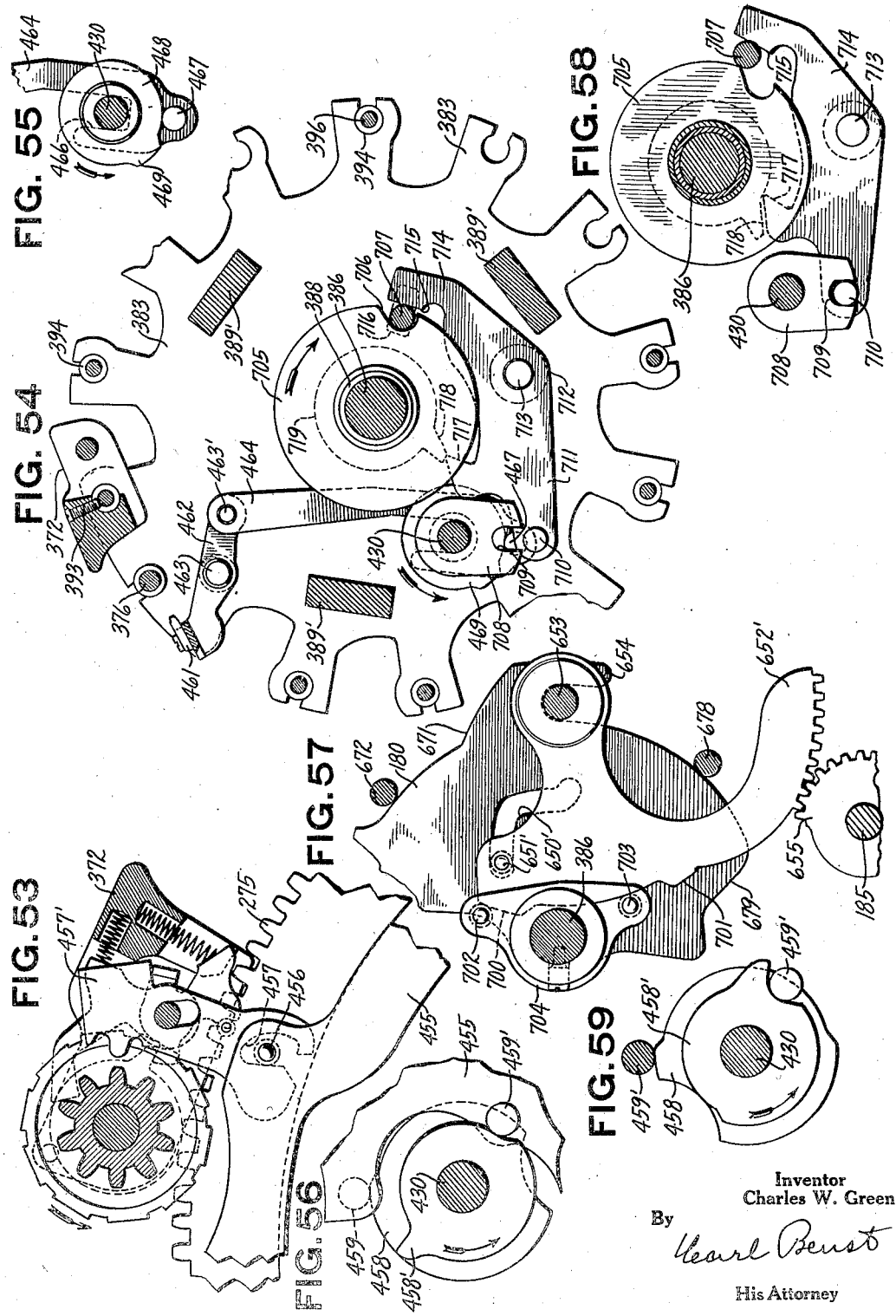

Aug. 2, 1938.  C. W. GREEN  2,125,438
CASH REGISTER
Original Filed March 27, 1931  38 Sheets-Sheet 23
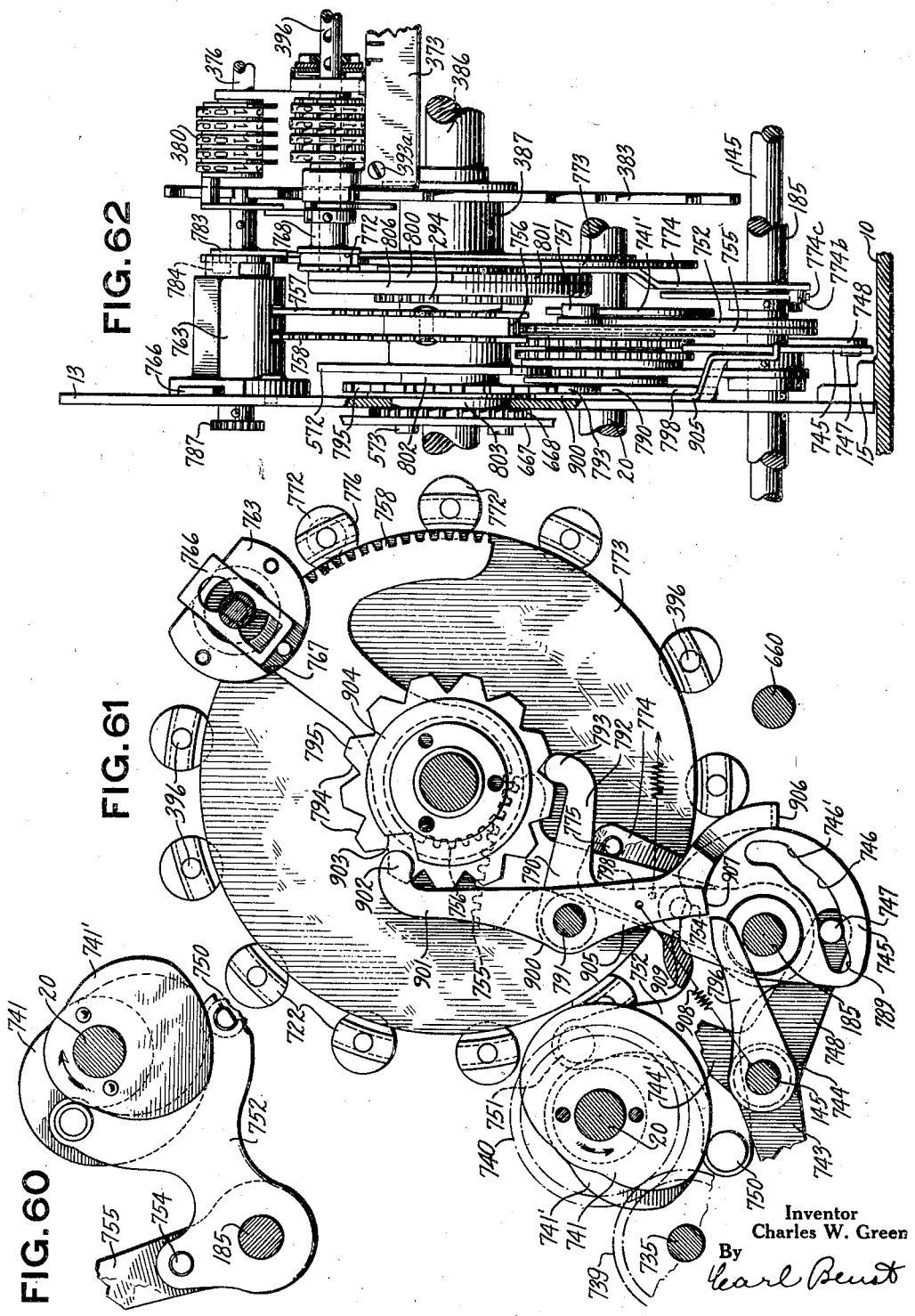
Inventor
Charles W. Green
By Carl Benst
His Attorney

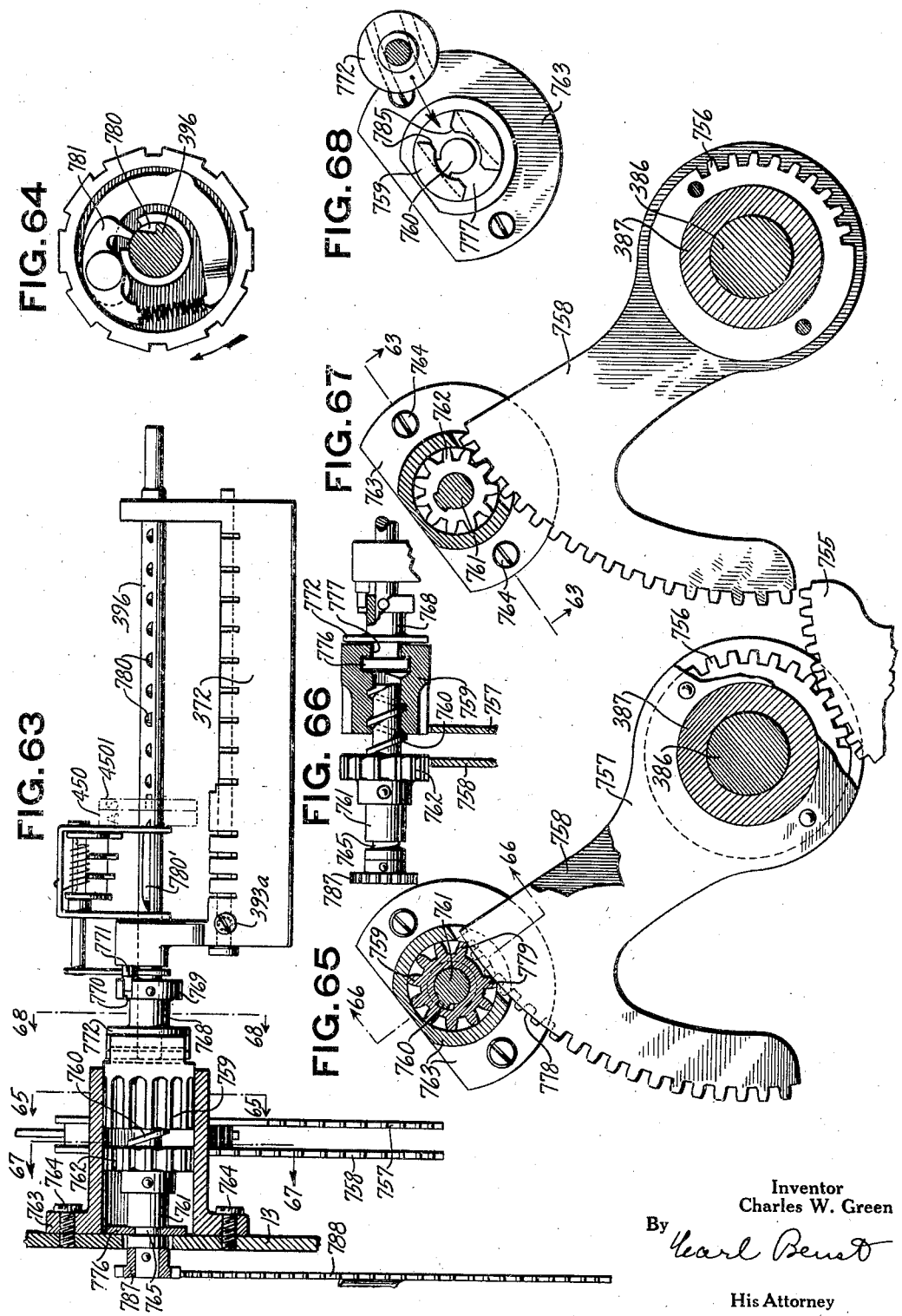

Aug. 2, 1938.  C. W. GREEN  2,125,438
CASH REGISTER
Original Filed March 27, 1931   38 Sheets-Sheet 25
FIG. 69
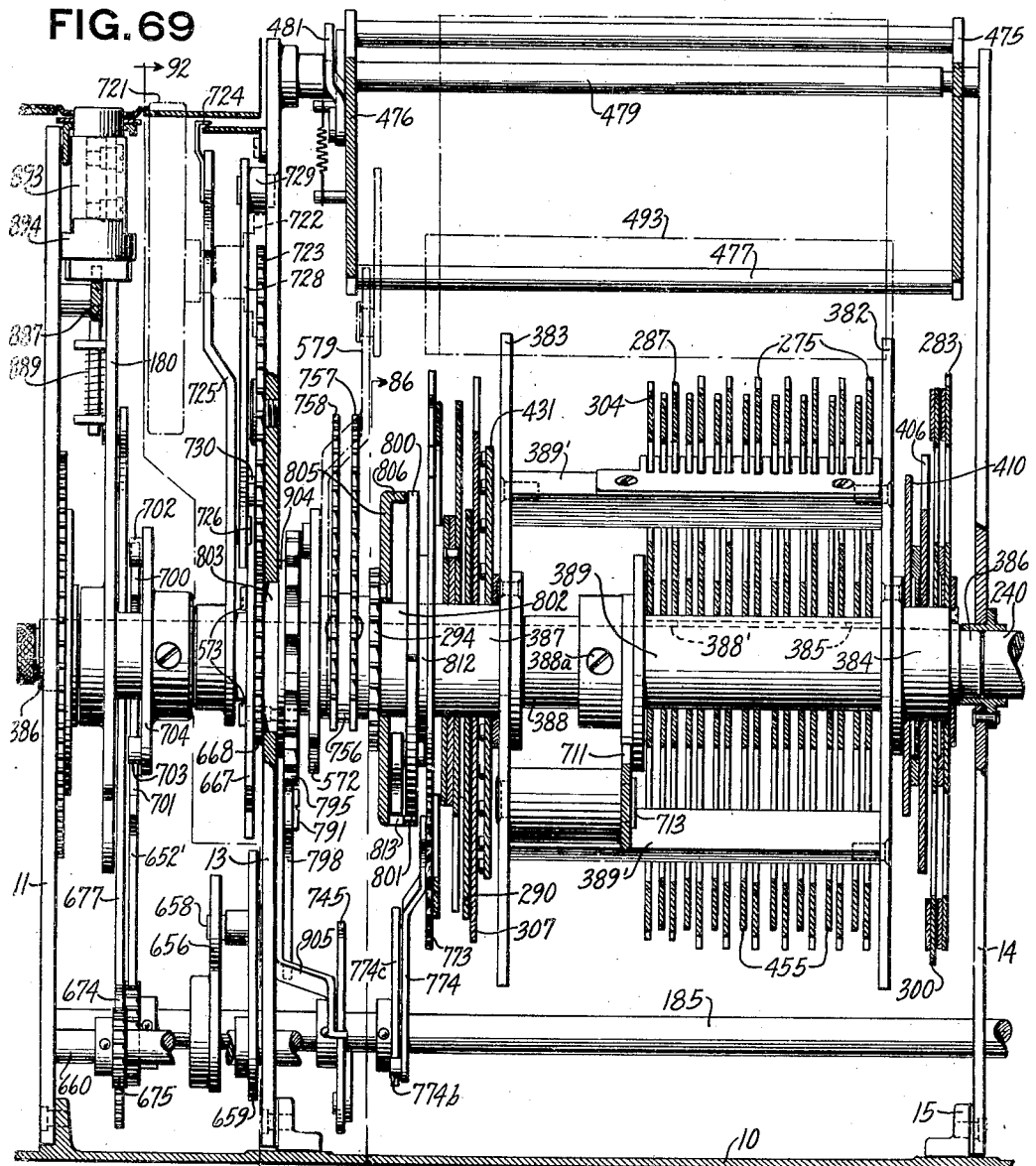
FIG. 70
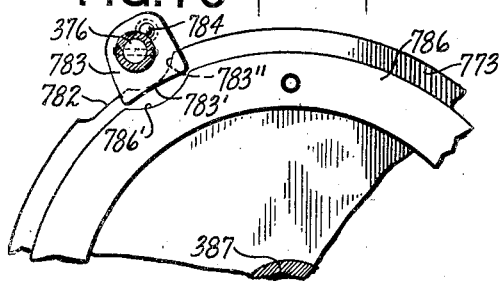
FIG. 71
Inventor
Charles W. Green
By *Earl Beust*
His Attorney Aug. 2, 1938.  C. W. GREEN  2,125,438
CASH REGISTER
Original Filed March 27, 1931  38 Sheets-Sheet 26
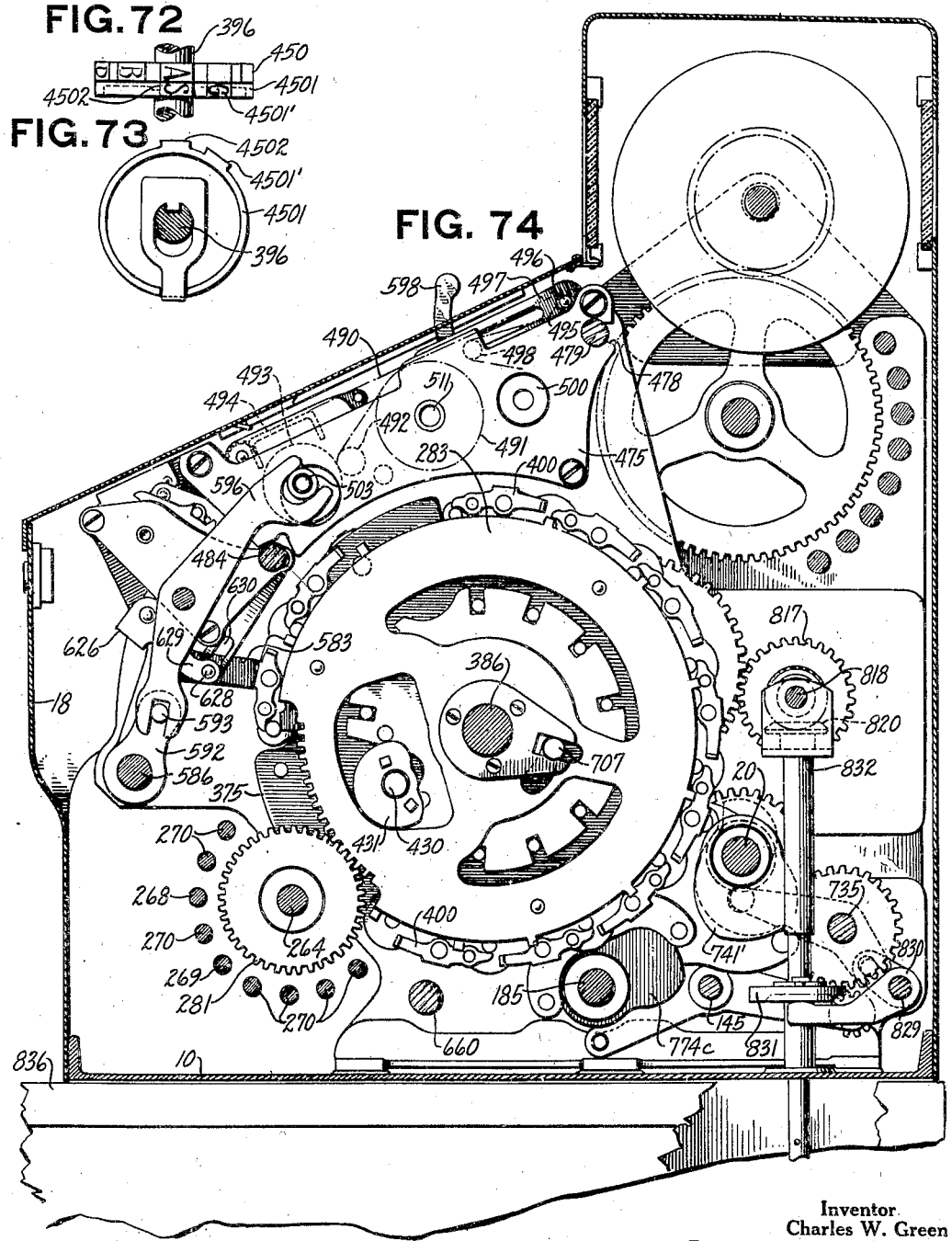
Inventor
Charles W. Green
By
Pearl Benst
His Attorney

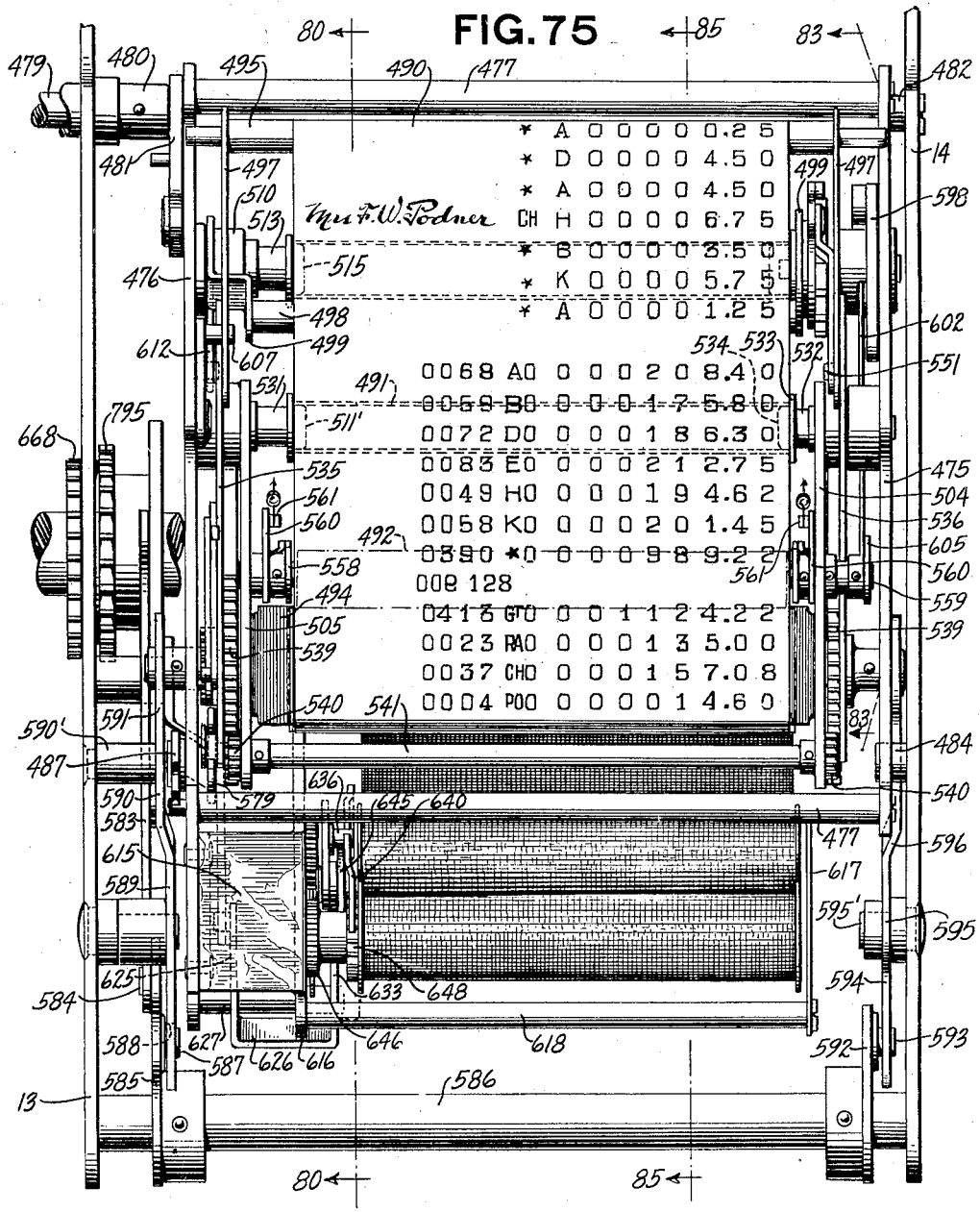

Aug. 2, 1938. C. W. GREEN 2,125,438
CASH REGISTER
Original Filed March 27, 1931 38 Sheets-Sheet 28
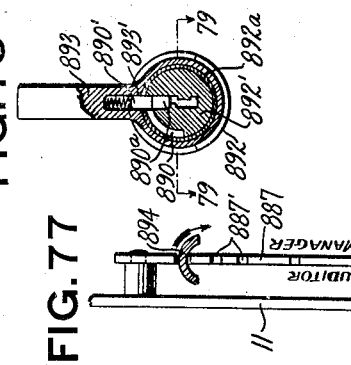
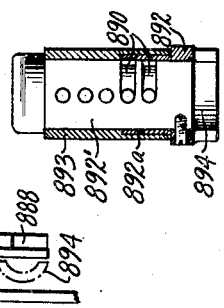
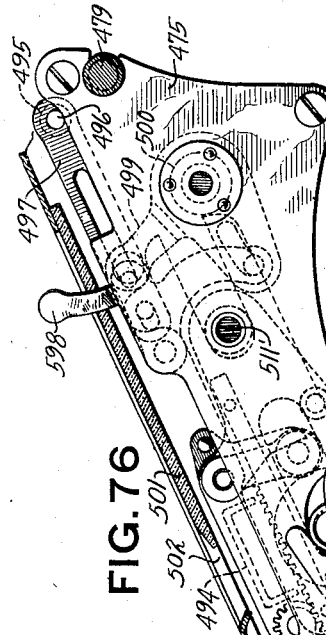
Inventor
Charles W. Green
By Carl Bent
His Attorney Aug. 2, 1938.　　　　C. W. GREEN　　　　2,125,438
CASH REGISTER
Original Filed March 27, 1931　　38 Sheets-Sheet 29

Inventor
Charles W. Green
By Earl Benst
His Attorney

Aug. 2, 1938.　　　　C. W. GREEN　　　　2,125,438
CASH REGISTER
Original Filed March 27, 1931　　38 Sheets-Sheet 30
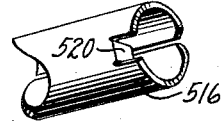
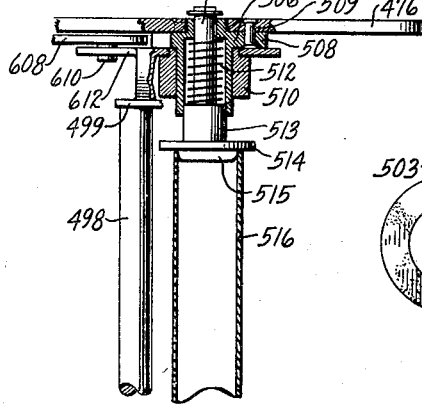
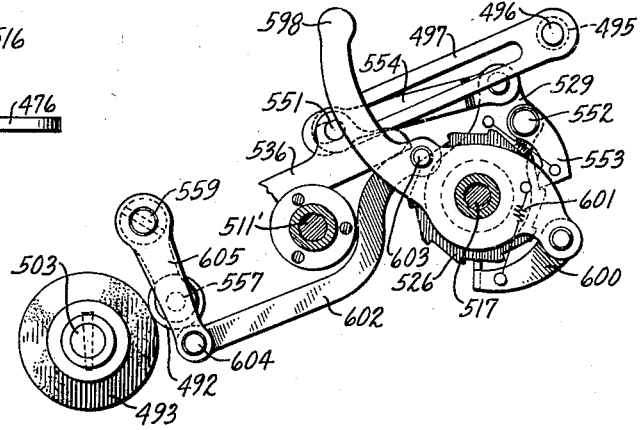
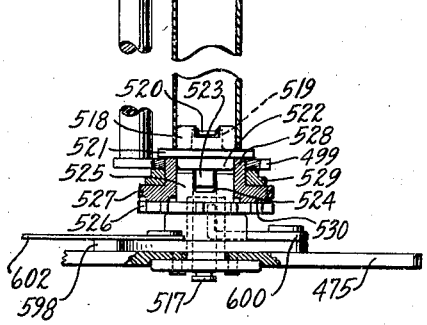
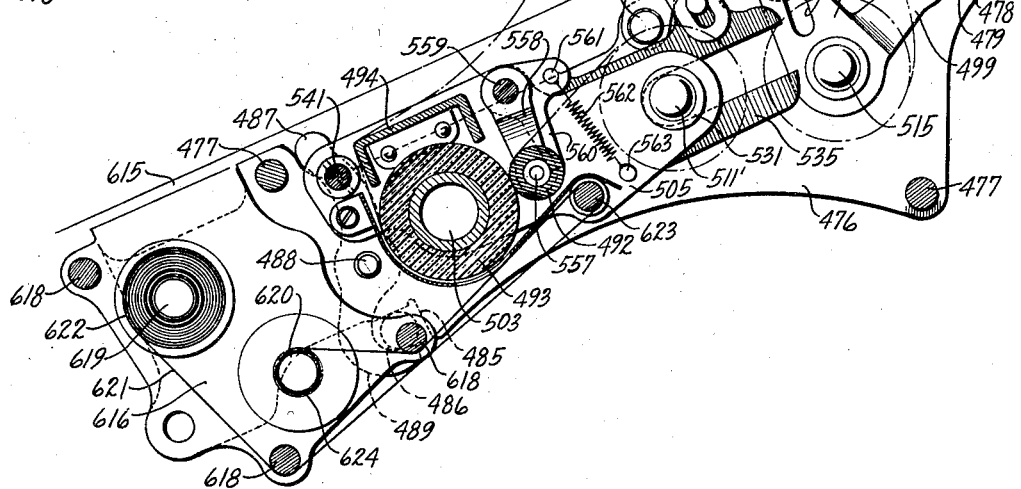
Inventor
Charles W. Green
By Carl Beust
His Attorney Aug. 2, 1938. C. W. GREEN 2,125,438
CASH REGISTER
Original Filed March 27, 1931   38 Sheets-Sheet 31
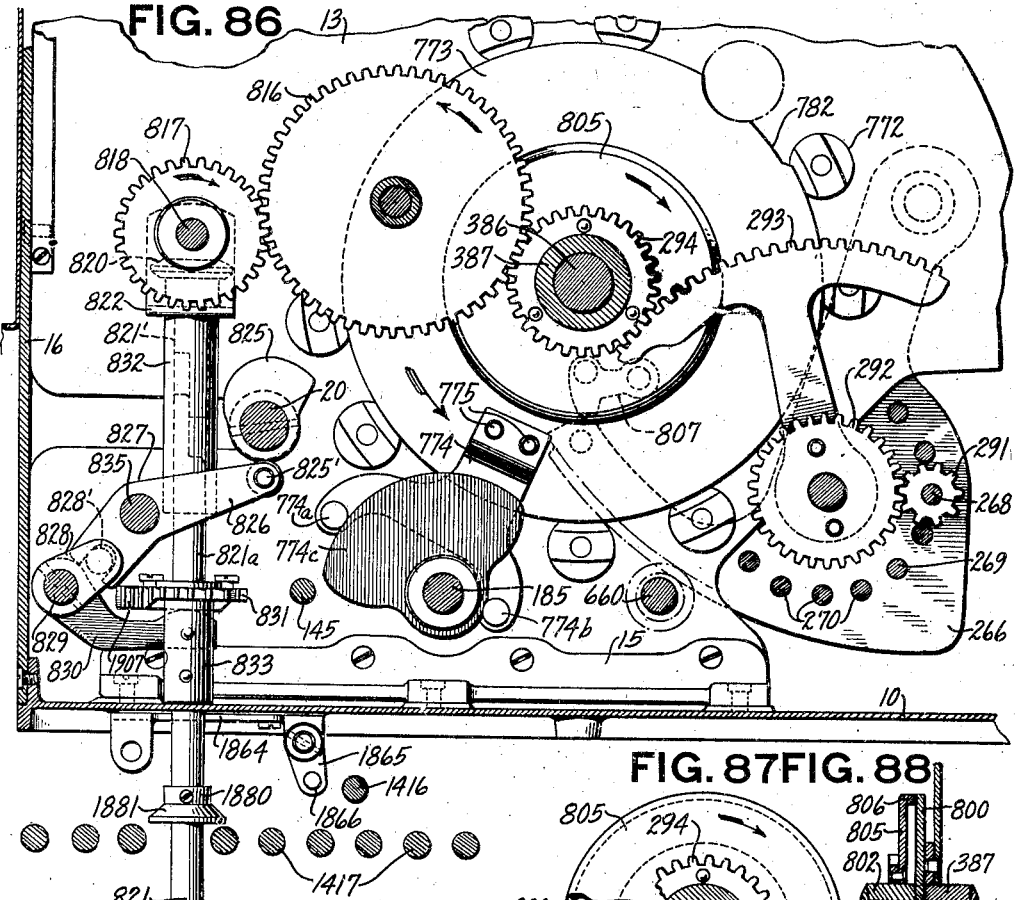
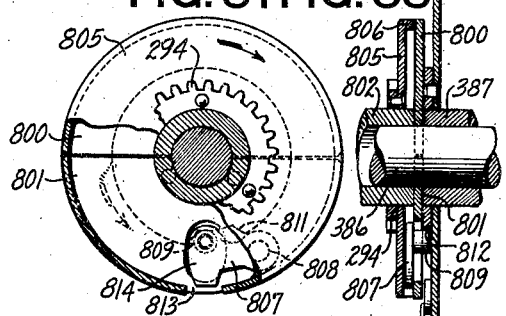
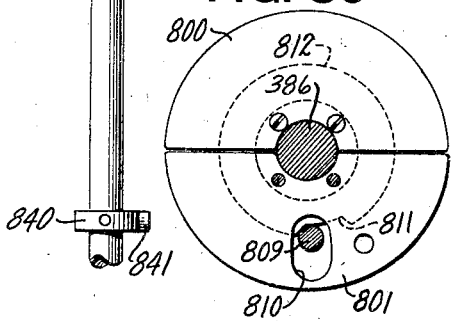
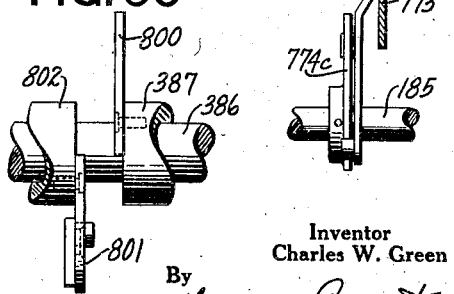
Inventor
Charles W. Green
By Carl Benst
His Attorney Aug. 2, 1938.   C. W. GREEN   2,125,438
CASH REGISTER
Original Filed March 27, 1931   38 Sheets-Sheet 32
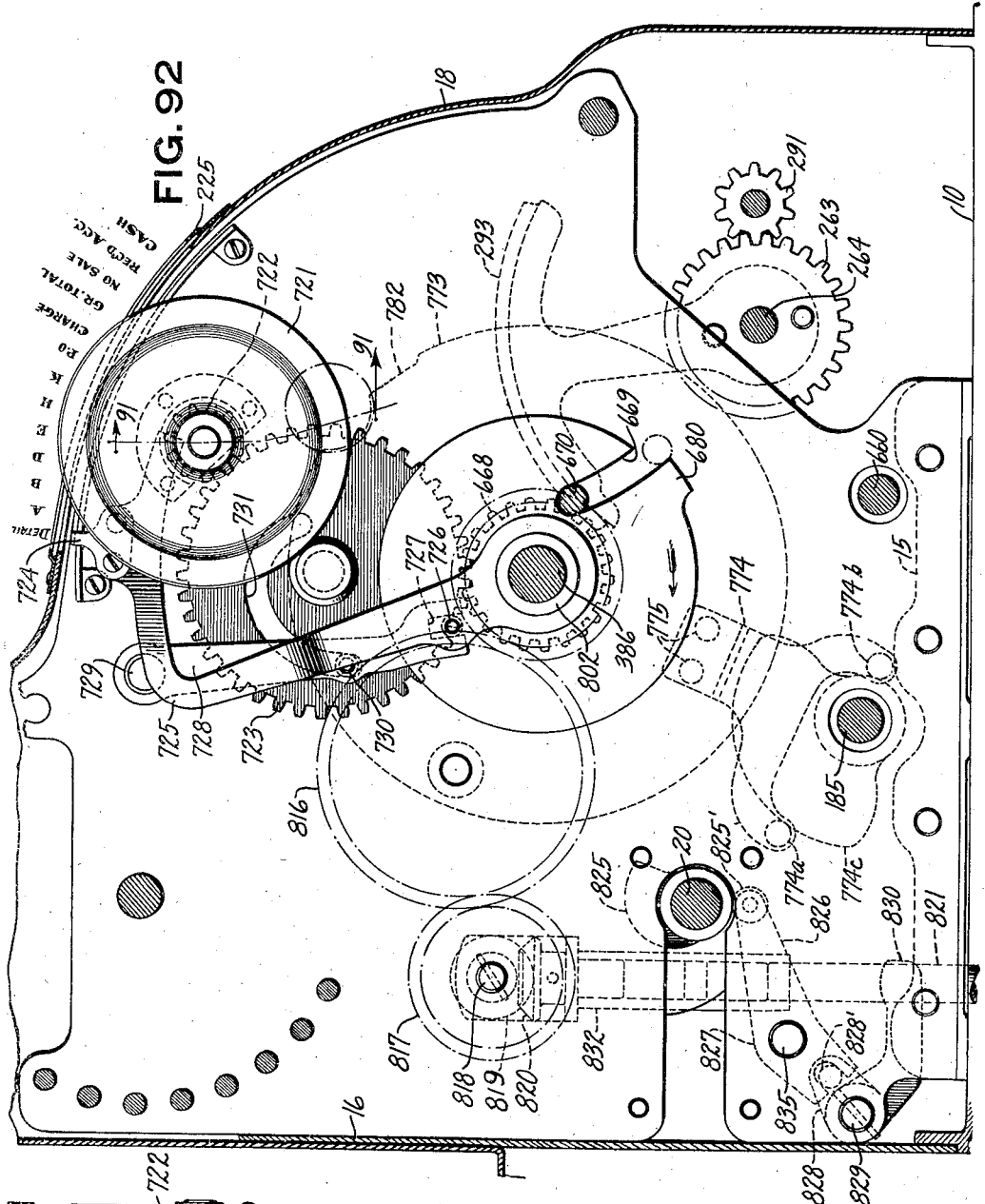
Inventor
Charles W. Green
By  *Pearl Bent*
His Attorney

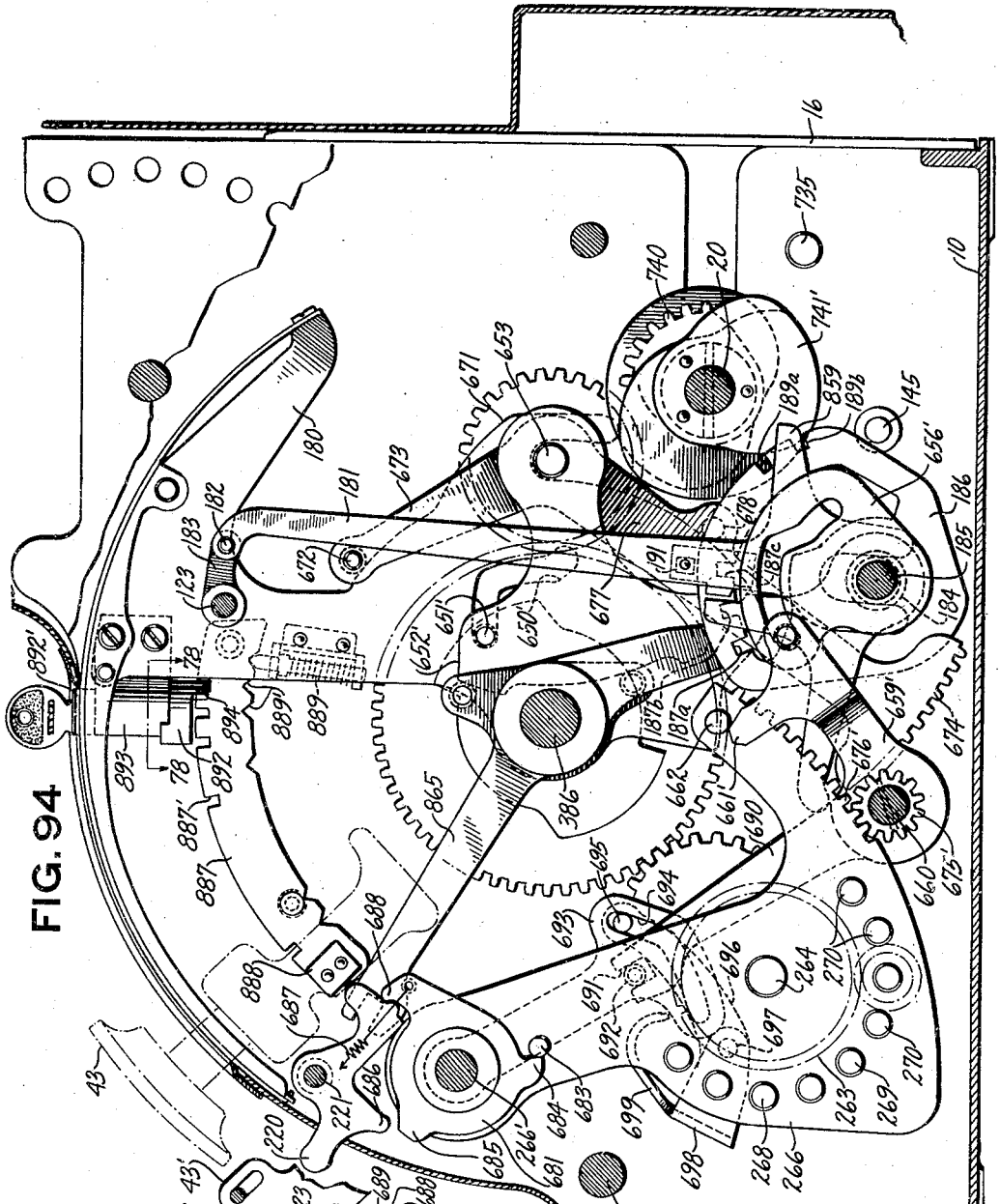

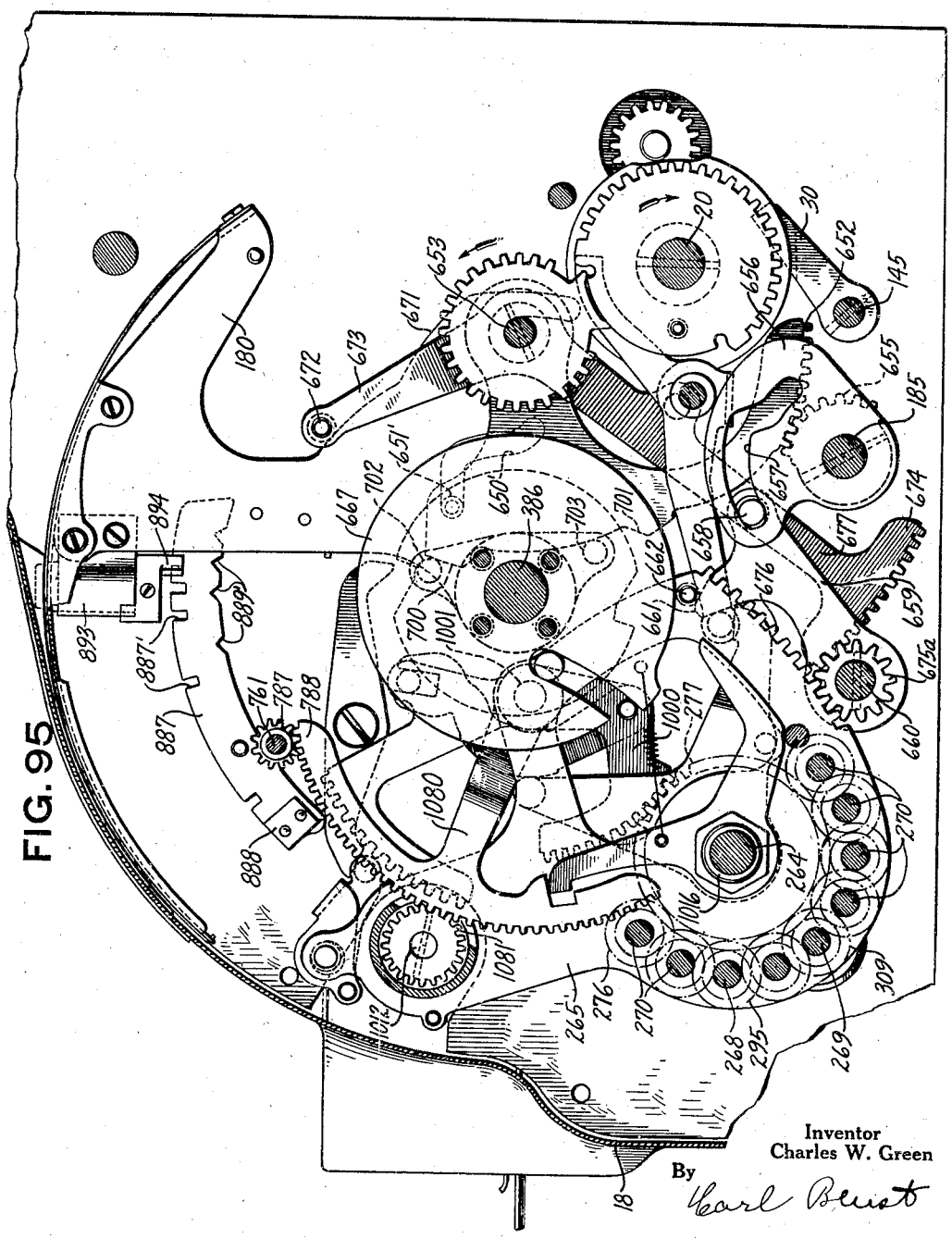

Aug. 2, 1938.    C. W. GREEN    2,125,438
CASH REGISTER
Original Filed March 27, 1931    38 Sheets-Sheet 35

Inventor
Charles W. Green
By Earl Beust
His Attorney

Aug. 2, 1938.  C. W. GREEN  2,125,438
CASH REGISTER
Original Filed March 27, 1931   38 Sheets-Sheet 36

Inventor
Charles W. Green
By Carl Bens
His Attorney

Aug. 2, 1938.    C. W. GREEN    2,125,438
CASH REGISTER
Original Filed March 27, 1931    38 Sheets-Sheet 37

Inventor
Charles W. Green
By Karl Beust
His Attorney

Aug. 2, 1938. C. W. GREEN 2,125,438
CASH REGISTER
Original Filed March 27, 1931 38 Sheets-Sheet 38
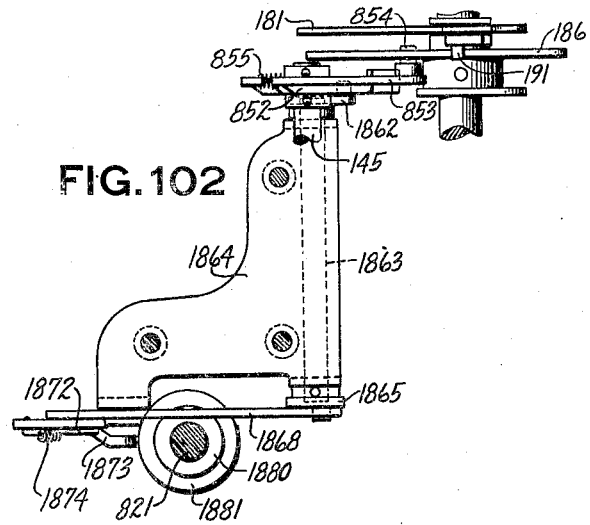
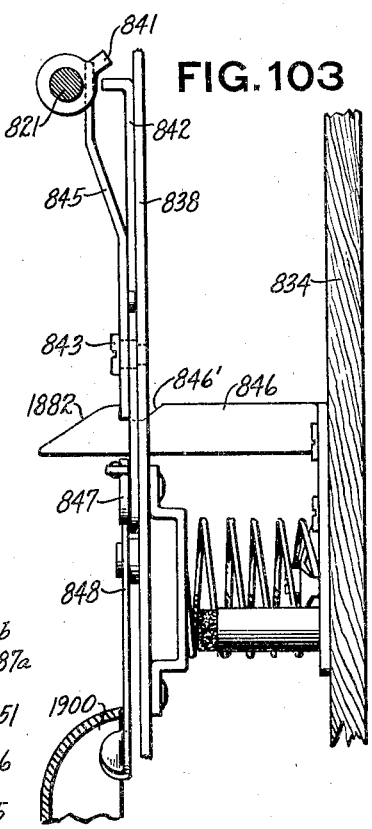
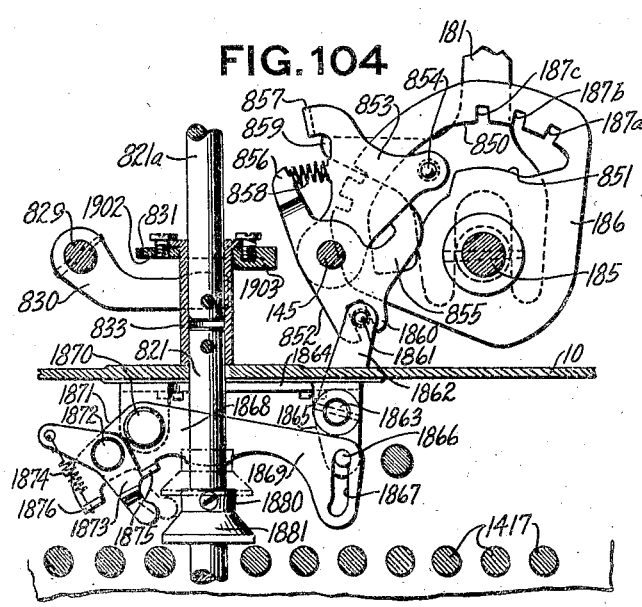
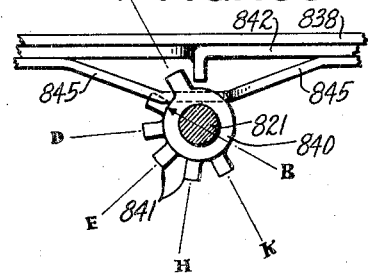
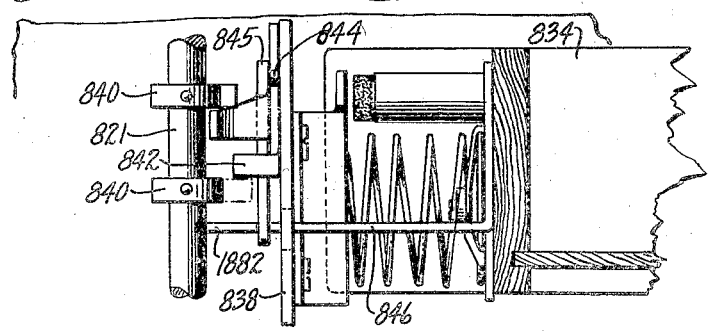
Inventor
Charles W. Green
By Carl Benst
His Attorney Patented Aug. 2, 1938

2,125,438

UNITED STATES PATENT OFFICE 2,125,438

CASH REGISTER

Charles W. Green, Dayton, Ohio, assignor to The National Cash Register Company, Dayton, Ohio, a corporation of Maryland Original application March 27, 1931, Serial No. 525,630. Divided and this application April 24, 1936, Serial No. 76,126

18 Claims. (Cl. 235—22)

This invention relates to cash registers and analogous devices and particularly to that type having a plurality of totalizers some of which are provided for separately registering the totals of the various transactions entered in the machine by the individual clerks while others are provided for separately registering the totals of the different kinds of transactions entered in the machine. This invention also relates to the type of machines capable of printing upon a detail strip a record of each transaction entered in the machine, and is a division of the application for United States Letters Patent, Serial No. 525,630, of Charles W. Green, filed March 27, 1931, which issued December 8, 1936, as Patent No. 2,063,091.

One object of the present invention is to provide a totalizer selecting mechanism which is of flexible design so that one or more of the totalizers may be selected for operation at substantially the same time. This selecting mechanism is of such a nature that various combinations of totalizers may be selected for simultaneous operation.

Another important object of the present invention is to provide a number of printing totalizers and special counters in a reel and also to provide therein a series of item carriers so that each item entered in the machine as well as the total standing on each of the totalizers and the special counters may be printed upon a record strip. This reel is so constructed that for item entering operations of the machine the various totalizers and special counters mounted therein may be selected for operation while the reel is held stationary. Printing from the item type carriers is effected by printing mechanism while the reel is held in normal position. Printing from each of the totalizers and special counters is effected by first releasing the reel and then rotating the same to bring each totalizer and counter successively to the printing line whereupon the machine is operated to effect printing directly therefrom upon the record strip.

A further object of the present invention is to provide a unitary control mechanism for controlling the various modes of operation in the machine. A still further object is to provide a machine in which the various moving parts therein are positive in operation. Another important object of the present invention is to construct many of the parts in such a manner that they may readily be stamped from the sheet metal blanks, thus lowering the cost of manufacture to a minimum. Another object of the present invention is to construct the various mechanisms of the machine in such a manner that they may be assembled in units and then placed in the machine in their assembled state. This feature also tends to lower the cost of manufacture.

A further object of the present invention is to provide a single lock control mechanism with two keys, by which a limited number of operations of the machine may be controlled when unlocked by one key, while the said control mechanism when unlocked by the other key may be made to control all of the operations of the machine.

Further objects of the present invention are to effect improvements in totalizer selecting and operating mechanisms, special counter selecting and operating mechanisms, differential mechanisms, keyboard and lock-line mechanisms, drawer selecting mechanisms, record strip printing and feeding mechanisms, power transmission mechanisms, machine control mechanisms, interlocking mechanisms, and totalizer and counter resetting mechanisms, as well as a novel positive means for identifying grand totals from subtotals when printed upon the record strip.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

In the drawings:—

Fig. 9 is a sectional view on line 9—9 of Fig. 10.

Fig. 10 is an elevational view illustrating the relative positions of the parts comprised in the differential when the revolution shaft has been operated substantially 100° and when a key in an amount section has been depressed.

Fig. 11 is a partial front elevational view showing the differential mechanism and the associated transmission line.

Fig. 13 is a section on line 13—13 of Fig. 17.

Fig. 14 is an extended perspective view of the mechanism associated with each bank of keys for controlling the release of the machine.

Fig. 15 is a similar view of the transaction key section.

Fig. 16 is a similar view of a portion of the clerk's key section.

Fig. 17 is a side view of a portion of an amount key section with the retaining plate removed.

Fig. 18 is a section on line 18—18 of Fig. 15.

Fig 19 is a view of the transaction key section showing arrangement of the parts when a no sale key is depressed.

Fig. 20 is a partial detail view of the transaction key section showing the received on account key depresssd.

Fig. 21 is a detail view of the mechanism for manually releasing any depressed keys.

Fig. 22 is a plan view, with certain parts omitted, to show the mechanism for releasing the machine for operation and compelling a sequence of operation between the keys.

Fig. 23 is a general view of the motor release bar and all of the parts associated therewith for controlling the release of the machine and also shows the means for restoring the parts to normal during an operation of the machine.

Fig. 24 is a view showing the position of the parts immediately after the motor release bar has been depressed.

Fig. 25 is a detail view showing some of the locking elements for the operating mechanism in their normal positions.

Fig. 26 is a detail view showing the position of some of the locking elements immediately after the motor bar has been depressed.

Fig. 27 is a side view of the individual locks for the clerks' keys and the control means therefor.

Fig. 28 is a sectional view taken on line 28—28 of Fig. 27.

Fig. 29 is a detail view of a portion of the plate for supporting the individual locks for the clerks' keys Fig. 30 is a detail view of a key section showing the position assumed by the detent plate and its associated parts after a key has been depressed.

Fig. 31 is a view of the same parts during an operation of the machine.

Fig. 32 is a sectional view taken on line 32—32 of Fig. 3 showing the driving mechanism for certain of the parts positioned within the totalizer reel.

Fig. 33 is a front elevational view of the totalizer reel.

Fig. 34 is a view of the totalizer reel taken on line 34—34 of Fig. 3.

Fig. 35 is an extended perspective view of the totalizer reel, showing particularly the elements comprising the totalizer selecting and engaging mechanisms.

Fig. 36 is a detail view showing the selector plate associated with the group of clerks' totalizers.

Fig. 37 is a cross-sectional view of a portion of the totalizer reel taken substantially on line 37—37 of Fig. 36, showing the location of the selector plates and related parts.

Fig. 38 is a detail view showing the selector plate associated with the group of transactions totalizers.

Fig. 39 is a sectional view taken substantially on line 39—39 of Fig. 38.

Fig 40 is a view taken substantially on line 40—40 of Fig. 37.

Fig 41 is a sectional view taken on line 41—41 of Fig. 40.

Fig. 42 is a sectional view taken on line 42—42 of Fig. 37.

Fig. 43 is a detail perspective view of a portion of the totalizer engaging mechanism.

Fig. 44 is a view of the totalizer reel taken on line 44—44 of Fig. 3.

Fig. 45 is a front view of the mechanism associated with the special counters, a portion of which is shown in section.

Fig. 46 is a view substantially on line 46—46 of Fig. 45, with certain parts broken away to show the construction of the operating means for the special counters.

Fig. 47 is a section of the totalizer reel substantially on line 47—47 of Fig. 49.

Fig. 48 is a detailed view of the no sale counter.

Fig. 49 is a front elevation showing the mechanism associated with the special counters and also the mounting for the no sale counter.

Fig. 50 is a front elevation of the reel with parts omitted to show the totalizer actuating gears, transfer plates, and the cam shaft for controlling the various mechanisms associated with the reel.

Fig. 51 is a view substantially on line 51—51 of Fig. 50.

Fig. 52 is a detailed view of the aligning bar for the item and special type carriers.

Fig. 53 is a cross section of one of the totalizers together with a portion of the transfer mechanism associated therewith.

Fig. 54 is a section substantially on line 54—54 of Fig. 50, showing the aligning mechanism for the item and special type carriers and the mechanism for automatically locking the moving parts within the reel when the machine is conditioned for total taking.

Fig. 55 is a detail view of the cam for operating the aligning mechanism for the item and special type carriers.

Fig. 56 is a detail view of the first denominational order transfer cam.

Fig. 57 shows a portion of the control mechanism for the locking mechanisms associated with the moving parts within the reel.

Fig. 58 is a detail of the cam for actuating the interlocking mechanisms associated with the moving parts within the reel, showing the cam and locking elements in operated positions.

Fig. 59 is a detail view of the last denominational order transfer cam.

Fig. 60 is a detail view of the cam for operating the resetting mechanism.

Fig. 61 is a view on line 61—61 of Fig. 3, showing the resetting mechanism and the interlocks between the totalizer reel and the motor control shaft.

Fig. 62 is a front view of the resetting mechanism, showing certain other mechanisms associated therewith.

Fig. 63 is a general view of the resetting mechanism, with parts drawn in section to show the gearing for shifting and rotating the totalizer shaft.

Fig. 64 is a detail view of a totalizer wheel showing the pawl carried thereby and a notched portion of the totalizer shaft with which this pawl cooperates during a resetting operation.

Fig. 65 is a section taken on line 65—65 of Fig. 62.

Fig. 66 is a section taken on line 66—66 of Fig. 65.

Fig. 67 is a section taken on line 67—67 of Fig. 62.

Fig. 68 is a view taken on line 68—68 of Fig. 62.

Fig. 69 is an elevational view taken substantially through the mid-portion of the totalizer reel, showing the relative positions of the various control mechanisms for the machine.

Fig. 70 is a fragmentary view showing a portion of the means for controlling the totalizer resetting.

Fig. 71 is a side view of the mechanism of Fig. 58.

Fig. 72 is a detail view showing the type wheels for printing characters on the record strip to distinguish grand totals from sub-totals.

Fig. 73 is a side view of the right-hand type wheel of Fig. 72.

Fig. 74 is a section on line 74—74 of Fig. 2.

Fig. 75 is a general view of the printer showing printed totals and their identifying characters.

Fig. 76 is a right-hand side view of the printer showing the operating mechanisms associated therewith.

Fig. 77 is a detail plan view of the parts associated with the control lever for controlling the grand total position of the lever.

Fig. 78 is a cross section of the control lever lock on line 78—78 of Fig. 94.

Fig. 79 is a section of the control lever taken on line 79—79 of Fig. 78.

Fig. 82 is a perspective view of a portion of the spool around which the record strip is wound.

Fig. 83 is a section substantially on line 83—83 of Fig. 75, showing the manual feed for the record strip.

Fig. 84 is a cross section showing the mechanism associated with the storage roll for the record strip.

Fig. 85 is a section substantially on line 85—85 of Fig. 75, showing certain parts in adjusted positions when the mechanism is conditioned for replenishing or removing the record strip.

Fig. 86 is a sectional view taken substantially on line 86—86 of Fig. 69 particularly showing the drawer mechanism.

Fig. 87 is an elevational view, with parts broken away, of the clutch associated with the drawer mechanism.

Fig. 88 is a vertical cross-sectional view of the clutch mechanism shown in Fig. 87.

Fig. 89 is a detail view showing the two semi-circular plates of the clutch shown in Fig. 87.

Fig. 90 is a front view of the mechanism shown in Fig. 89 with the plates of the clutch separated.

Fig. 91 is a detail view of the manual means for rotating the reel to select a totalizer for total printing and resetting.

Fig. 92 is a sectional view taken substantially on line 92—92 of Fig. 69 showing particularly the mechanism for selecting a cash drawer by movement of the totalizer reel.

Fig. 93 is a detail view of the mechanism for controlling the motor bar retaining latch.

Fig. 94 is a general elevational view of the control mechanism and its associated parts.

Fig. 95 is a section on line 95—95 of Fig. 3.

Fig. 102 is a plan view of the mechanism shown in Fig. 104.

Fig. 103 is a fragmentary plan view showing certain of the parts associated with the drawer release and bell mechanisms.

Fig. 104 is a side view partly in section and having parts broken away, showing the mechanism for locking the machine against operation when a drawer is opened.

Fig. 105 is a top view of the drawer selecting finger shaft.

*General description*

Figure 1:
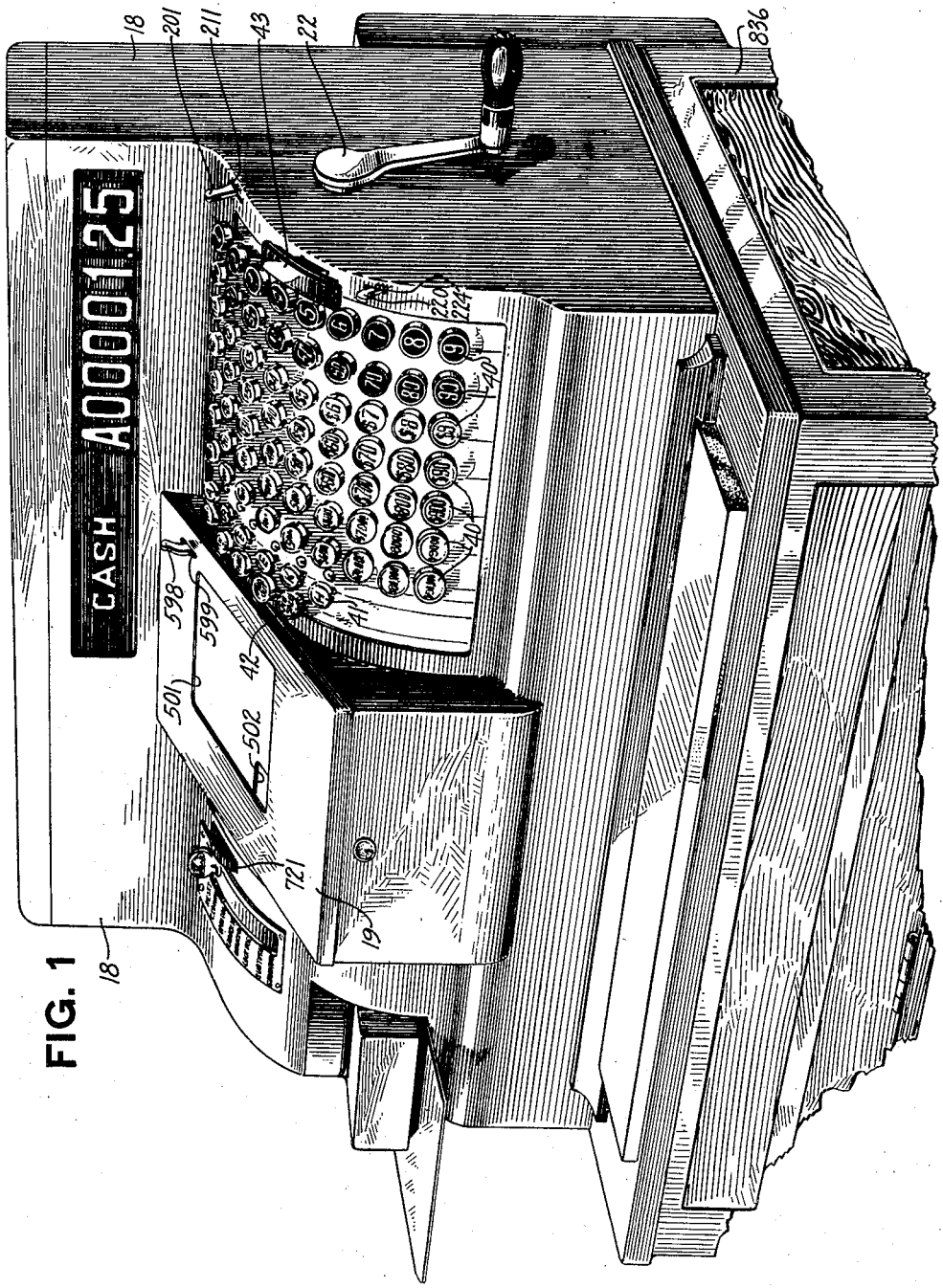
Fig. 1 is a perspective view of the complete machine embodying this invention.

Before describing the various mechanisms comprised in this machine in detail, a general description of the machine will first be given. This machine is of the well known key set, motor or crank operated type. The illustrated machine contains seven banks of amount keys, one bank of clerks' keys and one bank of transaction keys. These keys operate with what is commonly known as a lock line which is so constructed that upon an adding operation of the machine it is necessary to depress a key in one of the amount banks, a transaction key, a clerk's key, and a motor bar to release the machine for operation. This mechanism is also so constructed that for no sale transactions, it is only necessary to depress the no sale key, a clerk's key and the motor bar to release the machine for operation.

Upon depression of the no sale key, all of the amount keys will be locked against operation. Likewise, upon depression of any one of the amount keys, the no sale key will be locked against operation. Mechanism is also provided to compel the depression of an amount key before a clerk's key can be depressed for all transactions involving the use of the amount keys. This interlock also compels the depression of the no sale key for no sale transactions before a clerk's key can be depressed. Associated with each bank of keys is a positively driven differential segment from which motion is imparted to the mechanisms for adjusting the various type carriers and totalizer elements provided in the machine.

Located approximately at the mid-portion of the machine is a normally stationary reel in which are mounted in the illustrated machine six clerks' totalizers, four transaction totalizers and one grand totalizer. Mounted on each totalizer shaft is a special counter which registers the number of times its respective totalizer has been selected for operation. A no sale counter is also provided in the reel for registering the number of no sale transactions entered in the machine. Also mounted on a shaft supported in the reel are a set of item carriers and two special type carriers which correspond respectively with banks of the clerks' and transaction keys. Also mounted on the shaft supporting these item type carriers is a consecutive counter which registers the number of cash, received on account and paid out transactions entered in the machine.

The selecting mechanism for selecting one or more of the totalizers for operation comprises two selector plates which are adjusted through a transmission line by the differential segments associated with the clerks' and transaction banks of keys respectively. This mechanism is so constructed that for cash and received on account transactions, a clerk's totalizer, a transaction totalizer and the grand totalizer will be selected for operation and simultaneously operated by the actuating gears. For charge and paid out transactions, however, mechanism is provided for holding out the selected clerk's totalizer and the grand totalizer, thereby permitting operation only of the selected transaction totalizer.

Two selector plates are provided for selecting the special counters for operation. The special counters associated with each of the selected totalizers in the reel will be operated regardless of whether the totalizer associated therewith is brought into engagement with the actuating gears. One of the counter selecting plates is provided with means for selecting any one of the special counters associated with the clerks' totalizers for operation for all normal operations of the machine. The other plate is provided with means for selecting the special counter associated with the grand totalizer for operation, for cash and received on account transactions. This plate also contains means for selecting the no sale counter for operation for all no sale operations of the machine. Means are also provided on this plate for selecting each of the counters associated with the transaction totalizers. Further means are provided in this plate for selecting the consecutive counter for all cash, received on account, and paid out transactions entered in the machine.

A record strip printing mechanism is provided and is positioned at the top of the cabinet directly over the totalizer reel. The various items entered in the machine may be viewed from the record strip through a window provided in the top of the cabinet. This window is so provided that autographic notations may be made upon the record strip adjacent the printed items. This mechanism is of such a nature that the record strip is first shifted from normal position to bring the proper portion thereof over the item type carriers, when a printing impression will then be made thereon. The paper is then shifted in the reverse direction and advanced one step to present a new surface to be written and printed upon.

The illustrated machine is provided with a two key single lock control mechanism comprising a control lever which is movable to seven positions of adjustment. The six upper positions or all except grand total are made accessible by a key in the hands of the store manager, and all positions including grand total are made accessible to an auditor by inserting a different key in the same lock. When this lever is in the uppermost position, the machine is conditioned to reset the consecutive counter provided in the reel and also that associated with the check and slip printing mechanism.

When the control lever is moved to the next position, or open drawer position, the machine is conditioned for operation regardless of whether a cash drawer is open or closed. When the control lever is moved to the next position, or closed drawer position, the machine can be operated only when the cash drawers are closed.

When the control lever is moved to the next position, or the unlocked clerks' keys position, the individual locks associated with the clerks' bank of keys may be moved to ineffective position so that any one of the clerks' keys may then be depressed without first unlocking the same by the individual lock associated therewith. This position of the control lever is not a permanent position, but is simply provided to permit release of the clerks' keys; the control lever must then be moved to either closed drawer or open drawer position to condition the machine for operation. Suitable mechanism is also provided to retain the individual clerks' locks in either effective or ineffective position.

When the control lever is moved to lock register position, the entire machine is locked against operation. When the control lever is moved to sub-total position, the transmission line is swung out of engagement with the gears in the machine proper and the totalizer reel may then be rotated to bring one of the totalizers or special counters to printing position. Upon depression of the motor bar, the machine will then effect a printing impression directly from the totalizer, or counter so selected, upon the detail record strip.

When the control lever is unlocked by the second key or auditor's key it can be moved to grand total position, the resetting mechanism is conditioned for operation so that upon operating the machine for total taking a printing impression is effected upon the detail strip from the selected totalizer and special counter, and said totalizer and special counter are automatically reset to zero. Suitable locking mechanism is also provided for locking the control lever in any one of its positions of adjustment with the exception of the unlocked clerks' keys position, which position it is remembered is simply a temporary one, and the further exception of the grand total position.

The illustrated machine is also provided with a number of cash drawers, one for each clerk's totalizer, so that the accounts of each of the clerks may be kept separate. Selection of the cash drawers is effected automatically by a suitable mechanism controlled by the differential segment associated with the clerk's bank of keys. A drawer is also selected upon rotation of the reel to bring a clerk's totalizer to printing position.

Suitable interlocks are also provided to insure against any mis-operations of the machine. Locks are also provided for locking all of the moving parts in the totalizer reel against movement so that they will remain in place when the reel is rotated during total taking operations. The gears of the transmission line are also locked against operation when it is out of normal position so that they will properly mesh with their related gears in the machine proper, when the transmission line is restored to normal position.

An interlock mechanism is provided between the main operating mechanism of the machine and the reel so that the machine cannot be operated after the control lever has been moved to sub-total or grand total position unless the reel is moved to a printing position. Also an interlock is provided to prevent operation of the machine when the reel has been arrested between printing positions. A detail description of the mechanisms outlined above will now be given.

*Frame work*

The various parts of the machine are supported by a suitable frame work comprising a base casting 10 (Fig. 2), two main side supporting frames 11 and 12 and two intermediate supporting frames 13 and 14. These frames are fastened to brackets 15 attached to the base casting, by screws, rivets or any other suitable means. A plate 16 extending across the back of the machine is fastened to brackets 17 provided along the rear edge of each of the frames. This plate acts as a brace for all of the frames.

The mechanisms contained in this machine are enclosed by a cabinet 18, which has hinged thereto a flat lid 19 so that access may be had to the printing mechanism for removing the printed record strip and also for replenishing the paper supply. The cabinet is also provided with suitable openings for receiving key sections and several of the control mechanisms as is clearly shown in Fig. 1.

*Operating mechanism*

Figure 3:
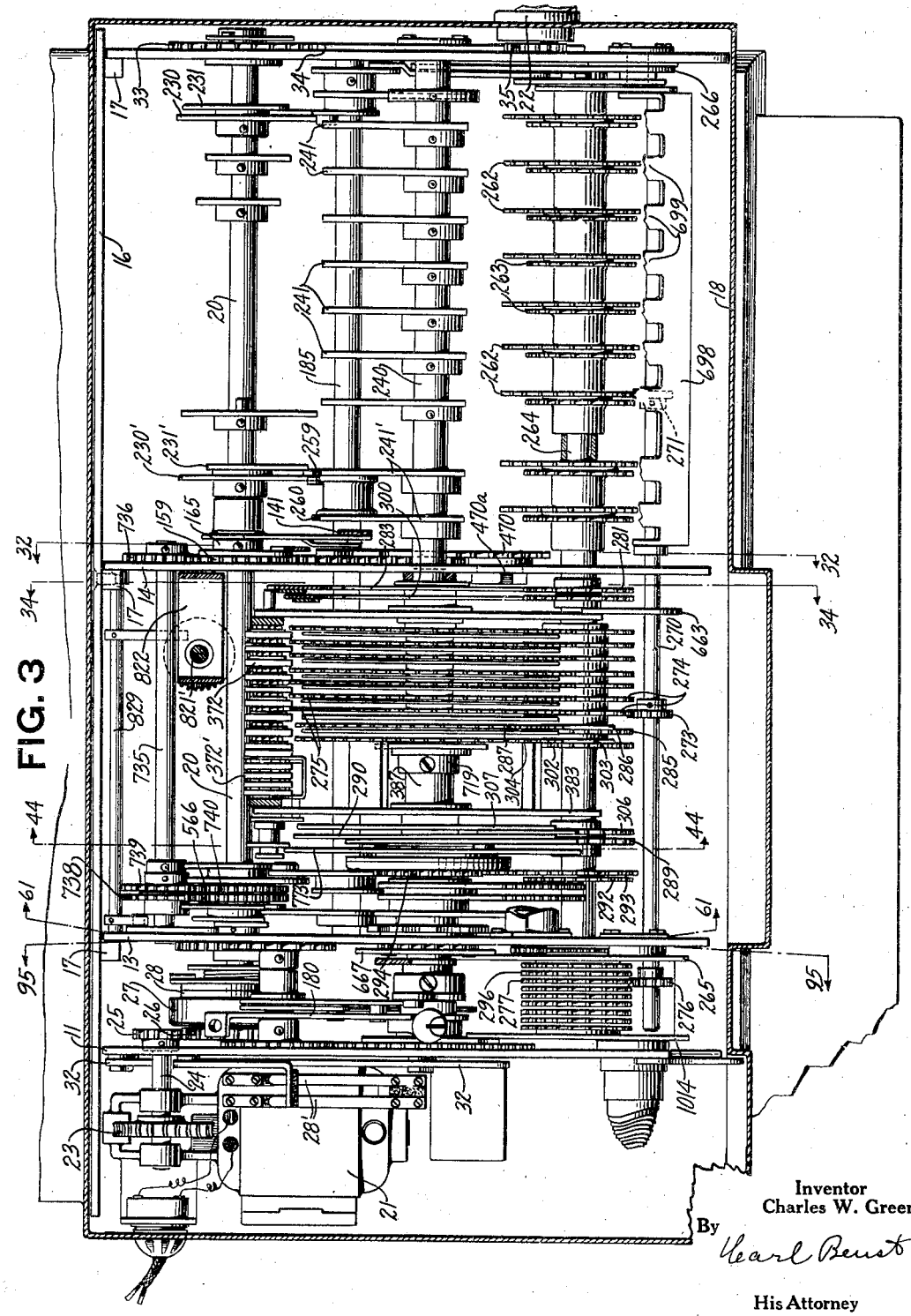
Fig. 3 is a plan view of the mechanisms located substantially below the mid-portion of the machine.
Figure 4:
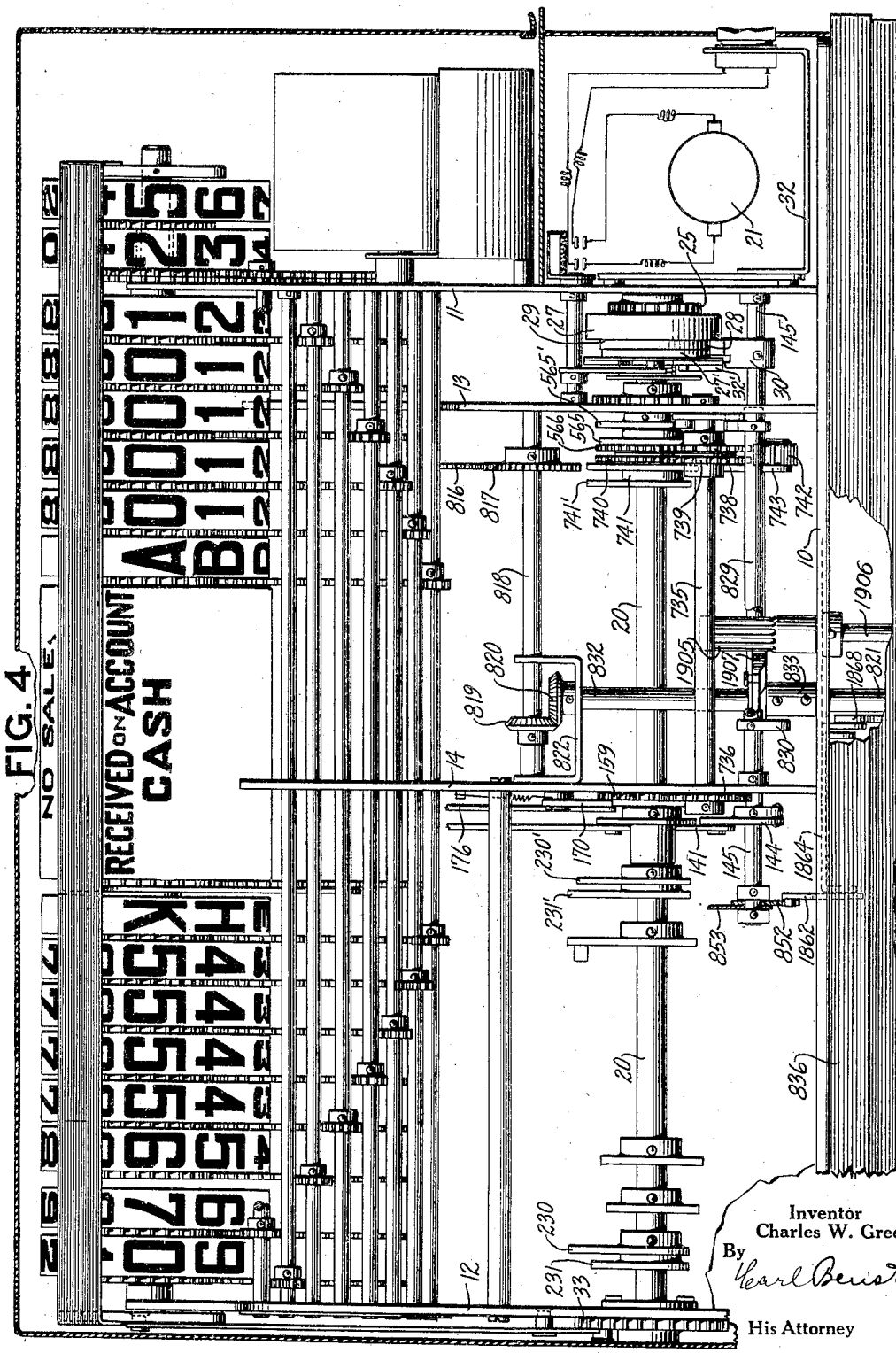
Fig. 4 is a rear elevational view of the machine with the back portion of the cabinet removed.

The power is imparted to varous mechanisms of the machine by a main driving shaft 20 (Figs. 3 and 4), which is driven either by an electric motor 21 or a hand operated crank 22. Shaft 20 is given one complete rotation at each operation of the machine. As shown in Figs. 3 and 4 the usual reduction gearing, designated generally by reference character 23, is provided between the electric motor 21 and a short shaft 24. Shaft 24 extends through an enlarged opening in side frame 11 and carries a pinion 25 at the inner end thereof which meshes with a gear 26 attached to a flanged disc 27 of clutch 28. A cooperating clutch member 29 is fixed to the left-hand end of the main operating shaft 20 and operates within the flanged portion of disc 27 to cause the clutch members to drive shaft 20 when the motor is operated. The control mechanism for the motor switch 28' is also shown generally in Figs. 3 and 23.

The clutch and the switch control mechanism associated with the electric motor 21 are of a well known type and will not be described in detail herein. For a full disclosure thereof reference may be had to U. S. Patent No. 1,144,418 issued June 29, 1915 to Charles F. Kettering and William A. Chryst. In order to cause operation of the motor it is only necessary to rock an arm 30 (Figs. 4 and 23) out of engagement with plate 32' and notches (not shown) provided in the locking plates associated with the clutch and switch control mechanism. The mechanism for performing this function and also that for restoring arm 30 to normal position will be fully described hereinafter.

The electric motor 21 is mounted on a support 32 which is attached to side frame 11 by screws or bolts. This not only facilitates assembling of the parts but renders the motor assembly readily detachable from the machine.

Figure 5:
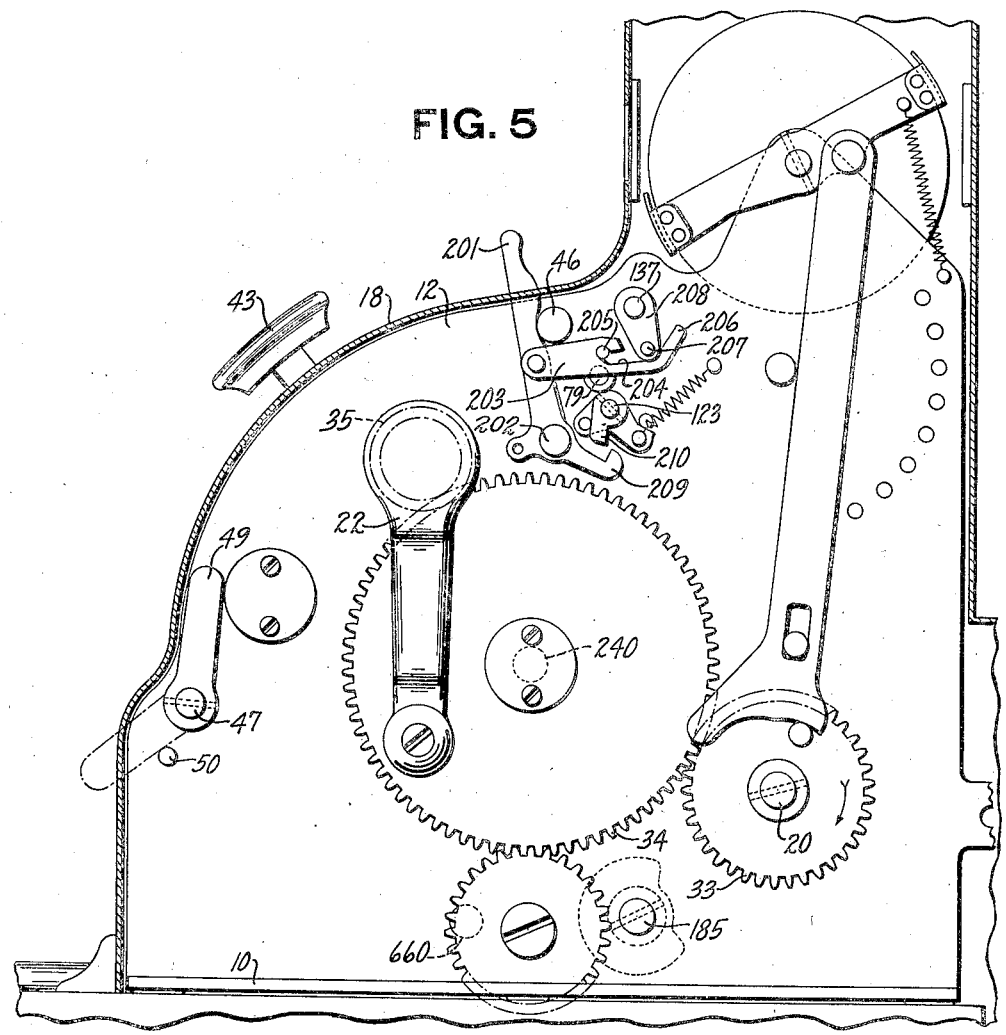
Fig. 5 is a right-end view of the machine with the end portion of the cabinet removed.
Figure 6:
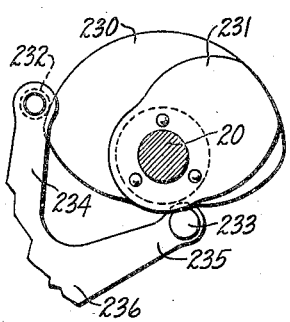
Fig. 6 shows the cams for operating the driving members for the amount differential segments.

Referring to Figs. 3 and 5 it will be seen that a pinion 33 is fixed to the right-hand end of shaft 20. This pinion meshes with a large idler gear 34 which gear in turn meshes with a smaller gear 35 which is driven by hand crank 22. Thus it is seen that mechanism is provided for driving shaft 20 either manually by crank 22 or automatically by electric motor 21. A suitable clutch mechanism is provided between hand crank 22 and pinion 35 which permits movement of gears 33, 34 and 35 without moving crank 22 when the machine is operated by the electric motor 21. Suitable mechanism is also provided to permit removal of crank 22.

*Keyboard*

The keyboard (Fig. 1) is comprised of seven banks of amount keys 40, one bank of clerks' keys 41, and one bank of transaction keys 42. A motor bar 43 is also provided for effecting release of the machine. Each bank of keys comprises a complete section which may be inserted in the machine or removed therefrom as a unit. The casting 44 (Figs. 27, 28, 30 and 31) forming the body of each of the key sections, is provided with slots 45 formed at either end thereof, which are received by a pair of parallel rods 46 and 47 (see also Fig. 27) journalled in frames 12 and 14. Rod 47 is provided with a flat surface 48 (Fig. 27) which permits the removal of the key sections from the machine. A lever 49 (Fig. 5) is fixed to the right-hand end of rod 47 and is positioned adjacent the outer side of frame 12.

Thus, it is seen that in order to remove or insert the key sections in the machine, lever 49 is moved downwardly to the dotted line position shown in Fig. 5, thereby bringing the flat surface 48 of rod 47 adjacent the inner ends of the lower slots 45. The sections may then be lifted from the supporting rods. When the lever 49 is moved to the dotted line position shown in Fig. 5 a portion thereof extends beyond the front extremity of the cabinet and the cabinet obviously cannot be placed on the machine until lever 49 is moved to the full line position. A stud 50 acts as a stop for the lever 49 in the dotted line position. The parts are arranged in this manner to prevent the placing of the cabinet on the machine until the key sections are locked in place. To lock the key sections in position, the lever 49 is simply moved to the full line position shown in Fig. 5 which movement rotates rod 47 to the position shown in Fig. 27 thereby bringing the flat surface 48 thereof out of alinement with the inner end of the slots.

Referring more particularly to Figs. 9, 28 and 31 it will be seen that each key section casting 44 is provided with a plurality of radial depressions 51 each of which receives a key restoring coil spring 52. A pin 53 carried by each key stem extends through an opening 54 provided in the wall of the casting and rests upon the spring associated therewith. These pins are thus effective to compress their respective springs when the keys are depressed. A side plate 55 is attached to each casting 44 for the purpose of retaining all of the springs 52 in position within their respective depressions. This plate is also provided with a series of radial guide slots 56 (Figs. 9 and 28) which receive the ends of pins 53 to prevent any lateral movement thereof during movement of the keys.

The other side of each casting 44 is formed with an elongated depression for receiving the detent plate 57 (Figs. 23 and 28) and the segmental cam plate 58 associated with its related bank of keys. The flanged portions 59 and 60 respectively of the casting 44 are formed with radially alined notches for guiding the keys during their reciprocating movement. A differential latch detent plate 61 (Fig. 10) is fastened to the flanged portions of each casting by screws 62 and thus the keys, as well as the associated detent and segmental cam plates, are retained in proper position. Each casting 44 is also formed with depressions near the upper and lower ends thereof for receiving certain levers connected with the detent and segmental cam plates 57 and 58 respectively.

The type of keyboard embodied in this machine is that commonly known as the flexible type; that is, when a key is depressed in any one of the banks, the remaining keys in that bank are not locked against operation but any one may be operated with the result that the initially depressed key is restored to normal position by its associated spring. The construction and operation of the mechanism for permitting such action of the keys is the same in all of the banks of keys so that a description of one will suffice for all. For the purpose of illustration a description of the mechanism associated with an amount bank of keys will be given.

Referring to Figs. 9, 10, 17, 23 and 31 it will be seen that the detent plate 57 is provided with a plurality of hook-shaped portions 57' (Fig. 17) one for each key. Each portion 57' is provided with an inclined cam face 63 positioned immediately beneath a pin 53 provided on its associated key. The upper end of the detent plate 57 is pivoted to the substantially vertical arm 64 of a bell crank lever 65, while the lower end thereof is pivoted to a lever 66 (Fig. 10) which is pivoted intermediate its ends on a stud 67 provided in the casting 44. A spring 68 is attached at one end to the inner end of lever 66 and at its other end to a projection 69 (Fig. 9) provided on key spring retaining plate 55.

It is, therefore, clear that when a key is depressed detent plate 57 will be cammed upwardly against the tension of spring 68 until pin 53 has cleared the cam face 63 when the spring 68 will restore the detent plate 57 to normal position. The pin 53 of the depressed key will thus be engaged by the hooked portion of its corresponding detent and consequently the key will be held in depressed position. It is obvious that when another key in the bank is depressed the detent plate 57 will again be moved upwardly thereby freeing the previously depressed key, which is then immediately restored to normal by its spring 52, and the second key is retained in depressed position in the manner just stated.

The segmental cam plate 58 is pivoted at its lower end to lever 70 which also is pivoted on stud 67. A spring 68' is connected at one end to the inner end of lever 70 and at the other end to projection 69 of key spring retaining plate 55. The upper end of plate 58 is pivoted to the substantially vertical arm 71 of zero stop pawl 72 pivoted at 73. Cam plate 58 is provided with a series of inclined cam faces 58', one for each key which are located adjacent their respective pins 53 as shown in Figs. 10, 15, 16 and 17.

Thus, it is clear that, when a key in any bank is depressed, both detent plate 57 and cam plate 58 associated therewith will be moved upwardly. When pin 53 moves past cam 63, the detent plate 57 will be restored to normal position by spring 68, but cam plate 58 will be held in its operated position by pin 53 and will remain in this position until the depressed key is restored to normal position, when its associated spring 68' will restore it to normal position.

In all transactions with the exception of the no sale transaction, it is necessary to depress a key in each of the groups and also the motor bar in order to release the machine for operation. For no sale transactions, however, it is only necessary to depress the no sale and a clerk's key, together with the motor bar, to effect release of the machine. Mechanism is also provided to compel the depression of an amount key before a clerk's key can be depressed for transactions in which the amount keys are depressed. Mechanism is also provided for locking the no sale key against operation when an amount key has been depressed and also for locking the amount keys against operation when the no sale key has been depressed. The mechanisms for accomplishing these functions will now be described in detail.

Each segmental cam plate 58 associated with the amount banks of keys as has been pointed out is pivoted to the upper arm 71 of its associated zero stop pawl 72 as shown in Figs. 13 and 17. This pawl is provided with a depending arm 74 which is adapted to effect disengagement of the differential latch from its driver when no key in a bank has been depressed. The pivot 73 of pawl 72 extends only through the differential latch retaining plate 61. A rearwardly extending arm 76 of this pawl engages a pin 77, provided on an arm 78 fixed to a rod 79, which is journaled in side frames 12 and 14.

As is clearly shown in Fig. 22 there is a similar arm 78 fixed to rod 79 for each bank of amount keys. Rod 79, near the left-hand end thereof has pinned thereto, a two-arm lever 80, as shown in Figs. 14 and 22. When an amount key 40 is depressed, the segmental cam plate 58 associated therewith will be moved upwardly, thereby rocking zero stop pawl 72 on its pivot 73, thus removing the depending arm 74 from the path of movement of its associated differential segment. By this action, rod 79 will be rocked in a counterclockwise direction, as viewed in Fig. 17, which movement is imparted to lever 80, which lever it will be remembered is also fixed to rod 79. The upper arm of lever 80 carries a pin 81 which is adapted to engage a projection 82 provided on a release arm 83 loosely mounted on rod 79. Release arm 83 is provided with a rearwardly extending projection 84 which normally lies in the path of movement of the upper arm 85 of a two-arm detent 86 pinned to shaft 123 (Fig. 14).

It is therefore clear that when lever 80 is rocked in the manner aforesaid, pin 81 will engage projection 82 on release arm 83 thereby rocking the latter in a counterclockwise direction to bring the rearwardly extending projection 84 thereon out of the path of arm 85. All of the arms 78 provided on shaft 79 are moved in a counterclockwise direction upon the depression of a key in any one of the amount banks, and accordingly no further rocking of rod 79 will occur when the keys of the other amount banks are depressed.

Figs. 14, 15, 19, 20 and 22 show the mechanism associated with the transaction bank of keys. By reference to these figures it will be seen that the upper end of segmental cam plate 58 associated with this bank of keys is pivoted to the substantially vertical arm 87 (Fig. 20) of bell crank lever 88; bell crank lever 88 being pivoted on a collar 88' mounted on the supporting stud 89 (Fig. 18) fixed to plate 61. The substantially horizontal arm 90 (Fig. 20) of bell crank 88 carries a pin 91 which engages in an open slot 92 provided in the forward end of a release arm 93 pivoted on rod 79. Release arm 93 is provided with a rearwardly extending projection 94 which normally lies in the path of movement of the upper arm 95 (Fig. 14) of detent 96 which detent is also pinned to shaft 123.

Thus, it is seen that when a transaction key is depressed, the pin 97 carried thereby will engage corresponding cam face 58' provided on plate 58 and will cam the latter upwardly thereby rocking bell crank 88 in a clockwise direction which in turn will rock release arm 93 in a counterclockwise direction bringing the rearwardly extending projection 94 thereon upwardly and out of the path of movement of arm 95 of detent 96. A similar mechanism is also associated with the clerks' bank of keys. The segmental cam plate 58 (Figs. 16 and 22) associated with the clerks' bank of keys is pivoted to the upper arm 98 of bell crank lever 99 (Fig. 16) at 100. The substantially horizontal arm 101 of bell crank lever 99 carries a pin 102 which engages in slot 103 provided in the forward end of release arm 104. A rearwardly extending projection 105 is provided on release arm 104 which normally lies in the path of movement of the upper arm 106 (Fig. 14) of a detent 107 which is also fixed to shaft 123.

Thus, it is seen that when a clerk's key is depressed, bell crank 99 will be rocked in a clockwise direction, thereby rocking release arm 104 in a counterclockwise direction to bring projection 105 out of the path of the upper arm 106 of detent 107.

The mechanism for compelling a sequence of operation between the keys and also the interlock between the amount keys and the no sale key will now be described. Referring particularly to Figs. 14, 15, 16, 18 and 22, it will be seen that lever 80 is provided with a forwardly extending arm 108 which is positioned adjacent a foot 109 provided at the rearward end of a plate 110. Plate 110 is pivoted at its upper end to the substantially vertical arm 118 of bell crank lever 19 and at its lower end to an arm (not shown) pivoted on a stud fixed to plate 61.

As shown in Fig. 18, plate 110 lies adjacent the outer side of plate 61. Thus, it is seen that when arm 80 is rocked, upon depression of an amount key, arm 108 will be moved in the path of the inner end of foot 109 provided on plate 110 and obviously plate 110 is locked against operation. It will be noted that plate 110 is provided with a series of radial slots 111 positioned immediately beneath pins 97 on all transaction keys with the exception of the no sale key. An inclined cam slot 112 (Fig. 15) is formed in plate 110, the upper end thereof lying beneath the pin 97 extending from the no sale key. Therefore, when the no sale key is depressed pin 97 thereon will move plate 110 upwardly with the result that foot 109 will be brought beneath the arm 108 of lever 80, thereby locking the amount keys against operation.

In order to compel the depression of an amount key or a no sale key before a clerk's key can be depressed, a bail 113, shown in Figs. 14, 15, 19 and 22 is provided. Bail 113 is pivoted on shaft 123 to which are fixed the detents 86, 96 and 107, previously described. Release arm 83 is provided with a pin 114 which is adapted to engage an arm 115 provided at the left-hand end of bail 113. Attached to release arm 104 as shown in Figs. 14, 16 and 22 is a lock arm 116. This arm is adapted to cooperate with arm 117 provided at the right-hand end of bail 113.

Thus, it is seen that when an amount key is depressed, release arm 83 will be rocked in a counterclockwise direction as aforesaid causing pin 114 to rock bail 113 in a counterclockwise direction, thereby removing arm 117 from engagement with lock arm 116. A clerk's key may now be depressed. In order that the depression of a no sale key may permit the depression of a clerk's key the following mechanism is provided. As stated before plate 110 is pivoted to the upper arm 118 of bell crank lever 119 at 120. The rearwardly extending arm 121 of bell crank lever 119 is adapted to engage a pin 122 provided at the forward end of release arm 83. Thus, it is seen that when a no sale key is depressed, plate 110 will be moved upwardly thereby causing bell crank lever 119 to also rock bail 113 in a counterclockwise direction to remove the arm 117 thereof from engagement with lock arm 116.

From the construction of parts just described, it is clear that when a key in each of the banks is depressed, the release arms 83, 93, and 104 are rocked out of the path of movement respectively of arms 85, 95 and 106 of their respective detents, which it will be remembered are pinned to shaft 123. Mounted on shaft 123 in close juxtaposition to the inner side of side frame 12 is an arm 124, as shown more clearly in Figs. 23 and 25. The upper portion of arm 124 is provided with an open slot 125 which receives a pin 126 provided on link 127. Link 127 is pivotally supported by arms 128 and 129 pivoted respectively on studs 130 and 131 provided in side frame 12. Fixed to motor release bar 43 is a plate 43' slidably mounted on studs 132 as shown in Fig. 23. A roller 133 provided at the lower end of plate 43' normally engages a foot 134 provided at the lower end of link 127.

Thus, it is seen that when the motor bar 43 is depressed roller 133 will be moved out of engagement with foot 134 and spring 135 will move link 127 downwardly if shaft 123 has been released in the manner hereinbefore described. A depending arm 136 is fixed to a shaft 137, which shaft is also journaled in side plates 12 and 14. A hook member 138 pivoted on shaft 79 normally engages the lower end of arm 136 as shown in Fig. 25. Also fixed to shaft 137 is a substantially horizontal arm 139 having pivoted to the outer end thereof at 140, a spring urged link 141. The lower end of link 141 is provided with a slot 142 which receives a pin 143 attached to the forward end of an arm 144. Arm 144 is fixed to shaft 145 which, it will be remembered, has also fixed thereto the arm 30 which normally engages the locking plates associated with the clutch and motor switch control mechanism as shown in Fig. 23.

Thus, it is seen that when a key in each of the banks has been depressed, or the no sale key and a clerk's key for no sale transactions, and the motor bar 43 is depressed, roller 133 will be moved out of the path of projection 134 and spring 135 will move link 127 downwardly to the position shown in Fig. 24. This downward movement of link 127 will, through pin 126 and arm 124, cause the shaft to rock in a counter-clockwise direction. Pin 126 on link 127 will then engage cam face 146 (Fig. 25) provided at the upper side of hook 138, thereby disengaging hook 138 from arm 136. Spring 147 attached to link 141 will then move the latter upwardly thus rocking shaft 145 in a clockwise direction as viewed in Fig. 23, to remove arm 30 from locking engagement with plate 32', with the result that the switch control mechanism will close the electric motor switch and cause the motor to drive shaft 20 through the connections previously mentioned.

Referring to Figs. 30 and 31 it will be seen that the detent plate 57 associated with each bank of keys as was pointed out hereinbefore, is pivoted at its upper end to the substantially vertical arm 64 of bell crank lever 65. Bell crank 65 is pivoted on a stud 148 provided in the key section casting 44 as shown in Figs. 13 and 15. The substantially horizontal arm 149 of bell crank lever 65 carries a pin 150 which engages in slot 151 of the substantially horizontal arm of a lever 152 pivoted on shaft 79. The rearwardly extending arm of lever 152 is provided with an enlarged open slot 153 which receives a pin 154 provided on an arm 155 fixed to shaft 137. The enlarged slot 153 is provided to permit relative movement between the keys and shaft 137 before the machine has been released for operation.

From the above description it is clear that when link 141 (Fig. 23) is moved upwardly by spring 147, shaft 137 will be rocked in a counter-clockwise direction and, obviously, through the connections just described, bell crank lever 65 will be rocked in a counterclockwise direction about its pivot 148, thereby moving detent plate 57 downwardly. By this movement each detent 62 will further embrace its related pin 53 associated with the key depressed in that bank and at the same time the flat surfaces 156 (Fig. 30) provided at the top of each detent will be brought beneath the pins 53 of the unoperated keys, thereby positively locking the latter against operation. Fig. 31 shows the above described parts in operated position.

Referring to Figs. 23 and 24, it will be seen that link 127 carries a pin 157 near the upper end thereof. This pin lies in the path of movement of arm 136 but is spaced therefrom to permit downward movement of link 127 to cam hook 138 out of engagement with arm 136. From the foregoing description, it is seen that immediately upon disengagement of hook 138 from arm 136, spring 147 will rock shaft 137 in a counterclockwise direction, causing arm 136 to engage pin 157 and thereby move link 127 upwardly. Since pin 126 of link 127 projects into slot 125 of arm 124, shaft 123 will be rocked in a clockwise direction, when link 127 is actuated by arm 136 in a manner just described. When this occurs it is obvious that abutment 134 will be moved clear of the path of movement of roller 133 and spring 150 will restore the motor bar 43 to normal position, thereby bringing roller 133 into engagement with abutment 134 of link 127 as is shown in Fig. 23.

Referring to Figs. 23 and 32, it will be seen that a pinion 159 is fixed to driving shaft 20. Pinion 159 meshes with an idler gear 160, which in turn meshes with a gear 161 fixed to an intermittent gear 162. Intermittent gear 162 carries a pin 163 which normally occupies a position a short distance below the lower arm 164 of a two-arm lever 165 (Fig. 23), which is loosely pivoted on shaft 20. The upper arm 166 of lever 165 is provided with an open slot 167 at its forward end which receives a pin 168 extending laterally from link 141. Intermittent gear 162 is driven in the direction of the arrow, shown in Fig. 23, and from the arrangement of the parts just described it is clear that near the end of a complete rotation of gear 162, pin 163 will engage arm 164, thereby rocking the same downwardly. By this action, arm 166 will move link 141 downwardly against the tension of spring 147.

These parts are so constructed that by the engagement of pin 163 with arm 164 in this manner, rod 137 will be rocked in a clockwise direction substantially 20° beyond its normal position. When the parts have been thus moved, pin 163 will have moved out of engagement with arm 164 and spring 147 will restore the parts to normal position. By this movement of rod 137 beyond normal, the pins 154 provided on arms 155 shown in Figs. 30 and 31 will move across the slots 153 of their related levers 152. When pins 154 engage the left-hand walls of said slots, levers 152 will be rocked in a counterclockwise direction thereby rocking their associated bell crank levers 65 in a clockwise direction with the result that all of the detent plates 57 will be moved upwardly beyond their normal position to free the pins 53 from their respective detents 62 and the springs 52 will then restore the depressed keys to normal position.

When link 127 was elevated by arm 136 and held in its upper position by engagement of its lower end with roller 133, spring 169 rocked hook 138 in a counterclockwise direction so that the end of arm 136 reengaged the end of the hook when link 141 was drawn downwardly and released, thereby locking link 141 in normal position as shown in Fig. 23. A slot 142 provided at the lower end of link 141 permits a small movement of the link without a corresponding movement of lever 144.

Referring to Fig. 23 it is seen that a spring urged arm 170 is pivoted on a stud 171 located above the main driving shaft 20. A projection 172 provided at the lower end of arm 170, engages in a notch 173 provided in a cam 174. A pivoted locking pawl 175 is connected to arm 170 by a link 176. Locking pawl 175 is adapted to engage an arm 177 fixed to shaft 123 when the machine is operated by motor 21 or crank 22. The cam 174 is so designed that immediately upon rotation of shaft 20 pawl 175 will be moved into engagement with arm 177 and thereby lock shaft 123 against movement during an operation of the machine, as would be the case if the motor bar 43 was held depressed during the operation of the machine. A spring 178' is employed to restore arm 170 and the parts connected thereto to normal position.

The locking elements above described are also adapted to be controlled by movements of the control lever 180 (Figs. 93, 94, 95 and 96) toward sub-total and grand total positions. In these figures it is seen that a pitman 181 is pivoted at its upper end at 182 to a substantially horizontal arm 183 fixed to shaft 123. The lower end of pitman 181 is bifurcated to straddle a collar 184 provided on shaft 185. A cam plate 186 is fixed to shaft 185 and is adjusted by control lever 180 in a manner which will hereinafter be described. Plate 186 (Fig. 96) is formed with a plurality of radial slots 187a, 187b, and 187c, provided at the lower side of arcuate portion 188 thereof. Two radial slots 189a and 189b are provided along the outer periphery of arcuate portion 188. Pitman 181 is provided with a stud 190 which is adapted to move into any one of slots 187 depending upon the position of the control lever. The purpose for which slots 187 are provided will be fully described hereinafter.

A second stud 191 is formed on the same side of pitman 181 as is projection 190 and is spaced therefrom a distance equal to substantially the width of arcuate portion 188. Cam faces 192 are provided at each side of portion 188 and are adapted to engage studs 190 and 191 to move pitman 181 downwardly when the control lever is moved to certain positions of adjustment.

When the control lever is in the lock register or the sub-total position, stud 191 will register with slot 189a and when it is in grand total position, stud 191 will register with the slot 189b. It is seen from the construction of the parts just described that when the control lever is moved to lock register, sub-total or grand total position, pitman 181 is moved downwardly by the engagement of stud 190 with the inner cam face 192. This movement of pitman 181 rocks shaft 123 in a clockwise direction, thereby moving arm 124, Figs. 23, 24 and 25, in a clockwise direction so that the left-hand side thereof will assume a position beneath pin 126 provided on link 127. Upon movement of shaft 123 in this manner, the lower arms 193, 195 and 196 (Fig. 14) of detents 86, 96, and 107, are brought into engagement with projections 194, 197, and 198 of release arms 83, 93, and 104, respectively, thereby locking all of the keys against operation.

Upon depression of motor bar 43 (Fig. 23), link 127 will be moved to the left in the manner described heretofore, causing pin 126 carried thereby to move along the upper side of arm 124 and at the same time releasing hook 138 from engagement with arm 136 in the manner described hereinbefore. When hook 138 moves out of engagement with arm 136, spring 147 will urge link 141 upwardly with the result that arm 30 will be moved out of engagement with the motor switch control mechanism and the motor will again operate in the usual manner.

Mechanism is also provided to lock shaft 145 against movement until the totalizer reel has been properly positioned in bringing one of the totalizers and counters into printing position for a total taking operation.

The illustrated machine is also provided with mechanism for releasing any erroneously depressed keys before the machine has been released for operation. Referring to Figs. 1, 5, and 21, it will be seen that a lever 201 is pivoted on a stud 202 extending laterally from the outer side of supporting frame 12. Lever 201 carries a link 203 intermediate its ends, which is formed with an open cam slot 204. This cam slot also receives a pin 205 fixed to supporting frame 12. Near the rearward end of link 203 a hook 206 is provided, which is adapted to engage a pin 207 attached to the lower end of depending arm 208 fixed to rod 137. The lower end of lever 201 is formed with a hook 209 which is adapted to move into engagement with a depending arm 210 fixed to shaft 123. It will be noted from Fig. 1 that a portion of lever 201 extends through a slot 211 provided in cabinet 18.

To release the keys the operator simply grasps lever 201 and draws the same forwardly. By this action link 203 will be cammed upwardly, bringing the hook 206 provided thereon into engagement with pin 207 (see Fig. 21) carried by arm 208. Upon further movement of lever 201 in this manner shaft 137 will be rocked in a clockwise direction. By rocking shaft 137 in this manner detent plate 57 (Figs. 30 and 31) for each bank of keys will be moved upwardly by the train of connections shown, to release any depressed keys from their detent 62. The key spring associated with each of the depressed keys will return the latter to normal position. At the same time hook 209 (Fig. 21) will be moved into engagement with arm 210 and shaft 123 will be locked against movement. The concentric portion 203' provided at the outer end of link 203 permits movement of shaft 137 in a counterclockwise direction during a normal operation of the machine and therefore locks the lever 201 against movement when the parts are out of normal position.

As shown in Figs. 1, 27, 28 and 29, it will be seen that the bank of clerks' keys is also provided with a series of individual locks 214 one for each key. This mechanism is provided to prevent, in normal operations of the machine, anyone but the authorized clerk from depressing his key. These individual locks 214 are mounted on a plate 215 which is slidably supported on a pair of studs 216 and 217 (Fig. 27) provided near the top and bottom, respectively, of the differential latch retaining plate 61 associated with the clerks' bank of keys. Each lock 214 is attached to plate 215 by screws or other suitable means so that when it is desired to change a lock for some reason, it may be readily removed from plate 215 and another lock placed thereon.

As shown in Fig. 28 each clerk's key 41 is provided with a laterally extending pin 218 which normally engages a projection 219 attached to the bolt of its corresponding lock. Thus in order to release his key the clerk simply inserts a key in the lock and rotates the bolt thereof to move the projection 219 out of the path of pin 218 attached to a respective key 41. Mechanism is also provided whereby the proprietor or other authorized person may release all of the clerk's keys upon movement of the control lever 180 to one of its positions of adjustment. The mechanism for performing this function will be fully described hereinafter.

During rush hours it may be desirable to hold the motor bar 43 in depressed position so that it will only be necessary to depress a key in each group to release the machine for operation. To this end a lever 220 shown in Figs. 1, 93 and 94 is provided. This lever is pivoted on a stud 221 attached to the side frame 12, of the machine. The lower end of lever 220 is provided with a projection 622 which is adapted to engage in a notch 623 formed near the left end of the plate 43' attached to motor bar 43. The upper portion of lever 220 extends through a slot 224 provided in the top of the cabinet as shown in Figs. 1 and 93.

It, therefore, is clear that by simply drawing lever 220 forward after the motor bar 43 has been depressed, projection 622 will enter notch 623 in plate 43' and the motor bar will thus be held in depressed position. In total taking operations, however, it is not desirable to hold the motor bar in a depressed position. To this end mechanism is provided for releasing lever 220 and holding the same in inoperative position. This mechanism is operated upon movement of the transmission frame when the control lever is moved to either sub-total or grand-total positions. The mechanism for performing this function will also be fully described hereinafter.

Differential mechanism

Figure 8:
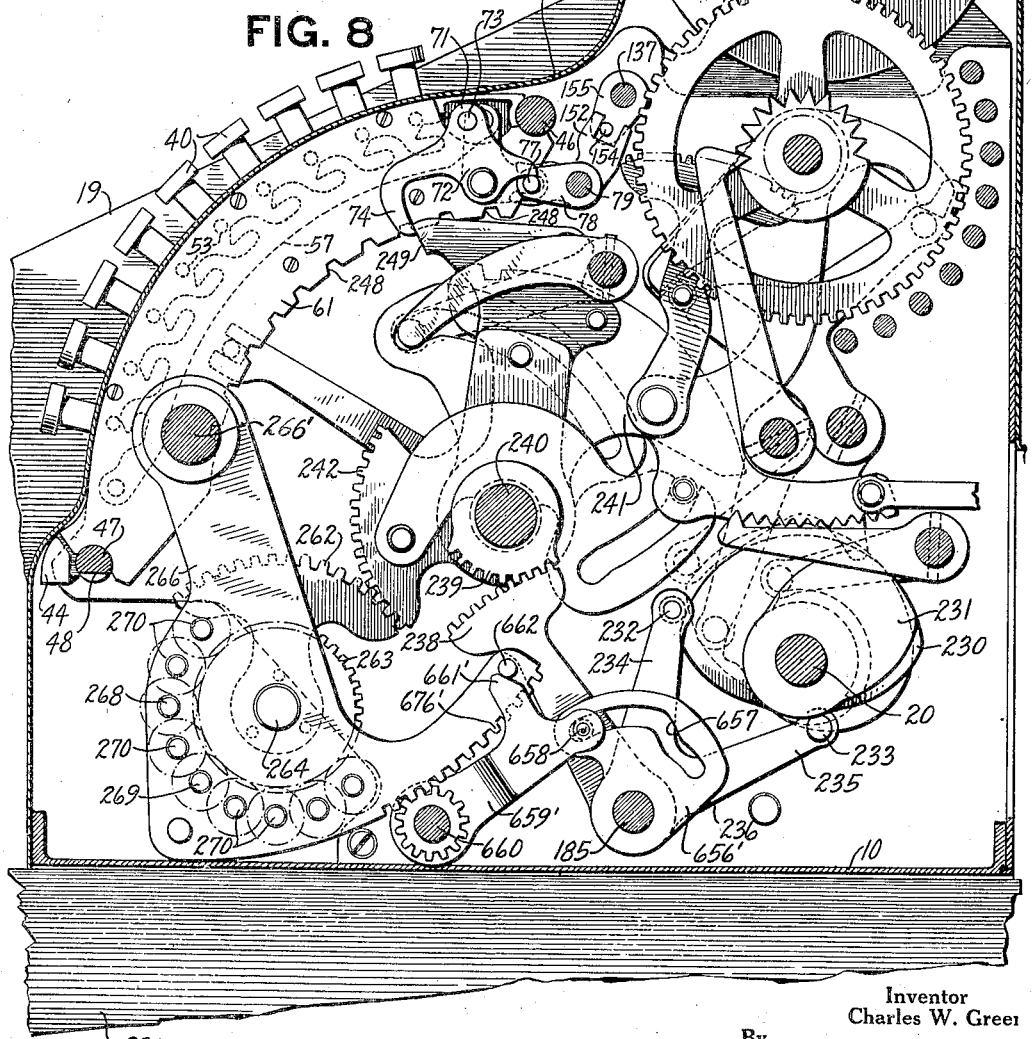
Fig. 8 is an elevational view taken on line 8—8 of Fig. 2.
Figure 12:
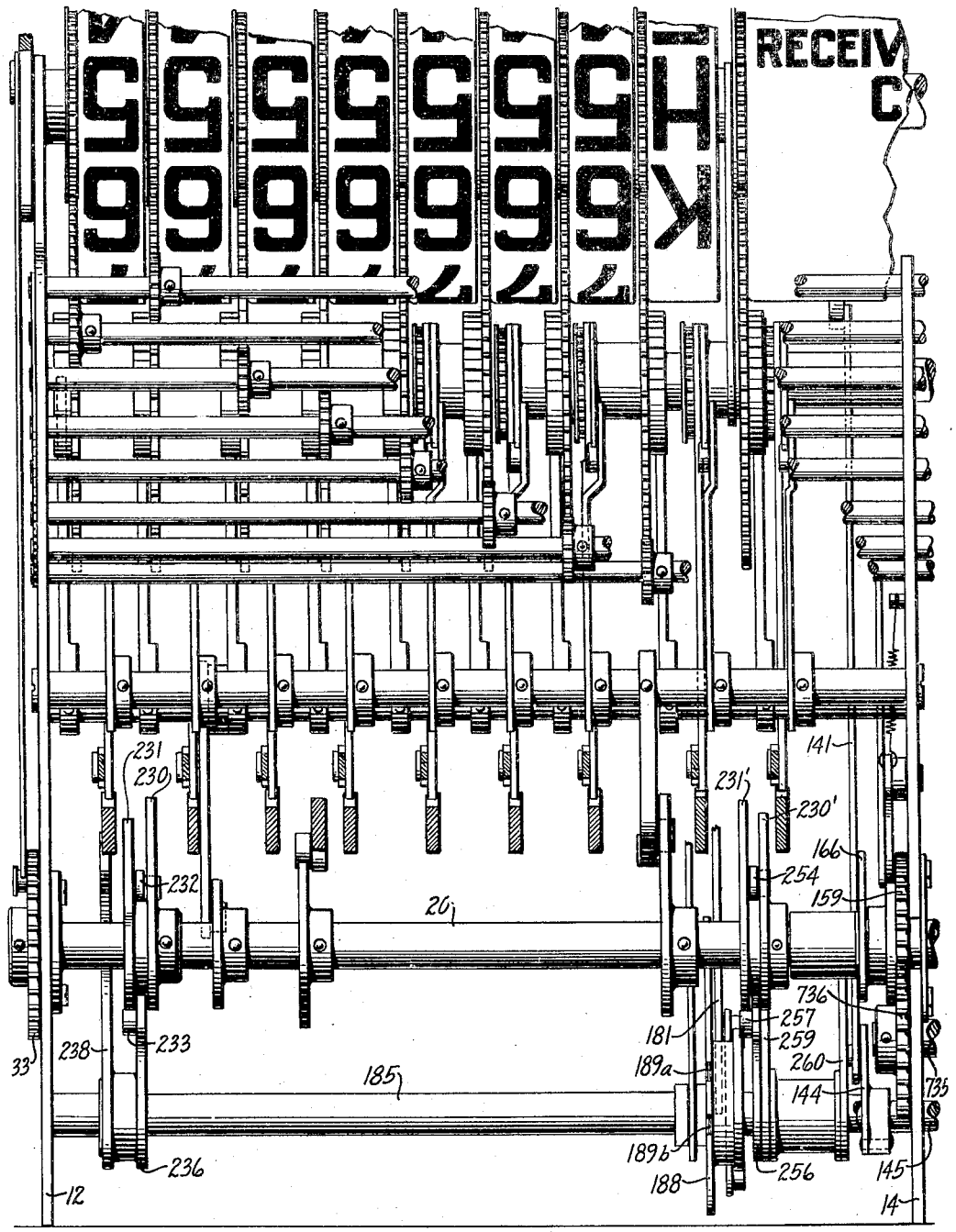
Fig. 12 is a partial rear elevational view showing the mechanisms located substantially to the rear of the differential mechanism.

The illustrated machine is provided with a mechanism for differentially positioning the various type carriers and actuating gears which mechanism is fully positive in operation. As is shown in Figs. 3, 4, 6, 8, 10 and 12, cams 230 and 231 are fixed to the main driving shaft 20 and cooperate with rollers 232 and 233 (Figs. 6, 10, and 12) provided, respectively, on arms 234 and 235 of a two-arm lever 236 loosely pivoted on shaft 185 (Figs. 8 and 10). Integral with lever 236 is a gear segment 238 which meshes with a gear segment 239 fixed to shaft 240. Also fixed to shaft 240 is a series of driving segments 241, one for each bank of amount keys.

Since the structure and operation of the driving segments and the differential mechanism associated therewith is the same for all of the amount banks of keys a description of the structure and operation of one will suffice for all. For the purpose of illustration, a description of the differential mechanism associated with the units bank of keys will be given. Loosely mounted on shaft 240 adjacent driving segment 241 is a differential segment 242.

As will be seen in Fig. 10, a pawl 245 pivoted to the upper portion of differential segment 242 at 245′ is provided with a depending projection 246 at the forward end thereof which normally engages in a notch 243 provided near the forward end of its related driving segment 241. The forward end of pawl 245 is also provided with a projection 247 which is adapted to engage in any one of a series of notches 248 provided on the corresponding differential latch retaining plate 61.

Fig. 8 shows the parts in normal position. In this position it will be noted that a nose portion 249 of differential segment 242 engages the depending arm 74 of the corresponding zero stop pawl 72. Thus, if no key in that bank is depressed, upon operation of driving shaft 20, cam 230 will rock lever 236 in a clockwise direction which, in turn, through segments 238 and 239 will rock the shaft 240 carrying all of the driving segments 241 in a counterclockwise direction. Immediately upon movement of shaft 20 as aforesaid, the differential segment 242 will be held against movement by the engagement of nose portion 249 thereof with the depending arm 74 of zero stop pawl 72 with the result that projection 246 (Fig. 10) of pawl 245 will be cammed out of the notch 243 in the segment 241, causing the upper projection 247 to enter into the first notch 248 in the differential latch retaining plate 61. The segments 241 continue their movement downwardly until they reach their limit of movement after which the cams 230 and 231 will return the segments to their normal positions.

It will be noted that the segments 241 are provided with a surface 244 (Fig. 10) which is concentric with shaft 240 and provided to engage beneath projection 246 of pawl 245 to positively retain the pawl in engagement with notch 248 during the invariable movement of the driving segment 241. Upon return of the driving segment to normal position, notch 243 will again register with projection 246 and pawl 245 will drop into engagement therewith by gravity.

When, however, a key is depressed in an amount bank, the depending arm 74 of zero stop pawl 72 will be swung out of engagement with nose 249 and the driver 241 associated therewith will carry the differential segment 242 downwardly until stopped by the particular key depressed.

When a key is depressed, a foot 58A (Fig. 10) on the segmental cam plate 58 associated therewith, will close the first notch 248 which normally is adapted to receive projection 247 of pawl 245 when the machine is operated and no key in the bank has been depressed. The lower end of each key has a cam face 250 and the forward end of each latch pawl 245 has a notch 251.

When a differential segment 242 is moved downwardly by its driving segment 241, the notch 251 provided in the associated pawl 245 will engage the end of the depressed key and will be cammed upwardly, as shown in Fig. 10, causing the upper projection 247 of pawl 245 to enter in a notch 248 adjacent the depressed key. In this manner the differential segment 242 will be disengaged from its driver 241, and will be held in adjusted position by virtue of the engagement of projection 246 of latch pawl 245 with the concentric surface 244 of the driver 241. During the same operation of the machine, each driver 241 will be returned to normal position, thereby causing the projection 253 provided at the forward end thereof to engage the projection 246 of its associated pawl 245. By this action projection 246 of pawl 245 will reenter notch 243 of its driving segment 241 and consequently, the associated differential segment 242 will also be returned to normal position.

During an item entering operation of the machine, the differential segments will first, be positively adjusted by their drivers a distance determined by the respective keys depressed, and then positively restored to normal position. Fig. 10 shows the parts associated with the pennies bank of keys in operated position when the five cent key has been depressed. The nose portion 249 of each differential segment 242 swings between a related retaining plate 61 and the key spring retaining plate 55 of the next adjacent key section. Thus, the differential segments are prevented from moving laterally.

The differential mechanism associated with the clerks' and transaction banks of keys is substantially the same as that associated with each of the amount banks with the exception that the drivers for the clerks and transaction differential segments are not restored to normal position simultaneously with the restoration of the drivers for the amount differential segments.

The clerks' and transaction banks of keys are not provided with zero stop pawls since the differential segments for these banks of keys will be operated for all transactions entered in the machine. For total taking operations the differential segments associated with the clerks' and transaction banks of keys will be held against movement by a mechanism which will be described hereinafter.

Figure 7:
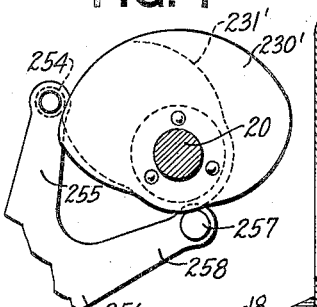
Fig. 7 shows the cams for operating the driving members for the clerks' and transaction differential segments.

Referring to Figs. 3, 4 and 11, it will be seen that cams 230′ and 231′ are provided for actuating the driving segments 241′ for the clerks' and transaction differential segments 242. As will be seen in Fig. 7, these cams engage rollers 254 and 257 provided on arms 255 and 258 respectively of the two-arm lever 256. Lever 256 is also loosely pivoted on shaft 185. Integral with lever 256 are actuating segments 259 and 260 which mesh with gear segments 259′ and 260′ attached respectively to the drivers 241′, see Figs. 11 and 12. Driving segments 241′ are loosely mounted on shaft 240.

When shaft 20 is rotated, the driving segments 241′ for the clerks' and transaction differential segments 242 will also be actuated to drive the differential segments the proper amounts. Cams 230 and 230' and 231 and 231' respectively are so designed that both the driving segments for the amount differentials and those for the clerks' and transaction differentials will be moved downwardly at substantially the same time.

However, as was pointed out before, the clerks' and transaction drivers will remain in their operated positions for a certain period while the drivers associated with the amount differentials are restored to normal position. During a later period in the operation of the machine, the drivers 241' will also be restored to normal position which, in turn, will restore their respective differential segments also to normal position.

Figure 2:
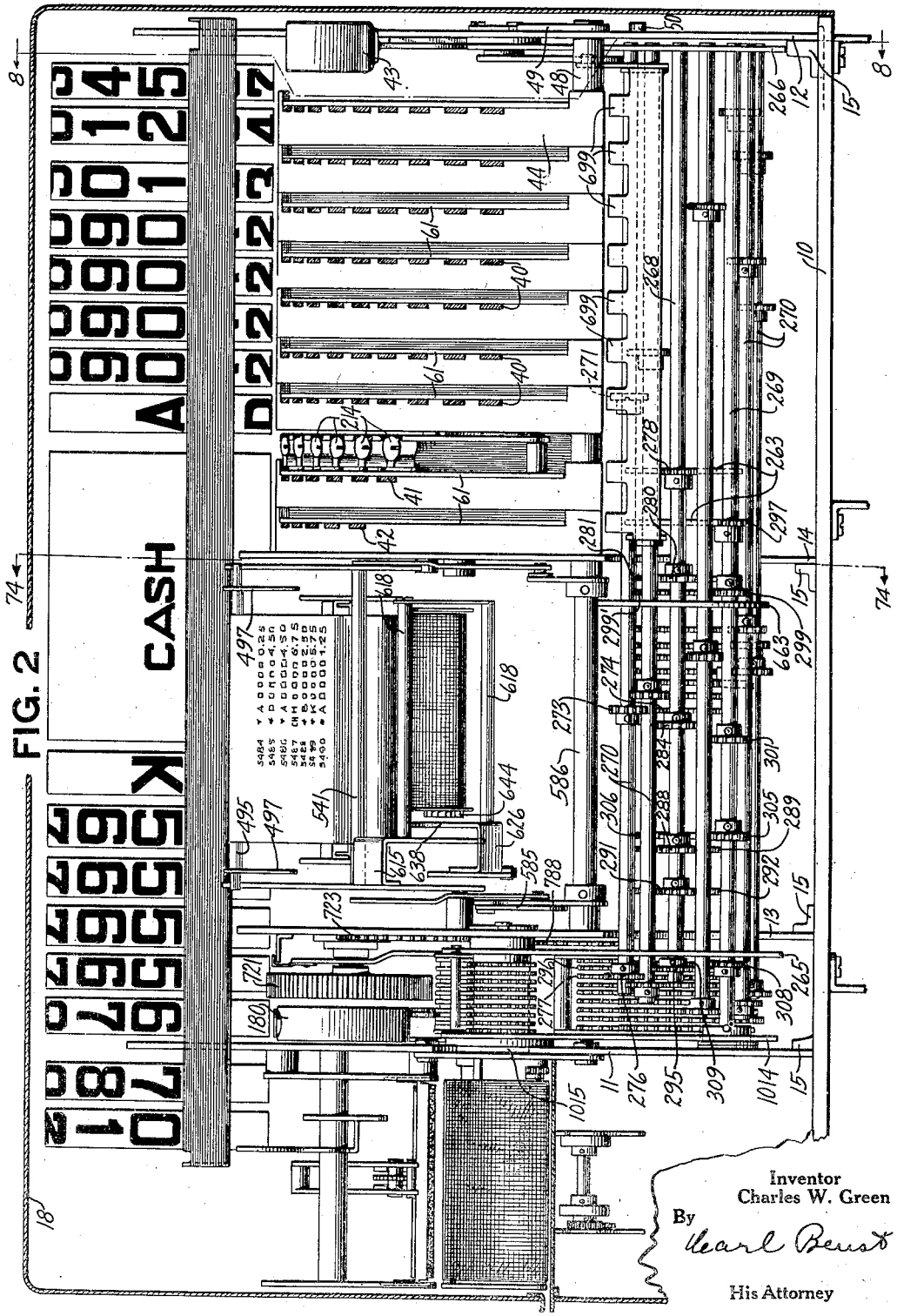
Fig. 2 is a front elevational view with the front portion of the cabinet removed, showing the general arrangement and location of various of the mechanisms contained in the machine.

Referring to Fig. 8 it will be seen that each differential segment 242 meshes with a segmental 262 which is fixed to a corresponding gear 263 loosely pivoted on a shaft 264 journaled in the frames 265, 266 and 1014 (Fig. 2). The transmission mechanism comprises nine shafts journaled in frames 265 and 266, which shafts are mounted in an arc about gears 263 (see also Figs. 94 and 95). Frames 265 and 1014 (Fig. 2) are pivoted around shaft 1012 (Fig. 95) while frame 266 is pivoted on a stud 266' (Figs. 8, 94 and 100) fixed to supporting frame 12 (Fig. 2) and in axial alignment with shaft 1012. As shown in Figs. 2 and 11, it is seen that shaft 268 is provided to transmit motion from the differential segment associated with the clerks' bank of keys while shaft 269 is provided to transmit motion from the transaction differential segment. The shafts 270 of the transmission mechanism transmit motion from their respective amount differential segments 242 to the various mechanisms later described.

Referring to Figs. 2, 3 and 11, it will be seen that the top shaft 270 is that associated with the tens of thousands bank of amount keys. Pinned to this shaft is a pinion 271 (Fig. 11) which meshes with a gear 263 loosely mounted on shaft 264, which gear in turn, has a segment 262 fixed thereto which meshes with the differential segment 242 for the tens of thousands bank of keys. Spaced from pinion 271 is a second pinion 273 which is also pinned to shaft 270. This pinion meshes with a gear 274 similar to gear 263, and is also loosely mounted on shaft 264. Gear 274 meshes with a large gear 275 (Fig. 3) provided in the totalizer reel for adjusting the item type carriers and for actuating the totalizer element for the tens of thousands denominational order.

Each shaft 270 associated with an amount differential segment 242 is provided with a similar set of pinions for actuating corresponding gears in the totalizer reel.

The shaft 268 (Fig. 2) associated with the clerk's differential segment 242 is provided with six small pinions fixed thereto. The first pinion 278 meshes with a gear 263 (Fig. 3) loosely mounted on shaft 264. Gear 263 has fixed thereto a segmental gear 262 which meshes with the differential segment 242 for the clerk's bank of keys. Spaced from pinion 278 on shaft 268 is a second pinion 280 also fixed to said shaft, which meshes with a gear 281, (Figs. 3 and 34) loosely mounted on shaft 264, which gear in turn meshes with gear segment 282 on the selecting plate 283 for selecting a clerk's totalizer for operation.

Spaced from pinion 280 is a third pinion 284 (Fig. 2) which meshes with a corresponding gear 285 (Fig. 3) loosely pivoted on shaft 264, which gear has fixed thereto a segmental gear 286 which meshes with a large gear 287 provided in the totalizer reel for adjusting the clerk's item type carrier.

Spaced from pinion 284 (Fig. 2) is a fourth pinion 288 which meshes with a corresponding gear 289 (Fig. 3) loosely pivoted on shaft 264, which gear in turn meshes with a gear segment 289' integral with selector plate 290 for selecting a special clerk's counter for operation.

Spaced from pinion 288 (Fig. 2) is a fifth pinion 291 which meshes with a corresponding gear 292 (Fig. 3) loosely pivoted on shaft 264, which gear has fixed thereto a gear segment 293, which meshes with a gear 294 associated with the drawer selecting mechanism (Fig. 86).

Spaced from pinion 291 is a sixth pinion 295 which meshes with a corresponding gear 296 loosely pivoted on sleeve 1016 (Fig. 95) on shaft 264, which gear meshes with a gear segment 1000 to position the clerk's type carrier associated with the check and slip printer.

From the description of the above mechanism, it is clear that when gear 263 (Figs. 2 and 3) is adjusted by the clerk's differential segment 242, shaft 268 will be rotated which in turn will cause the pinions described to rotate and transmit the motion from the differential segment 242 to the mechanisms just described.

The shaft 269 associated with the transaction differential segment 242 has five pinions fixed thereto, but only those relating to totalizer selection will be considered in this case. The first pinion 297 meshes with a corresponding gear 263 loosely pivoted on shaft 264 which gear has fixed thereto a gear segment 262 which meshes with differential segment 242 for the transaction bank of keys. Spaced from pinion 297 is a second pinion 299 which meshes with a corresponding gear 299' loosely mounted on shaft 264, which gear in turn meshes with a gear segment integral with selector plate 300 (Fig. 3) for the transaction totalizers.

Spaced from pinion 299 (Fig. 2) is a third pinion 301 which meshes with a corresponding gear 302 (Fig. 3) pivoted on shaft 264, which gear has fixed thereto a gear segment 303, which segment, in turn, meshes with a gear 304, which gear adjusts the transaction type carrier provided in the totalizer reel.

Spaced from pinion 301 is a fourth pinion 305 which meshes with a corresponding gear 306 pivoted on shaft 264, which gear meshes with a gear segment 307' provided on selector plate 307 associated with the special counters related to the transaction totalizers provided in the reel.

Spaced from pinion 305 is a fifth pinion 308 which meshes with a corresponding gear 309 pivoted on sleeve 1016 (Fig. 95) on shaft 264, which gear, in turn, engages a gear segment 1000 for adjusting a type carrier bearing transaction characters and associated with the check and slip printer, not shown in this case.

Thus, it is seen that when an amount key, a transaction key, and a clerk's key are depressed and the machine operated, the movement of the differential segments associated therewith will be positively transmitted to the various selecting mechanisms of the machine through the transmission line just described. For total taking operations the entire transmission line is swung out of engagement with the gears associated therewith by movement of the control lever to a total taking position. The mechanism for performing this function will be described in detail hereinafter.

It will be noted that the gears 287 and 304 (Fig. 3) provided in the reel for adjusting the clerks' and transaction type carriers, respectively, have a diameter slightly less than the gears 275 adjacent thereto. Gears 287 and 304 are constructed in this manner so as not to interfere with the totalizer elements to the left of those which are adapted to be engaged by the gears 275.

*Totalizer reel*

In the illustrated machine there are six clerks' totalizers 372 (Figs. 33 and 34), four transaction totalizers 373, and one grand totalizer 374. Adjacent each clerk's totalizer 372 is a special counter 372' for registering the number of times its respective totalizer has been selected for operation. Adjacent each transaction totalizer 373 is a special counter 373' for registering similar operations of the transaction totalizer. Adjacent the grand totalizer is a special counter 374' (Fig. 47) which registers the number of times the grand totalizer has been selected for operation.

Carried on a shaft 376 in the reel are a series of item type wheels 377 (Figs. 33 and 34), one for each denominational order, a clerk's type wheel 378 (Fig. 33), and a transaction type wheel 379. Adjacent the type carrier 379, as shown in Fig. 33, is a special counter 380 (Fig. 47) for registering the number of cash, received on account, and paid out transactions entered in the machine. A no sale counter 381 for registering the number of no sale operations of the machine is also provided in the reel. Fig. 34 shows the arrangement of the totalizers and the counters in the reel.

The A totalizer for registering the cash and received on account transactions effected by the A clerk is located substantially at the top of the reel. To the right thereof are arranged the B, D, E, H, and K totalizers for registering similar transactions effected by the B, D, E, H and K clerks, respectively. Next in order is the paid out totalizers for registering the total of the paid out transactions. Adjacent the paid out totalizer is the charge totalizer for registering the total of all charge transactions entered in the machine, and adjacent the charge totalizer is positioned the grand totalizer which registers the total of the cash and received on account transactions effected in the machine.

Next in order is the no sale counter for registering the number of no sale transactions effected in the machine. Next to the no sale counter is mounted the received on account totalizer for registering cash received on account transaction effected in the machine. Next in order is the cash totalizer for registering each cash transaction effected in the machine. Between the cash totalizer and the A totalizer is mounted the shaft 376 which supports the item type wheels 377, the clerks' and transaction type wheels 378 and 379, and the special consecutive counter 380.

The structure of the reel will now be described in detail. The reel in general is indicated by the reference numeral 375 and comprises a pair of spaced end plates 382 and 383. End plate 382 has fixed thereto a sleeve 384 which extends from the right-hand side thereof, as is shown in Figs. 37 and 69. A reduced portion of the sleeve 384 extends through an aperture in end plate 382, Fig. 37. Sleeve 384 is mounted on a shaft 386 which extends through the center of the reel and which is journaled in side frames 11, 13 and 14, in axial alinement with shaft 240, as shown in Figs. 3 and 69.

Fixed to the inner side of end plate 383 (Fig. 69) is a comparatively long sleeve 387 which extends through an aperture in said plate 383. The reduced portion of sleeve 387 extending to the right of end plate 383 receives the end of a sleeve 388. A screw 388a passing through the enlarged portion of sleeve 388 fastens the latter to shaft 386. The reduced portion 388' of sleeve 388 extends to the right of the enlarged portion just mentioned. A relatively long sleeve 389 is loosely mounted on shaft 386. The inner diameters of the end portions of this sleeve are enlarged to receive the reduced portions 385 and 388', respectively, of sleeves 384 and 388.

The actuating gears 275, 287 and 304, and the transfer plates 455, provided for actuating the totalizers and type carriers supported in the reel, are loosely mounted on sleeve 389. The purpose of providing this series of interconnecting sleeves is to permit shaft 386 to be removed without causing the inner mechanism supported thereby to drop out of engagement with the reel proper. When the shaft 386 is removed, the entire reel may be lifted from the machine as a unit.

The end plates 382 and 383 of the reel are rigidly connected by three tie bars 389'. The shaft 376 which supports the item type carriers 377 (Figs. 33 and 34), the special type carriers 378 and 379 (Fig. 34), and the consecutive number counter 380, extends through alined apertures 90 (Fig. 35) provided in the end plates 382 and 383. Each totalizer frame carries a stud 391 at the right-hand end thereof which is received in an aperture 392 provided in end plate 382. A similar stud 391 is provided at the left-hand side of each totalizer frame and is adapted to be inserted in a slot 393 provided in end plate 383. The lower end of each slot 393 is substantially circular in form and has a diameter slightly larger than that of the stud 391.

To properly place a totalizer frame in the reel, it is only necessary to insert stud 391 into its respective aperture 392 and then lower stud 391 at the left-hand end of the frame into the slot 393. A collar 394 (Fig. 54) is then placed on the stud 391 and pressed into the enlarged opening of the slot 393. This collar is held in place by any suitable means, such as a screw 393a. Thus, the totalizer frame is properly held in place. A notch 395 (Fig. 35) is provided adjacent each aperture 392 of end plate 382 for receiving the totalizer shaft 396 of a respective totalizer. A similar notch 397 is provided in plate 383 in alinement with notch 395. This permits the totalizer shaft 396 to be rocked into and out of engagement with the actuating gears 275. The particular construction of the totalizer and totalizer frame is of the well known type fully disclosed in the patent to Charles W. Green No. 1,793,795 and therefore will not be described in detail herein. All of the totalizer frames are placed in the reel in the manner just described. The no sale counter 381 (Figs. 47 and 48) is supported in a bracket 381' fixed to end plate 383 (Fig. 48).

The mechanism for selecting and engaging the totalizers with the actuating gears 275 will now be described in detail. The totalizer selecting mechanism provided in the illustrated machine is so constructed that for certain transactions a clerk's, a transaction, and the grand totalizer will be selected and simultaneously engaged with the actuating gears 275. For other transactions, only a transaction totalizer will be engaged with the actuating gears 275, mechanism being provided for holding out the selected clerk's totalizer and the grand totalizer for such transactions.

The selecting mechanism is of such a character that by slightly modifying the same any number of the totalizers may be selected and simultaneously engaged with the actuating gears. For the purpose of illustration, however, the mechanism shown is capable of causing simultaneous operation of one or three of the totalizers.

Referring to Fig. 2, it will be seen that after depressing a key in each group and then releasing the machine for operation, the movement of the differential segment 242 associated with the clerk's bank of keys will be transmitted through shaft 268 and pinion 280, which pinion as has been described hereinbefore, engages a gear 281 of the transmission line. Gear 281 meshes with a gear segment 282 (Fig. 34) integral with selector plate 283 for clerks' totalizers. This selector plate (Figs. 34 to 42) is provided with a series of radially extending projections 398, one for each clerk's totalizer. Each projection 398 is adapted to be positioned beneath an ear 399 formed on a related rock arm 400 which pivots about a stud 401 (Fig. 34) fixed to end plate 382. When a projection 398 registers with a related ear 399 the associated rock arm 400 is prevented from rocking in a clockwise direction about its pivot 401. A floating lever 402 is pivoted at the upper end thereof at 403 to a related arm 400. The other end of lever 402 (Fig. 35) is provided with a laterally extending stud 404 which is adapted to engage in a corresponding radial notch 405 provided in plate 406. A cam slot 407 is provided intermediate the ends of lever 402 and receives a pin 408 mounted intermediate the ends of an arm 409 (Fig. 42), which arm is pivoted on plate 410 at 411. The upper end of arm 409 is provided with a closed cam slot 412 which receives the right-hand end of a corresponding totalizer shaft 396.

There are a series of such arms 409 pivoted on plate 410, one for each clerk's totalizer. There is also a similar arm 413 pivoted near the lower end of plate 410 for the grand totalizer. The plate 410 is normally latched to end plate 382 by the following mechanism.

Referring to Figs. 35, 40 and 42, it will be seen that an L-shaped slot 414 is provided in end plate 382 which slot is adapted to receive one end of a stud 415 fixed to an arm 416 pivoted at 417 to plate 410. Pivoted on a stud 418 extending outwardly from end plate 382 is a plate 419. This plate is provided with an open slot 420 at the free end thereof which receives pin 415. A stud 421 is also provided on plate 419 which projects into a cam slot 422 formed in plate 428' which is fastened to plate 300, as shown in Figs. 35 and 38. It will also be noted that pin 415 extends through the arm 416 and is adapted to engage in a notch 423 provided in plate 406. When, however, stud 415 is moved to the upper portion of slot 414, the projecting portion thereof will be moved out of engagement with notch 423. The selector plate 300 for the transaction totalizers is also provided with a series of radial projections 398', each of which is adapted to be positioned beneath an ear 399 of a corresponding rock arm 400'.

It will also be noted that the rock arms 400', levers 402', and the associated parts are similar in construction to those described in connection with the clerks' totalizers and, therefore, it will not be necessary to describe these parts in detail.

The arms 409 associated with the transaction totalizers, however, function in a slightly different manner from the arms 409 associated with the clerks' totalizers. In Figs. 35, 40 and 42, it will be seen that the arms 409 associated with the transaction totalizers are pivoted to end plate 382 at 424. These arms are attached to plate 382 because it will be remembered that a transaction totalizer will always be rocked into engagement with the actuating gears 275 regardless of whether a clerk's totalizer or the grand totalizer is rocked into engagement therewith.

The grand totalizer 374 is always selected for operation in spite of the fact that for certain transactions it is held out of engagement with the actuating gears. No projection 398 is provided on the selector plates for this totalizer. Instead, a laterally projecting pin 425 is provided on end plate 382, which projection is always in engagement with the ear 426 provided on rock arm 427, as shown in Figs. 34, 40 and 42. The other connections cooperating with rock arm 427 are similar to those associated with the clerk's totalizer and need not be further described.

Referring to Figs. 36 and 37, it will be seen that a circular plate 428 is attached to selector plate 283 by screws or rivets. This plate is provided with a plurality of notches 429, one of which is positioned adjacent each totalizer shaft 396 when that totalizer is selected for operation. It will be noted that this plate has a diameter slightly less than that of the concentric portion of the selector plate 283. A similar plate 428' is fixed to the selector plate 300 associated with the transaction totalizers and also is provided with a similar series of notches 429', see Fig. 38. These notches are provided to receive the end of a selected totalizer shaft when the latter is rocked into engagement with the actuating gears 275. As shown in Figs. 35, 44 and 45, a cam shaft 430 is journaled in end plates 382 and 383, a portion thereof extending beyond the outer extremities of plate 382.

Companion cams 431 and 431' are fixed to shaft 430 (Figs. 34 and 40), and are adapted to cooperate with pins 435 and 436, respectively, attached to plate 406. When shaft 430 is rotated by a mechanism which will be described in detail hereinafter, plate 406 will first be rocked in a counterclockwise direction, which movement causes engagement of selected totalizers with the actuating gears 275. Later, during the same cycle of movement of shaft 430, plate 406 will be rocked in the reverse direction and thereby disengage the selected totalizers from their actuating gears.

The operation of the various mechanisms just described is as follows:

Upon depression of a key in each group and of the motor bar, the differential movement of the segments 242 (Fig. 8) associated with the various banks of keys will be transmitted through the transmission line to the actuating gears 275 (Fig. 3), 287 and 304 of the reel. The motion of the differential segments 242 associated with the clerks' and transaction banks of keys, respectively, will also be transmitted to selector plates 283 and 300 respectively (Fig. 35), thereby adjusting these plates to bring a projection 398 and 398' respectively, beneath the ears 399 of rock arms 400 and 400' (Fig. 34), associated with the clerks' and transaction totalizers.

If the transaction be cash or received on account, both the selected transaction totalizer and the selected clerk's totalizer will be rocked into engagement with the actuating gears. The grand totalizer 374 will also be rocked into engagement with the actuating gears for these transactions.

After selector plates 283 and 300 (Fig. 35) have been positioned as aforesaid, shaft 430 will be rotated, causing the companion cams 431 and 431' to rock plate 406 (Figs. 34 and 40) in a counterclockwise direction. By this action levers 402 of the totalizers to be engaged will be rocked in a clockwise direction about their pivots 403 since their respective rock arms 400 are held against clockwise movement. Cams 407 provided in the respective levers 402 engaging pins 408 will rock arms 409 for the selected clerk's and transaction totalizers, and arm 413 for the grand totalizer in a counterclockwise direction about their pivots 411 and 424 (Fig. 42), with the result that cams 412 provided at the upper ends thereof will cam totalizer shafts 396 downwardly to bring the gears attached to the totalizer wheels into engagement with their related actuating gears 275.

If, however, the transaction is paid out or charge, selector plate 300 (Fig. 38) will be moved a greater distance in a counterclockwise direction causing the cam portion of slot 422 provided in plate 428' attached thereto, to rock plate 419 (Fig. 42) downwardly about its pivot 418 with the result that the pin 415 on arm 416 will register with the elongated portion of slot 414 (Fig. 35) provided in end plate 382. At the same time, the portion of pin 415 projecting from the opposite side of arm 416 will enter into notch 423 of plate 406 (see also Fig. 40).

The plates 406 and 410 are coupled together and will move in unison when the machine is operated with the result that arms 409 for the clerk's totalizers and 413, which it will be remembered are pivoted to plate 410, will rock about their totalizer shafts 396 as pivots. It is therefore seen that cam slots 412 provided at the upper ends of arms 409 and arm 413, respectively, will be rendered ineffective to cam their respective totalizers into engagement with the actuating gears.

As stated before, the plates 428 and 428' (Figs. 36 and 38) attached respectively to selector plates 283 and 300 are provided with notches 429 and 429' respectively. These notches are adapted to register with the totalizer shafts of the selected clerk's and transaction totalizers, respectively, so that when plate 406 (Fig. 40) is rocked in the manner just described, the end portion of the shafts for the selected totalizers will enter these notches.

All of the other shafts of the unselected clerk's totalizers however will ride on the concentric portion of plate 428 (Fig. 36) while the shafts of the unselected transaction totalizers will ride on the concentric portion of plate 428' (Fig. 38). Thus, it is seen that these totalizers will be positively held out of engagement with the actuating gears.

It is understood that the radial projections 398 (Fig. 36) provided on selector plate 283 are so arranged that only one will register with its respective ear 399 provided on rock arm 400 when the selector plate is differentially adjusted. All of the other projections will be out of registering position with their respective ears 399. The same is true with respect to the projections 398' (Fig. 38) provided on selector plate 300.

Consequently, when plate 406 is rocked in the manner aforesaid, rock arms 400 and 400' for the unselected totalizers will not be held against movement by their respective projections 398 and 398', with the result that these arms 400 and 400' will be rocked in a clockwise direction about their respective pivots (see Fig. 40).

As stated before, the totalizer shafts for the unselected totalizers will not register with the notches 429 or 429' of plates 428 and 428', but engage the concentric portions thereof and thus are positively held out of engagement with the actuating gears. It is clear however, that if rock arms 400 and 400' were not permitted to move in a clockwise direction when their respective totalizers are not selected for operation, damage to the parts would result when plate 406 is rocked to engage the selected totalizers with the actuating gears 275 due to the camming action of cam slots 407 provided in the floating levers 402 acting upon their related pins 408 fixed to arms 409.

Referring to Fig. 36, it will be seen that the radially extending projections 398 on selector plate 283 are so arranged that when this plate is moved through substantially 3° in a counter clockwise direction as viewed in Fig. 36, the first projection 398 will register with the ear 399 associated with the A totalizer. When the selector plate is moved through substantially 6°, the second projection 398 will register with ear 399 associated with the B totalizer, and when plate 283 is moved through substantially 9°, the third projection 398 will register with the ear 399 associated with the D totalizer. Thus, it is seen that any one of the six clerk's totalizers may be selected by moving selector plate 283 from 3° to 18°. Fig. 38 shows the positions to which the selector plate 300 for the transaction totalizers may be adjusted to select any one of these totalizers for operation.

When selector plate 300 is moved through substantially 3° in a counter clockwise direction the cash totalizer will be selected for operation. When this plate is moved through substantially 6°, the received on account totalizer will be selected, when moved through substantially 9°, the charge totalizer will be selected, and when the plate 300 is moved through substantially 12°, the paid out totalizer will be selected.

From the construction of the plates 283 and 300, it is clear that only the ears 399 on rock arms 400 and 400' for the selected totalizers will register with their respective projections 398 and 398'. All of the other projections 398 and 398' will be positioned out of registering position with their ears 399. Consequently, arms 400 and 400' for the unselected totalizers will be caused to rock in a clockwise direction about their respective pivots and only the selected totalizers will be engaged with the actuating gears. It will also be noted that each rock arm 400 and 400' is provided with a projecting portion 430' (Fig. 40) which is adapted to engage over its respective totalizer shaft 396. These projections are provided to prevent overthrow of arms 400 when the parts just described are restored to normal position.

*Special counters*

The mechanism for selecting and operating the special counters will now be described in detail. Referring to Figs. 44 to 49, it will be seen that a counter operating plate 451 (Figs. 46 and 45) is pivotally mounted on sleeve 387, and lies adjacent to the outer side of end plate 383 of the totalizer reel 375. Adjacent operating plate 451 is a disc 432 provided with a series of radial slots 433 around its periphery, one for each counter provided in the reel. Disc 432 is fastened to end plate 383 by three screws 434, as best shown in Fig. 44. Suitable apertures 434' are provided in operating plate 451 for receiving screws 434 so that plate 451 may be oscillated the proper amount to operate the counters. Close to disc 432 and also pivotally mounted on sleeve 387 is a selector plate 290 for selecting the counters 372' associated with the clerk's totalizers.

Between selector plate 290 and disk 432 is a selector plate 307 for selecting the counters 373' associated with the transaction totalizers; also for selecting the counter 374' associated with the grand totalizer, the no sale counter 381 and the consecutive number counter 380. It will be remembered that pinion 388 fixed to shaft 269 of the transmission line engages with a corresponding gear 289 loosely mounted on main shaft 264 of the transmission line. Gear 289 meshes with a segmental gear 289' integral with selector plate 290.

The movement imparted to the differential segment 242 (Fig. 6) associated with the clerks' bank of keys will be transmitted through the series of connections just described to selector plate 290 and will position the latter a corresponding amount. Selector plate 290, like selector plate 283 (Fig. 35) for the clerks' totalizers, is provided with a series of radially extending projections 437. Each projection 437 is adapted to register with a respective pin 438 provided on an associated floating operating lever 439 (Figs. 44 and 46); there being one such lever provided for each clerk's counter 372'. Each lever 439 is positioned between plate 451 and disc 432 and is so positioned that its pin 438 engages in a corresponding slot 433 provided in disc 432. The lower arm 440 of lever 439 is provided with an L-shaped slot 441 which receives a corresponding pin 442 provided on the operating plate 451. The arm 443 of each lever 439 is provided with a pin 444 which operates in a slot 445 provided in a related counter operating bail 446. The lever 439 and the associated mechanism shown at the top of Fig. 47 is that provided for the counter 372' positioned on the shaft 396 supporting the A totalizer 372.

From the description of the above parts it is seen that when, for example, the A key has been depressed, selector plate 290, upon operation of the machine will be moved through substantially 3° bringing the first projection 437 thereon beneath the pin 438 of lever 439 for the A counter. The projection 437 forms a fulcrum for the lever 439. Thus, upon a further operation of the machine plate 451 will be rocked in a clockwise direction as viewed in Fig. 46 or a counter-clockwise direction as viewed in Fig. 47, causing pin 442 to rock lever 439, which in turn will rock the actuating bail 446 to register a unit in the A counter. When arm 439 has been fully operated pin 444 will assume a position in axial alinement with stud 391 supporting the totalizer frame and about which the totalizer frame is swung to cause engagement and disengagement of the totalizer with the actuators.

As has been stated heretofore, a counter will be operated if selected, regardless of the fact of whether its associated totalizer is rocked into engagement with the actuating gears; for instance, when any of the clerks makes a charge sale, the respective clerk's totalizer is kept out of engagement from the actuating gears 275, however, the associated consecutive counter will add one.

From the construction of the parts just described, it will be seen that the pins 444 provided on arms 443 will traverse slots 445 provided in the corresponding bails 446 each time levers 439 are rocked to actuate their counters.

Considering now an operation of this mechanism when a totalizer shaft 396 has been rocked downwardly to engage the totalizer supported thereby with the actuating gears 275. Upon movement of the shaft 396 downwardly bail 446 will also be moved downwardly thereby causing pin 444 to traverse slot 445 a slight distance.

When the parts are in this position and plate 451 is rocked in the manner stated above, lever 439 will be moved in the same manner as stated before causing pin 444 to again assume a position in axial alinement with stud 391. This movement of arm 439 will operate bail 446 to again operate the counter to register a unit therein. Whether the selected totalizer is in normal position or in the position assumed when in engagement with the actuating gears, its associated lever 439 is given an invariable degree of movement which brings its pin 444 in to axial alinement with stud 391 of the associated totalizer frame.

It is therefore clear that a unit will be added in a selected counter regardless of the fact of whether the totalizer shaft is in normal position or has been rocked downwardly into engagement with the actuating gears. The operation of these parts when the projection 437 has not been brought into registering position with stud 438 will now be described.

When the B totalizer, for example, has been selected, the projection 437 associated with the A totalizer will be moved substantially 3 degrees beyond its stud 438 bringing the projection 437 for the B totalizer into registering position with respect to its related stud 438.

When the parts are in this position the B counter will register but the operating mechanism for the A counter is disabled. During an operation of the machine, when the parts are in this position, pin 442 (Figs. 45 and 46) associated with A counter will traverse the L-shaped slot 441 when plate 451 is rocked, thus camming its associated lever 439 downwardly. The movement of lever 439 in this manner is guided by pin 438 thereon operating in its related radial slot 433 provided in disc 432. Consequently, the bail 446 associated with the A counter will not be rocked to cause the registration of a unit therein.

As has been stated heretofore, pinion 305 mounted on shaft 269 of the transmission line cooperates with a gear 306 in the transmission line (Figs. 2 and 47) which gear, it will be remembered, is loosely mounted on shaft 264. Gear 306 meshes with a gear segment 307' integral with selector plate 307.

When a transaction key is depressed and the machine is subsequently operated the movement of the differential segment 242 associated with the transaction bank of keys will be transmitted through the connections just described causing selector plate 307 to be positioned an amount commensurate with the particular transaction key depressed. Selector plate 307 is also provided with a series of radial projections 447 for selecting the counters associated with the transaction totalizers for operation.

It will be noted that selector plate 307 is also provided with a broadened projection 448. This projection is adapted to register with a pin 438' of lever 439' (Fig. 44) for operating the counter 374' (Fig. 47) associated with the grand totalizer. Projection 448 is constructed in this manner so that the counter 374' will be selected for cash, received on account, charge and paid out transactions.

When a projection 447 registers with a pin 438' provided on lever 439' for any transaction counter, the projection 448 will also register with a pin 438' (Fig. 38) on a lever 439' associated with the counter 374' associated with the grand totalizer 374. For no sale transactions, however, the broad projection 448 will not be brought into registering position with respect to the pin 438' on lever 439' associated with the counter 374'. Special counter 374', therefore, is arranged to give the number of times the transaction counters have been selected, and by varying the width of tooth 448 counter 374' may be made to accumulate the number of times any one, two or more of the transaction counters have been selected for operation. Plate 307 is also provided with projections 449A and 449B (Fig. 47) which are adapted to register with a pin 438' provided on a lever 439' for the consecutive counter when the cash, received on account or paid out totalizers and their counters respectively, are selected for operation.

As shown in Fig. 49, the no sale counter 381 is supported in a bracket 381' fixed to end plate 383. The shaft supporting this counter is the same radial distance from the reel shaft 386 as are the respective shafts supporting the clerk's and transaction totalizers.

Referring to Fig. 47, it will be seen that projection 449A on selector plate 307 is broader than projections 447. The purpose of constructing projection 449A in this manner is to cause selection of the consecutive number counter 380 when either the counter 373' for the cash totalizer or the counter 373' for the received on account totalizer is selected for operation. The projection 449B provided on selector plate 307 is provided for selecting the consecutive counter 380 for operation when the counter 373' for the paid out totalizer is selected for operation.

It will also be seen from Fig. 47 that there is a space between projections 449A and 449B. This space is provided for disabling the operating mechanism for consecutive counter 380 when the counter 373' for the charge totalizer is selected for operation.

The consecutive number counter 380 will be selected for operation when either a counter 373' associated with the cash, received on account or paid out totalizer is selected for operation. From the construction and arrangement of the projections 447, 448 and 449 provided on selector plate 307, it is seen that for a "cash" transaction, the counter 373' associated with the cash totalizer, the counter 374' associated with the grand totalizer and the consecutive number counter 380 will all be selected for operation.

For a "received on account" transaction, the counter 373' associated with the received on account totalizer, the counter 374' and counter 380 will all be selected for operation.

For a "charge" transaction, selector plate 307 will only select the counter 373' associated with the charge totalizer and the counter 374' for operation, but it will not select the consecutive number counter 380 for operation.

For a "paid out" transaction, selector plate 307 will select the counter 373' associated with the paid out totalizer, the counter 374', and again the counter 380 for operation.

For a "no sale" transaction, selector plate 307 will only select the no sale counter for operation.

Selector plate 290 for the counters 372' associated with the clerks' totalizers will select a clerk's counter for all operations of the machine with the exception of the total taking operations.

A clerk's totalizer will also be selected for operation for all no sale, paid out and charge transactions, as well as for cash and received on account transactions. Each of the special counters has fixed adjacent to its registering wheels, a special type carrier 450 (Fig. 33) which identifies its respective counter. The stationary disc 432 (Fig. 46), as was stated before, is fixed to end plate 383 and contains a series of radial slots 433, one slot 433 being provided for receiving each stud 438 or 438' provided on arms 439 or 439' associated with each of the counters provided in the reel. The plate 431 is also common to all of the counters in the reel and is provided with a pin 442 for each counter.

Upon operation of the plate 451, all selected counters will be simultaneously operated. Fixed on plate 451 are a pair of studs 452 which extend through arcuate slots 453 provided in end plate 383. These studs are engaged by companion cams 454 and 454', as shown in Figs. 45 and 46. Companion cams 454 and 454' are fixed to the reel cam shaft 430 and are located in close juxtaposition to the inner side of end plate 383.

Upon rotation of shaft 430 companion cams 454 and 454' will engage studs 452 and at the proper time oscillate plate 451 to rock all of the levers 439 and 439' associated with the selected counters in the manner aforesaid to cause simultaneous registration of a unit in all of these counters.

*Transfer mechanism*

The transfer mechanism for carrying a unit from a lower denominational order wheel to the next higher denominational order wheel is similar in specific construction to that shown in U. S. Patent to Charles W. Green, No. 1,793,795, and therefore, it will be necessary to explain this mechanism in a general way only.

As shown in Figs. 3, 50, 51, 53, 56, 59 and 69, a series of transfer operating plates 455 (Figs. 50 and 51) are alternately arranged between the actuating gears 275 for the totalizers and item type carriers. These plates 455 like the actuating gears 275 are loosely pivoted on sleeve 389. There is one plate 455 common to the similar denominational order wheels of all of the totalizers. Each plate 455 carries a series of laterally projecting studs 456, one for each transfer arm 457'.

As is clearly shown in Fig. 53, a stud 456 operates in a slot 457 provided at the lower end of a corresponding transfer arm 457'. Mounted on cam shaft 430 are a series of companion transfer cams 458 and 458', one for each plate 455. Cams 458 and 458' engage rollers 459 and 459' respectively, attached to a corresponding plate 455.

Fig. 56 shows the cams 458 and 458' for actuating transfer arms 457' between the units and tens order, while Fig. 59 shows the cams 458 and 458' associated with the transfer plate 455 for actuating the transfer arms between the ten thousandths order and the hundred thousandths order of each totalizer. These cams 458 and 458' are arranged spirally along shaft 430 so that transfers will be effected from the lowest denominational order wheel to the highest denominational order wheel in seriatim. The mechanism is so arranged that these cams will be effective to cause transfers to be made upon disengagement of the totalizers from their actuating gear 275 after an item has been entered therein.

As is usual in constructions of this character the gears 377' (Figs. 50 and 51) attached to the item type wheels 377 as well as the gears 378' and 379' (Fig. 33) connected to the clerk's and transaction type wheels 378 and 379 are constantly in mesh with the actuating gears 275, 287 and 304 (Fig. 3) respectively, and are moved to adjusted position and then returned to normal position at each operation of the machine.

In order to cause an even line of print to be made from these type carriers, an alining mechanism is provided. As shown in Figs. 54 and 55, an aliner 461 is mounted on a two-arm lever 462 which is pivoted on a stud 463 fixed to end plate 333. The rearwardly extending arm of lever 462 is pivoted to the upper end of a pitman 464 at 463'. The lower end of pitman 464 is provided with a hook-shaped portion 466 which straddles cam shaft 430. A stud 467 is provided at the lower end of pitman 464 which stud is adapted to coact with a cam 468 fixed to shaft 430.

The parts are so constructed that when the type carriers 377 etc. have been properly positioned by their actuating gears, cam 468 will move pitman 464 downwardly, thereby rocking the aliner fingers 461 into engagement with the gears 377', 378' and 379' bringing all of the type carriers into proper printing alinement.

After printing has been effected it is seen that the raised portion 469 of cam 468 will clear stud 467 and the aliner 461 will be moved out of engagement with these gears by gravity or by a spring not shown. It may be stated here that all of the totalizers, and counters contained in the reel, are provided with raised type so that printing may be effected directly therefrom when brought to proper printing position.

Referring to Figs. 32 and 51, it will be seen that journaled in the plate 14 opposite the end of shaft 430 is an intermediate gear 470 which is coupled to shaft 430 by means of a slotted hub portion 470a and studs 431a on the operating plate 451 fast to shaft 430. This connects the cam shaft 430 for movement with gear 470 which meshes with gear 162, which gear as was stated before, is driven by gear 159, fixed to the main driving shaft 29, through idler gear 160 and the gear 161 fixed to the gear 162. Gears 162 and 470 are so designed that cam shaft 430 will be rotated the proper distance and at the proper time to perform various functions which will now be summarized.

When the machine is operated cam shaft 430 will not be rotated until after the actuating gears 275, 287 and 304 (Fig. 3) have been positioned by the differential segments 242 (Fig. 8) through the transmission line heretofore described. When these gears have been properly positioned cam shaft 430 will be rotated clockwise a slight amount to cause cam 469 (Figs. 54 and 55) to engage stud 467 and thereby rock the aliners 461 into engagement with gears 377', 378' and 379' (Fig. 33).

Printing is now effected from these type carriers. At substantially the same time cams 431 and 431' (Figs. 34 and 35) will engage studs 435 and 436 to rock selecting plate 406 which will cause engagement of the selected totalizers with the actuators. Shortly after, upon further movement of the cam shaft 430, cams 454 and 454' will engage studs 452 provided on counter operating plate 451 to cause a unit to be added into each of the selected counters. Later in the cycle of movement, cams 431 and 431' (Fig. 34) will be further moved to rock plate 406 in the opposite direction to disengage the totalizers from their actuating gears.

Upon continued movement of cam shaft 430, the transfer cams 458 (Figs. 51, 56, and 59) and 458' will become effective to operate the transfer plates 455, which plates in turn will operate transfer arm 457' (Fig. 53) seriatim to effect carrying from the lower denominational wheels to the higher order wheels.

In the manner described above, all of these functions are performed upon one complete rotation of the cam shaft 430. This shaft is so timed that it will make a complete rotation in substantially the same time that the main rotation shaft 29 has been moved through one complete rotation. These shafts are not simultaneously operated, however, but each performs all of its functions during one complete rotation thereof, and they are brought to rest at substantially the same time.

*Printing mechanism*

The mechanism for effecting printing upon the record strip is mounted in unitary supports and is so constructed that it may be readily placed in the machine or removed therefrom as a unit. This mechanism is adapted to print from both the item type carries and from each of the totalizers and special counters mounted in the reel.

Referring particularly to Figs. 74 to 76 and 82 to 85 inclusive, it will be seen that the printer is provided with two side frames 475 and 476 (Fig. 75). To rigidly hold these side frames in proper spaced relationship, three tie rods 477 (Figs. 75 and 85) are provided. Each side frame is provided with a notch 478 (Fig. 85) near the top rearward end thereof which is adapted to engage a supporting rod 479 journaled in intermediate supporting frames 13 and 14 (Fig. 75). Rod 479 has formed therein a pair of peripheral grooves for receiving the narrow portion of each notch. A collar 480 (Fig. 75) is pinned to rod 479 near the left hand end thereof, the inner end of which lies adjacent the groove provided in rod 479 for receiving the notch 478 provided in side frame 476. A spacing collar 482 is also pinned to rod 479 and extends inwardly from supporting frame 14; the inner end thereof being spaced to the right of the groove for frame 475 a distance equal to the width of the frame. It will be noted that the inner end of each notch 478 is substantially circular in form, the diameter of which is substantially the same as that of rod 479.

From the construction of the parts just described, it is clear that when it is desired to assemble the printer frame in the machine proper, it is only necessary to insert the narrow portion of the notches onto the grooves formed in rod 479 and then slide the printer frame slightly to the right so that the enlarged portions of the notches will embrace rod 479. This movement is stopped when side frame 475 engages the inner end of spacing collar 482.

In order to prevent any lateral movement of the printer frame after it has been placed on rod 479, a manually operable latch 481 (Fig. 75) is provided. This latch is pivoted on the outer side of frame 476 near the top rearward end thereof, and is provided with a hook portion having a thickness substantially equal to the width of one of the peripheral grooves. After the printer frame has been placed on rod 479 and slid to the right in the manner just described, latch 481 is moved downwardly to bring the hooked portion thereof into the peripheral groove adjacent side frame 476, as seen in Fig. 75. The printer frame is thus positively locked against lateral movement by the latch 481 and also against any movement away from rod 479 by virtue of the notches 478 embracing shaft 479 proper.

As seen in Fig. 76, a comparatively large notch 483 is provided at the lower forward end of side plate 475. A similar notch 485 (Fig. 85) is provided in the lower side of side frame 476. These notches receive supporting studs 484 and 486 respectively, projecting from supporting frames 14 and 13. In order to prevent any rocking movement of the printer about rod 479, a latch 487 (Fig. 85) is provided. This latch is pivoted to side frame 476 at 488 and is provided with a hook portion 489 at the lower end thereof which is adapted to embrace stud 486 projecting inwardly from frame 13. Thus, it is seen that the forward end of the printer frame is rigidly held in position.

Figure 80:
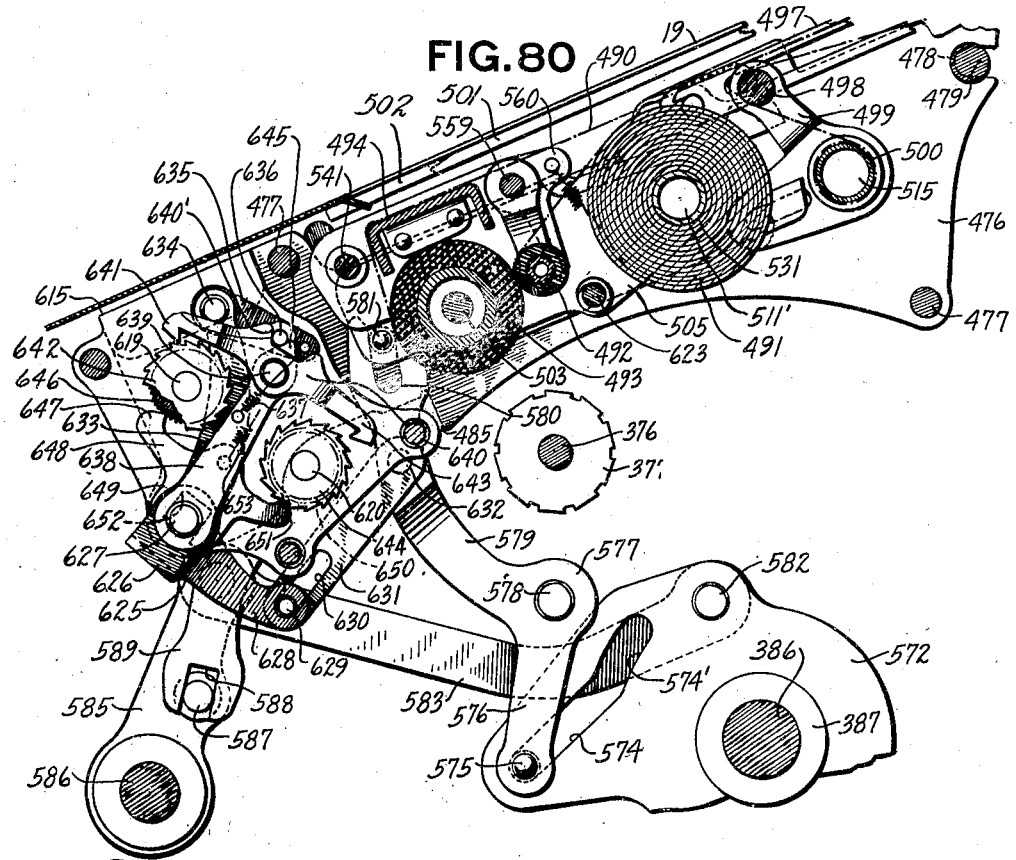
Fig. 80 is a section substantially on line 80—80 of Fig. 75.

The mountings for the record strip 490 are shown more clearly in Figs. 74, 76, and 80, wherein it will be seen that the record strip 490 is trained from supply roll 491 over a compression roll 492, thence around platen roll 493 and over a writing table 494, thence rearwardly over a sleeve 495 mounted on a rod 496 supported by a pair of links 497, thence over a rod 498 supported by a pair of arms 499 and thence around the receiving or storage roll 500.

A paper shifting and feeding mechanism is provided which is so constructed that it will shift the record strip from normal position to bring the autographic portion thereof to be printed upon to a position directly beneath the platen to receive a printing impression from the type carriers. The record strip is then shifted in the reverse direction and advanced one space so as to present a new surface to be written and printed upon.

In Fig. 1 it will be seen that the detail strip is located directly below lid 19 of the cabinet. This lid is provided with a window 501 so that several of the preceding items recorded on the record strip may be viewed. The window 501 is provided with an opening 502 so that autographic notations may be made upon the detail strip adjacent the printed items. The platen 493 (Fig. 80) is mounted on an elongated sleeve embracing shaft 503 which is supported by a pair of arms 504 and 505 (Figs. 75 and 85) journaled respectively on the enlarged portions of studs 531 and 532 provided in the printer side frames 475 and 476, which studs also support the supply roll 491.

The receiving or storage roll is supported in the printer frame by the mechanism shown in Fig. 84, wherein it will be seen that the reduced portion of a tubular stud 506 is fitted in an aperture provided in side frame 476. Stud 506 is provided with a flange 508 which is fastened to the side frame 476 by rivets 509 or by any other suitable means. A grooved collar 510 embraces the inner end of stud 506, and forms a bearing for the arm 499 located toward the left of the printer which, it will be remembered, is one of the arms which supports rod 498.

A plunger 511 is supported at one within the reduced portion of tubular stud 506. Near its inner end plunger 511 is provided with an enlarged cylindrical surface 513 which is slidably received within the tubular portion of stud 506. A spring 512 is mounted on the reduced portion of plunger 511. The inner end of plunger 511 is provided with an enlarged flange 514 and a reduced tapered portion 515 which receives one end of core 516 about which the detail strip is wound.

Mounted in suitable bearings provided in side frame 475 is a long stud 517. The inner end of stud 517 is provided with an enlarged cylindrical shoulder 518 which is slotted at 519 to receive an inwardly extending projection 520 formed at one end of core 516. Adjacent shoulder 518, stud 517 is provided with a flange 521.

Adjacent the flange 521 is a cylindrical shoulder 522 and adjacent the latter, stud 517 is formed with a key portion 523 which engages in a slot 524 provided in the hub 525 of a ratchet wheel 526. A second ratchet wheel 527 is journaled on hub 525 of ratchet 526 and also on shoulder 522 of stud 517. The arm 499 located toward the right hand side of the printer is journaled on a hub 528 of ratchet 527. Also journaled on hub 528 between arm 499 and ratchet 527 is an arm 529 which has pivoted thereto a feed pawl 553, as shown more clearly in Fig. 83. The inner end of hub 528 (Fig. 84) of ratchet 527 bears against the outer side of flange 521.

To insert a core 516 in a printer frame it is only necessary to engage one end thereof on the reduced portion 515 of plunger 511 and force plunger 511 outwardly against the tension of its spring 512 until the other end of core 516 clears shoulder 518 of stud 517 when that end may then be fitted on shoulder 518 and the projection 520 provided in that end of the core positioned within slot 519 provided in shoulder 518.

It will be noted that the outer side of ratchet wheel 527 is provided with a circular bearing surface 530 which engages the inner side of ratchet wheel 526. Spring 512 associated with stud 506 urges core 516 against flange 521 which, in turn, engages the inner end of the hub 528 of ratchet wheel 527 and consequently surface 530 of ratchet wheel 527 is spring urged against ratchet wheel 526.

Upon movement of ratchet wheel 527, ratchet wheel 526 will also be actuated due to the friction between their contacting surfaces. The supporting means for the core carrying the supply roll is somewhat similar to that shown in Fig. 84 in that a spring pressed plunger 511' (Figs. 80 and 83) is provided within the tubular stud 531 fixed to frame 476. The support for the other end of the core, however, simply comprises the stud 532 (Fig. 75) which is provided with a flange 533 and a cylindrical shoulder 534 similar to that provided on stud 517 for the core 516 of the receiving roll.

Figure 81:
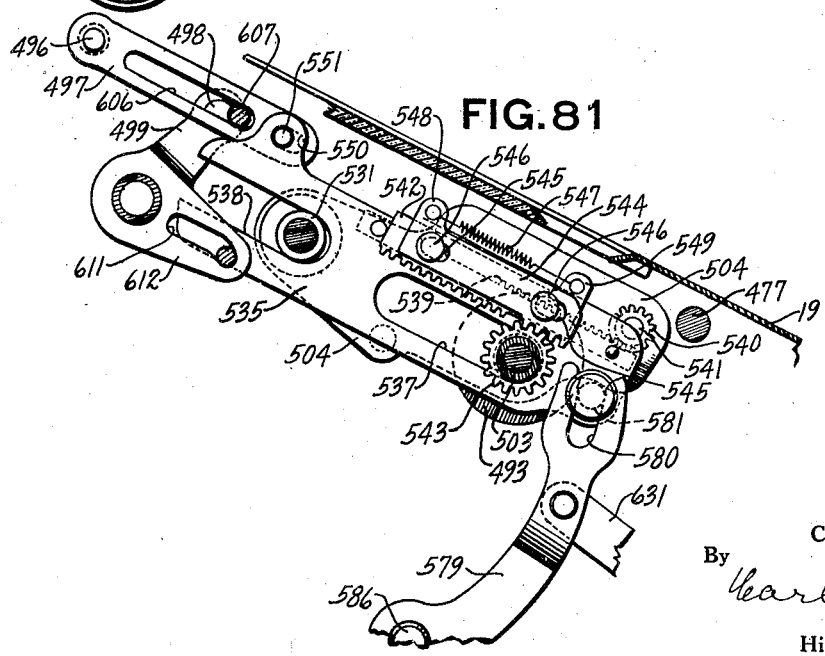
Fig. 81 is a sectional view showing the paper shifting mechanism associated with the record strip printer.

The mechanism for shifting and feeding the detail strip will now be described in detail. Referring to Figs. 75 and 81, it will be seen that a slidable member 535 is provided with a pair of elongated slots 537 and 538 for receiving platen shaft 503 and stud 531, respectively. A similar slidable member 536 is provided at the other side of the printer and also is formed with a pair of similar slots, one of which also receives the platen shaft 503 and the other the stud 532. A rack 539 is attached to the upper side of each slidable member 535 and 536 and meshes with a related pinion 540 pinned to a shaft 541. Shaft 541 is journaled in the forward ends of arms 504 and 505 which support the platen shaft 503. This mechanism is provided to compel slidable members 535 and 536 to move in unison.

As shown more clearly in Fig. 81, slidable member 535 has also attached thereto a rack 542 which is normally out of engagement with a pinion 543 fixed to platen shaft 503. A short rack 544 is positioned adjacent rack 542 and is provided with a pair of slots 545 for receiving studs 546 carried by slidable member 535. Rack 544 is normally in engagement with pinion 543 attached to shaft 503 as shown in Fig. 81. Racks 542 and 544, by virtue of the pin and slot connection just described, are so arranged that an open tooth space is normally provided between the two racks.

A spring 547 is mounted at one end to a stud provided on an upwardly extending projection 548 formed at the rearward end of rack 544 and at the other end to a stud provided on a projection 549 extending from the forward end of rack 542, which rack, it will be remembered, is fixed to slidable member 535. This spring tends to maintain racks 542 and 544 in extended position as shown in Fig. 81.

It will also be seen that a slot 550 is provided near the forward end of each link 497, one of which receives a stud 551 provided on slidable member 535, while the other receives a similar stud 551 provided on slidable member 536. As shown in Fig. 83, the arm 529 has pivoted thereto at 552 the spring urged pawl 553 which engages ratchet wheel 527 (Fig. 84). A link 554 is pivoted at its rearward end to arm 529, while its forward end is pivoted to a stud 551 provided in slidable member 536.

In Figs. 75, 80, and 85, it will also be seen that pressure roll 492 is fixed to a rod 557 which is supported by a pair of arms 558 pivotally mounted on a rod 559 journaled in the arms 504 and 505 previouslly described.

Fixed to rod 559 adjacent arms 504 and 505 are a pair of depending arms 560. Each arm 560 is provided with a stud 561 to which one end of spring 562 is attached. The other end of each spring 562 is fixed to a related stud 563 provided in arms 504 and 505. Thus it is seen that pressure roll 492 is spring urged into engagement with platen 493.

From the construction of the parts just described it is seen that when slidable members 535 and 536 (Fig. 81) are moved forwardly in a manner to be described hereinafter, due to the friction existing between the platen and pressure roll, the short rack 544 will be held stationary until slidable member 535 has been moved sufficiently to cause studs 546 to traverse the length of slots 545 when racks 542 and 544 will move as a unit, thereby rotating platen 493 in a clockwise direction as viewed in Fig. 81. Link 497 will also be held stationary until both racks move together due to the pin and slot connection 551 and 550 between the slidable members 535 and 536 and links 497.

However, when this lost motion has been taken up, links 497, which, it will be remembered, support rod 496, will also be carried forwardly by the movement of slidable members 535 and 536, with the result that sufficient slack is provided in the detail strip to permit platen 493, operating in conjunction with pressure roll 492, to shift the paper around the platen to bring the proper portion thereof into printing position.

When the paper has been shifted to this position, a printing impression will be effected thereon from the type carriers in a manner which will be described in detail hereinafter. It will also be noted that, due to the connecting link 554 (Fig. 83) between slidable member 536 and arm 529 which carries pawl 553, the latter will be moved forwardly to engage the next adjacent tooth on ratchet wheel 527 (Fig. 84) when the slidable members 535 and 536 (Figs. 81 and 83) are actuated to shift the paper to printing position.

It will also be seen that when short rack 544 has been moved out of engagement with pinion 543, spring 547 will extend the racks, causing a space equal to substantially the width of one tooth to be provided between racks 542 and 544. Now, upon movement of slidable members 535 and 536 in the reverse direction, pinion 543 will be moved a greater distance in the reverse direction than it was moved when the paper was shifted to printing position. This is due to the fact that upon the return movement of racks 542 and 544 they are extended, as stated before, so that the last tooth on rack 544 will engage the second tooth on pinion 543 from that engaged by the first tooth on rack 542.

When the parts are thus moved to normal position, pawl 553 will rotate ratchet 527 a distance equal to substantially the length of one tooth space of ratchet wheel 527, which movement will be transmitted to core 516 of the storage roll through the friction drive provided between ratchet 527 and ratchet 526. The friction connection between ratchets 527 and 526 is provided to compensate for the variation in the size of the storage roll, thus insuring a constant feed of the record strip.

From the foregoing description, it is clear that by virtue of the construction of racks 542 and 544 a constant amount of paper will be taken from the supply roll at each operation of the machine, but, due to the fact that the receiving roll is constantly increasing in size, a progressively greater amount of paper would tend to be wound thereon. Since this amount of paper becomes greater than that paid off from the supply roll, the paper would be severed if no compensating mechanism were provided.

For this reason, applicant has provided the friction clutch between ratchets 526 and 527, so that when binding of the paper occurs by the gripping action of friction roll 492 and platen 493 after a sufficient amount has been paid off the supply roll slippage will occur between ratchet 527 and ratchet 526, with the result that only an amount of paper equal to that paid off the supply roll will be wound on the receiving roll. This amount may be regulated so as to provide the desired space between the printed items.

Referring to Figs. 4, 76, 80, 81, it will be seen that cams 565 and 565' are attached to a gear 566 loosely mounted on driving shaft 20. Gear 566 (Fig. 76) meshes with a pinion 738 fixed to a shaft 735 journaled in supporting frames 13 and 14. Shaft 735 has pinned thereto a second pinion 736 (Figs. 4 and 32) which meshes with a gear 159 fixed to the main driving shaft 20 as previously described.

Thus it is seen that upon operation of main driving shaft 20 movement will be imparted to cams 565 and 565' to actuate the mechanisms for shifting and feeding the record strip and also the mechanism for effecting printing thereon. Cams 565 and 565' engage rollers 567 and 568 provided on arms 569 and 570, respectively, of a segmental gear 571 pivoted on shaft 753. Segmental gear 571 meshes with a segmental gear 572 which is loosely mounted on sleeve 387 provided on shaft 386. The upper portion of segment 572 is provided with a cam slot 574 which receives a stud 575 provided on the lower arm 576 of a bell crank lever 577 pivoted on a trunnion 578 fixed to frame 13. The upper arm 579 of bell crank lever 577 is provided with an open slot 580 which receives a laterally extending stud 581 fixed to slidable member 535 (Fig. 76).

A laterally projecting stud 582 is also provided on segment 572 to which is pivoted the rearward end of a link 583. The forward end of link 583 is pivoted to a stud 584 provided at the upper end of an arm 585 fixed to a shaft 586. Shaft 586 is journaled in the frames 13 and 14 as is clearly shown in Fig. 75. Intermediate the ends of arm 585 is an inwardly extending stud 587 which engages in an open slot 588 provided in the lower arm 589 of a bell crank lever 590 pivoted on an inwardly extending stud 590′ fixed to supporting frame 13.

The upper rearwardly extending arm 591 of lever 590 is bifurcated to receive platen shaft 503. Also pinned to shaft 586 is a second arm 592 (Fig. 76) having a stud 593 in axial alinement with stud 587 on arm 585. Stud 593 operates in an open slot in the lower arm 594 of a lever 595 similar to that provided at the lower end of lever 590. Lever 595 is pivoted on a stud 595′ extending inwardly from frame 14 (Fig. 75) and has an arm 596 (Fig. 76) which also is provided with a bifurcation 597 for receiving the platen shaft 503. The two arms 590 and 595 are provided to equalize the movement of the platen 493.

When cams 565 and 565′ are operated by gear 566, segment 572 will be rocked in a counter-clockwise direction as viewed in Fig. 76, with the result that bell crank 577 will also be rocked in a counter-clockwise direction which, through its connection with sliding member 535, will move the same forwardly to shift the record strip 490 to printing position.

At this time stud 575 will enter the dwell 574′ of cam slot 574 and the record strip will be held in shifted position. Dwell 574′ is provided so that the record strip 490 will be held stationary during a printing operation. As segment 572 is rocked in a counterclockwise direction, as aforesaid, shaft 586 will also be rocked in a counter-clockwise direction due to the engagement of link 583 with arm 585. This motion is transmitted to the platen shaft by levers 590 and 595 respectively.

The parts are so constructed that when the paper has been shifted to printing position and stud 575 has entered the dwell 574′ in slot 574, platen 493 will also have been rocked downwardly to a position slightly above the type carriers. At substantially the time that the record strip 490 has been brought to rest in shifted position, further movement of segment 572 will cause platen 493 to be brought into engagement with the type carriers thereby effecting a printing impression upon the record strip.

When segmental gear 572 is rocked in the reverse direction it is seen that because of the dwell 574′ provided in cam slot 574, the platen will be moved out of engagement with the type carriers before the record strip 490 will be shifted in the reverse direction. When the cam portion of slot 574 reaches stud 575 the record strip will be shifted in the reverse direction and at the same time the platen will be restored to normal position.

At times it is desirable to feed the record strip manually to wind the record material upon the receiving roll. To this end a manually operable lever 598 is provided. As shown in Figs. 1, 76, and 83, lever 598 projects through a slot 599 provided in lid 19 of the cabinet so that the record strip may be fed without requiring the lid 19 to be opened.

As shown in Figs. 83 and 84, lever 598 is pivoted on stud 517 in close juxtaposition to side plate 475. The lower end of lever 598 has pivoted thereto a pawl 600 which is urged into engagement with ratchet 526 by a spring 601. A link 602 is pivoted at its rearward end to a stud 603 provided intermediate the ends of lever 598. The forward end of link 602 is pivoted at 604 to a depending arm 605 fixed to rod 559. Rod 559, it will be remembered, has also fixed thereto the depending arms 560 (Fig. 85) which normally urge the pressure roll 492 into engagement with platen 493.

By grasping lever 598 and urging the same rearwardly, pawl 600 will engage the teeth of ratchet 526 to rotate core 516 (Fig. 84) of the receiving roll, thus causing paper to be wound thereon. At the same time, through link connections 602 with pressure roll 492, the tension between roll 492 and platen 493 is destroyed, and thus the record strip may be paid off from the supply roll without any binding action that normally exists between the pressure roll and the platen.

In order to facilitate the removal and replenishing of the record paper in the printer, the following mechanism is provided. Referring to Figs. 80, 81, and 85, it will be seen that the link 497 which is pivotally connected to slidable member 535 is provided with an elongated slot 606 intermediate its ends for receiving a stud 607 fixed to the upper portion of an arm 608 (Fig. 85) pivoted to the printer side frame 476 at 609. The rearward end of arm 608 is provided with a laterally extending stud 610 which operates in a slot 611 provided in an arm 612, integral with an arm 499, which, it will be remembered, is one of the arms supporting rod 498 over which the record strip 490 is trained before passing onto the receiving roll.

By the connections just described it is seen that by simply lifting rod 496, arm 608 will be cammed upwardly, causing the stud 610 thereon to rock arms 499 and supporting rod 498 rearwardly, thereby bringing all of the parts just described to the position shown in Fig. 85. When the parts are in this position, it is clear that the paper may be severed and both the supply and receiving rolls readily removed from their mountings.

Ribbon mechanism

The ribbon mechanism for the detail record strip printer is mounted on a bracket 615 (Figs. 75, 76, 80, and 85) which is fastened to the forward end of the printer side frame 476 by screws, rivets, or by any other suitable means. Spaced from side frame 476, bracket 615 is formed with a depending portion 616 (Figs. 75 and 85) for supporting a number of the parts associated with the ribbon mechanism. The lower end of depending portion 616 is rigidly secured to side frame 476 by suitable bracing rods. Spaced from depending portion 616 of bracket 615 is a plate 617 (Fig. 75), which is integrally secured to depending portion 616 by tie rods 618. Referring to Fig. 85 it will be seen that the inking ribbon 621 extends from roll 622 around tie rod 618, thence around rod 623 provided in platen supporting arms 504 and 505 (Fig. 75), thence beneath tie rod 618 (Fig. 85) and around roll 624, Rolls 622 and 624 are supported on shafts 619 and 620 respectively, journaled in depending portion 616 and plate 617 (Fig. 75).

To facilitate movement of the ink ribbon, tie rods 618 and rod 623 may be provided with rollers. The inking ribbon feeding mechanism is of such a construction that when the ribbon has been completely unwound from one roll, the mechanism will be automatically shifted so as to rewind the ribbon on that roll and pay it off from the other roll. The mechanism for feeding the ribbon will now be described in detail.

Referring particularly to Figs. 75 and 80 it will be seen that a bell crank lever 625 is formed with a bail-like portion 626 which is journaled on a rod 627 fixed to end plate 476 and depending portion 616 of bracket 615. One arm of this bail extends upwardly between side frame 476 and portion 616 of bracket 615 while the other arm thereof is positioned a short distance to the right of depending portion 616, as shown in Fig. 75.

It will be seen from Figs. 70 and 72 that the lower arm 628 of bell crank lever 625 has fixed thereto a pin 629 which operates in an elongated slot 630 provided near the forward end of link 631. The rear end of link 631 is pivoted at 632 to the upper arm 579 of bell crank 577. Integral with bail 626 is an arm 633 extending upwardly and rearwardly from 627. Arm 633 has pivoted to its upper end at 634 a downwardly and rearwardly extending arm 635 carrying a pin 636. Arm 635 is normally urged downwardly by a spring 637. Loosely pivoted on rod 627 is an upwardly and rearwardly extending arm 638 which has pivoted at the upper end thereof at 639 a two-arm pawl 640.

The upper arm 641 of pawl 640 engages a ratchet wheel 642 fixed to shaft 619 which supports ribbon roll 622 (Fig. 85). The lower arm 643 of pawl 640 is adapted to engage ratchet 644 fixed to shaft 620 supporting the ribbon roll 624 (Fig. 85). A comparatively broad notch 640' is provided at the top of pawl 640 for receiving pin 636 carried by arm 635. The upper end of arm 638 is provided with a nose portion 645 which is adapted to be engaged at either side thereof by the pin 636 on arm 635.

Fixed to ratchet 619 is a serrated disk 646 which is engaged by a nose portion 647 provided on arm 648 of two-arm pawl 649. Also fixed to ratchet 644 is a serrated disk 650 which receives the other arm 651 of holding pawl 649. Holding pawl 649 is provided with an open slot 652 at its lower end which straddles rod 627 as shown in Fig. 80. A spring 646 urges pawl 649 upwardly so that arms 647 and 651 thereof engage disks 646 and 50 respectively.

When the parts are in the position shown in Fig. 80 and segmental gear 572 is operated as was described heretofore, it will be seen that bell crank lever 625 will be rocked about its pivot first in a clockwise direction and then in a counter-clockwise direction. When bell crank lever 577 is rocked by cam 574 provided in segmental gear 572, link 631 obviously will first be moved downwardly until the end portion of slot 630 therein engages the pin 629 provided at the lower end of arm 628 of bell crank 625 when the latter will be rocked in a clockwise direction, with the result that arm 633 carrying arm 635 on the upper end thereof will also be rocked in a clockwise direction.

By the engagement of pin 636 with nose 645 of arm 638, the latter will be moved downwardly, thus causing the hook provided in arm 641 of pawl 640 to actuate ratchet wheel 642 and thereby feed the ribbon an increment. When segmental gear 572 is moved in the reverse direction, the parts will be restored to normal position.

From the construction of the parts just described it will be seen that when the ribbon has been completely paid off from roll 624 and the machine is subsequently operated, binding of the ribbon will take place and ratchet wheel 642 will be held stationary. When this action takes place, pawl 640 will also be held stationary, but bell crank lever 625 will move on its pivot, with the result that pin 636 will be cammed around nose portion 645 of arm 638 and will be moved into position on the other side of nose portion 645 by spring 637. Spring 637 will also rock arm 643 of pawl 640 into engagement with ratchet wheel 644 and arm 641 thereof out of engagement with ratchet wheel 642.

Now, when the machine is subsequently operated, roll 624 will be actuated by arm 643 of pawl 640 and ratchet wheel 644 attached thereto, to wind the ribbon around roll 624 and pay it off from roll 622 until the ribbon has been completely paid off from roll 622, when pin 636 will again be cammed around nose 645 and into the position shown in Fig. 80. Thus it is seen that an automatic ribbon reverse is provided which effectively feeds the ribbon at each operation of the machine, thereby presenting a fresh portion to the printing line each time the platen is brought into engagement with the type carriers.

Total printing

When the machine is operated for item entering operations, as has been described hereinbefore, the selection of totalizers in the totalizer reel is effected by properly adjusting selector plates 283 and 300 (Fig. 35), but the reel itself remains stationary. In total taking operations, however, it is necessary to rotate the reel to bring each totalizer to printing position in order to effect printing therefrom.

Before the reel can be rotated, it is necessary to swing the transmission line, which it will be remembered normally transmits the motion of the differential segments to the actuating gears of the reel, so that it will not interfere with the movement of the reel. It is also important that the actuating gears, the transfer plates, and the cam shaft provided within the reel be locked against movement when the reel is rotated so that these parts will not vary from normal position during total taking operations. The mechanisms controlling total printing will now be described in detail.

Referring to Figs. 57 and 94 it will be seen that the control lever 180 is provided with a cam slot 650' which receives a pin 651' provided on a segmental gear 652' loosely pivoted on shaft 653 journaled in supporting frames 11 and 13. A hook 654 is formed at the rearward edge of control lever 180 which engages shaft 653. These parts assist in guiding the control lever during its movement and also positively stop the same when it reaches its uppermost position of adjustment. Segmental gear 652' meshes with a pinion 655 fixed to control shaft 185. Also fixed to control shaft 185 is a segmental plate 656 (Figs. 95 and 100), provided with a cam slot 657 which receives a stud 658 provided at the inner end of an arm 659 pivoted on shaft 660. A projection 661 is provided on arm 659 to engage a pin 662 provided on support frame 265 of the transmission line. There is a similar arm 659' (Figs. 94 and 100) pivoted on shaft 660 near the right hand end thereof provided with a projection 661' normally engaging a stud 662' provided on the other support frame 266 supporting the transmission line. A similar cam plate 656' fixed to shaft 185 cooperates with arm 659' in the same manner as cam plate 656 cooperates with arm 659.

By this construction it is seen that the transmission line is positively held in normal position. A plate 663, Figs. 2 and 32, is spaced intermediate the end frames 265 and 266 of the transmission line. This plate is provided with a series of internal notches 664 for receiving the various shafts of the transmission line and also with an aperture through which shaft 264 passes. The upper inner end of plate 663 is formed with a notch 665 which receives a projection 666 provided on end plate 382 of the reel. These parts are provided to positively hold the reel against movement about its shaft 386 when the transmission line is in operative position.

As shown in Figs. 2, 3, 61, 62, 69, 92 and 95, a disc 667 (Figs. 62 and 69) is fixed to an enlarged portion 803 of sleeve 802 by screws 573. Sleeve 802 is mounted on shaft 386 adjacent sleeve 387 and has fixed thereto, a semi-circular disc 801 (Figs. 62, 69, 87 and 89) lying in the same plane as a similar disc 800 fixed to sleeve 387 which sleeve it will be remembered is fixed to end plate 383 in the reel. Screws 573 also rigidly connect gear 668 (Figs. 62, 69 and 92) and notched disc 795 (Figs. 61, 62 and 69) to sleeve 802 so that all of these members will be moved as a unit when the reel is rotated.

Disc 667 is provided with an arcuate slot 669 (Figs. 92 and 95) which receives a pin 670 provided at the inner of side frame 265 (Fig. 95). Slot 669 is concentric with the pivots about which frames 265 and 266 swing. Figures 92 and 95 show the position of the stud 670 when the transmission line is in operative position. When in this position it will be noted that stud 670 assumes a position at the inner end of slot 669. Therefore, stud 670 when in the position shown in Figs. 92 and 95 is also effective to positively lock the reel against rotation.

Control lever 180 is also provided with a cam edge 671 (Figs. 94 and 95) at the rear end thereof which engages a stud 672 provided on the upper arm 673 of a segmental gear 674 which is pivoted on shaft 653. Segmental gear 674 meshes with pinion 675 (Figs. 69 and 100) pinned to shaft 660. A similar pinion 675a (Figs. 95 and 100) fixed to shaft 660 meshes with a rack segment 676 provided along the lower edge of side frame 265.

Spaced from pinion 675a, shaft 660 has pinned thereto a similar pinion 675' (Figs. 94 and 100) which meshes with a rack segment 676' provided at the lower edge of side frame 266. The lower arm 677 (Fig. 94) of segmental gear 674 carries a stud 678 (Figs. 57 and 94) which engages cam surface 679 provided at the lower edge of control lever 180. Cam surface 679 acts as a companion cam for cam 671 and is provided to positively restore segmental gear 674 to normal position when the control lever is moved in the reverse direction.

Cam surface 671 provided on control lever 180 is so constructed that during the initial movements of control lever 180, pin 672 will ride on the portion thereof which is concentric with shaft 386. Thus no movement will be imparted to gear segment 674.

However, when the control lever is moved to sub-total position, the raised portion of cam 671 will engage with stud 672 thereby causing segment 674 to rock in a clockwise direction, which motion is imparted to shaft 660, causing pinions 675a and 675' (Fig. 100) to actuate the support frames 265 and 266 thereby swinging the transmission mechanism out of engagement with the associated gears in the machine proper and also disengaging projection 666 (Fig. 32) from the notch 665 in plate 663. At the same time stud 670, shown in Figs. 92 and 95 will be moved to the dotted line position abutting against a projection 689 provided on disc 667. Projection 680 is provided so as to prevent rotation of the reel in the counterclockwise direction as viewed in Fig. 92.

For total taking operations it is not desirable that the motor bar 43 (Figs. 93 and 94) be held in depressed position. Accordingly, mechanism has been provided to automatically release the latch 220 from engagement with the notch 623 in plate 43' when the transmission has been disengaged by movement of the control lever 180 to sub-total position.

In Figs. 93 and 94 it will be noted that a cam disc 681 is loosely pivoted on stud 266' which supports side frame 266. A pin 683 is provided on side frame 266 which is adapted to engage a projection 684 depending from the lower end of disc 681. Disc 681 is also provided with a cam surface 685 which is adapted to engage a projection 686 provided on latch lever 220.

When the transmission frames 265 and 266 are swung forwardly, pin 683 will engage projection 684 and rock plate 681 about stud 266' thereby camming latch lever 220 in a clockwise direction to remove projection 622 from notch 623 provided in plate 43' attached to the motor bar 43. It will also be noted that a spring 687 tends to rock disc 681 in a counterclockwise direction to restore it to normal position when the transmission line is restored to normal position.

A nose portion 688 is also provided at the rearward end of disc 681 which is adapted to engage either side of projection 689 provided at the lower end of latch lever 220. This acts as a lock to retain the latch lever 220 in the position shown in Fig. 94 and also in position shown in Fig. 93 when the motor bar is locked in depressed position.

However, when frames 265 and 266 are moved by the mechanism just described latch lever 220 will be positively held out of engagement with motor bar 43 and before release of the machine can be effected operation of this bar is necessary.

Integral with arm 659', (Fig. 94) is a forwardly and upwardly extending arm 690 which is provided with an open slot 691 at its upper end for receiving a stud 692 provided near the lower end of a depending arm 693 pivoted on stud 266'. The lower end of arm 693 is provided with a cam slot 694 which receives a stud 695 provided on an arm 696 which pivots about a stud 697 provided at the inner side of frame 266. Integral with arm 696 is a bail 698 which carries a series of fingers 699 which are adapted to engage gears 263 which, it will be remembered, are loosely pivoted on shaft 264 of the transmission line.

It will be noted in Fig. 95 that cam slot 657 in plate 656 is provided with a dwell portion which permits movement of control lever 180 without rocking arms 659 (Fig. 95) and 659' (Fig. 94) during the first portion of its movement. The operation of control lever 180 and the mechanisms controlled thereby will be fully described hereinafter, however, it may be stated here that when lever 180 is moved to sub-total position, arms 659 and 659' will be cammed downwardly with the result that projections 661 and 661' respectively thereon will be moved out of engagement with studs 662 and 662' provided on the side frames of the transmission line. At the same time, arm 690 will rock arm 693 in a counterclockwise direction thereby causing cam 694 to rock the alining fingers 699 into engagement with gears 263 and thereby hold the latter against movement.

When the control lever 180 is restored to its uppermost position, the parts just described will assume the position shown in Figs. 94 and 95. It will be noted that cams 650' and 671 (Fig. 57) are so designed that while the former is effective to rock plate 656 (Fig. 95), the latter is ineffective and when cam 671 becomes effective to actuate segment 674 the dwell portion of cam slot 650' (Fig. 57) will have reached pin 651' and thereby movement of disc 656 will be arrested. It will be further noted that segment 652' is provided with a pair of camming projections 700 and 701 which engage laterally extending projections 702 and 703, respectively, on a two-arm lever 704 which is pinned to shaft 386. Also pinned to shaft 386 is a cam disc 705 (Figs. 50 and 54), which is provided with a cam portion 706 which engages a lock rod 707. This lock rod 707 extends through the entire reel.

A depending arm 708 is pinned to cam shaft 430 and is provided with an open slot 709 at the lower end thereof for receiving a laterally extending stud 710 carried by the substantially horizontal arm 711 of a bell crank lever 712 pivoted at 713 to end plate 383 of the totalizer reel. The upper arm 714 of bell crank 712 is provided with a surface 715 which engages one end of rod 707. End plates 382 and 383 (Fig. 50) of the reel are each provided with a radial slot 716 (Fig. 54) which receives and guides lock rod 707. Also provided on the substantially horizontal arm 711 of bell crank lever 712 is a projection 717 which is adapted to engage a cam face 718 provided on a disc 719 also fixed to shaft 386.

When control lever 180 is moved counterclockwise to lock register, sub-total or grand total position, (for positions see Figs. 96 and 97) segmental gear 652 (Fig. 70) will be cammed in a clockwise direction, causing projection 701 to engage projection 703, thereby slightly rocking shaft 386 in a clockwise direction with the result that cam 706 (Fig. 54) provided on disc 705 will move rod 707 outwardly which, in turn, will actuate bell crank lever 712 in a clockwise direction to bring stud 710 into slot 709 provided in the arm 708.

The cam shaft 430 is thus positively locked against movement. The selector plates for both the counters and the totalizers, as well as the registering gears are provided with axially alined L shaped slots 720 (Figs. 36, 38 and 51) for receiving lock rod 707. During normal operations of the machine, the portion of L shaped slots 720 which is substantially concentric with shaft 386 will register with lock rod 707 thereby permitting these members to oscillate.

When the control lever has been moved counterclockwise to lock register, sub-total or grand total position, and disc 705 (Fig. 67) has been rotated in the direction of the arrow, rod 707 will be moved in the manner aforesaid, assuming a position in the substantially radial portion of L slots 720 of the members previously mentioned, thereby positively locking them against movement. The operating plates 406 (Fig. 40) and 451 (Fig. 50) and the transfer plate 455 are provided with studs which are positively engaged by their operating cams and, therefore, these plates will also be positively held against movement when cam shaft 430 is locked against operation in the manner just described.

It will therefore be remembered that when control lever 180 is moved to any of the above mentioned positions, the various elements associated with the reel are locked against operation. It will be seen later when the control mechanism is described in detail that no motion is imparted to segmental gear 652 (Fig. 61) or shaft 185 when the control lever 180 is moved from lock register position to subtotal position. During this movement of the control lever, shaft 660, (Figs. 94 and 95) will be rotated however to swing the transmission line out of engagement with the gears in the machine proper with which it cooperates for item entering operations of the machine.

It is therefore seen that mechanism is provided for positively swinging the transmission line out of engagement with the actuating gears in the reel, at which time all of the moving parts within the reel and transmission line are locked against operation so that when the latter is again brought back into operative position all of the parts will be in proper alinement and therefore no interference will occur between the cooperating parts.

In order to rotate the reel to bring the totalizers and special counters into printing position, the following mechanism is provided: Referring to Figs. 1, 2, 69 and 92 it will be seen that a ridged thumb wheel 721 protrudes through a slot provided near the top left-hand end of the cabinet. Fixed to thumb wheel 721 is a pinion 722 which meshes with a large gear 723 which in turn meshes with a gear 668 which, it will be remembered, is fixed to sleeve 802 mounted on shaft 386. Adjacent thumb wheel 721 on the cabinet is a legend plate bearing legends representing the various totalizers and counters provided in the reel.

An index pointer 724 is attached to the top of a bent arm 725 and is adapted to be moved variable distances to designate the totalizer or counter which has been moved to printing position. Bent arm 725 is loosely mounted on sleeve 802, as shown in Figs. 69 and 92, and is provided with a laterally extending stud 726 which engages in an open slot 727 provided at the lower end of a depending arm 728 pivoted at 729 to side frame 13. Arm 728 is provided with a laterally extending stud 730 intermediate its ends which operates in a cam slot 731 provided in gear 723.

When the control lever 180 has been moved to one of its total taking positions, in order to bring any one of the totalizers or special counters to printing position, it is only necessary to rotate thumb wheel 721 until the index finger 724 registers with the legend corresponding to the particular totalizer that it is desired to take the total from.

It has been pointed out heretofore that when the control lever 180 is moved to one of its total positions, all of the keys are locked against operation but the mechanism for releasing the machine is so conditioned that after the reel has been rotated to bring one of the totalizers or counters to printing position, depression of the motor bar will release the machine for operation. Thus, after bringing a selected totalizer to printing position in the manner just described, it is only necessary to depress the motor bar 43, which will cause the machine to operate to effect a printing impression therefrom.

The printing and paper shifting mechanisms operate in the same manner for total taking operations as they do for item entering operations and, therefore, it will be unnecessary to repeat the operation of those mechanisms at this time.

When the control lever 180 is moved to sub-total position the reset mechanism is not conditioned for operation. However, when control lever 180 is moved to its grand total position, resetting of the selected totalizer will be effected after a printing impression has been taken therefrom. Referring to Figs. 3 and 4, it will be seen, as was pointed out hereinbefore, that journaled in frames 13 and 14 slightly to the rear of the main driving shaft 20 is a short shaft 735. Adjacent supporting frame 14 shaft 735 has pinned thereto a gear 736 which meshes with a gear 159 fixed to the main driving shaft 20.

Near its other end shaft 735 has pinned thereto a gear 738 which meshes with gear 566 which it will be remembered is loosely mounted on main driving shaft 20. Fixed to gear 566 are cams 565 and 565' which it will also be remembered are also loosely mounted on shaft 20.

When main driving shaft 20 is rotated upon operation of the motor, cams 565 and 565' will be driven by gear 738 through the train of gears just described to operate the printing mechanism. Adjacent gear 738 is a gear 739 which is loosely mounted upon shaft 735. Gear 739 meshes with a gear 740 loosely mounted on shaft 20 which gear is located adjacent gear 566. Gear 740 has fixed thereto companion cams 741 and 741' (see also Figs. 60 and 61) which are also loosely supported on shaft 20. It therefore, is clear that for normal operations of the machine since 739 is loosely mounted on shaft 735, cams 741 and 741' for operating the resetting mechanism will not be moved.

Figure 96:
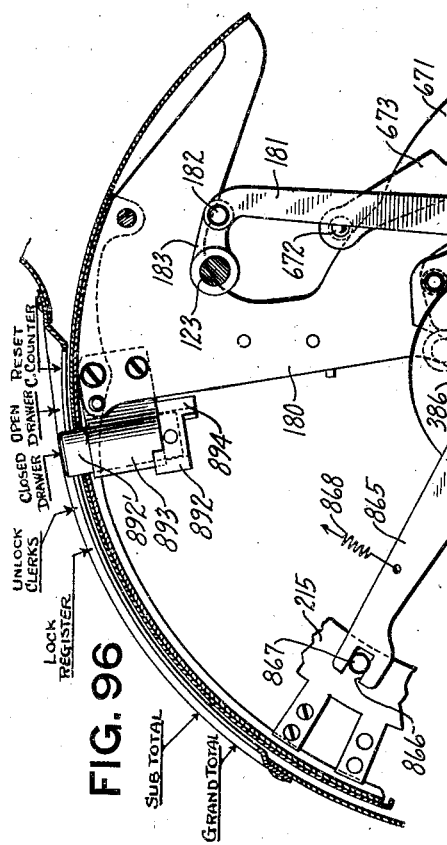
Fig. 96 is a general elevational view of the control mechanism, showing particularly the associated release mechanism for the machine and the series of interlocks controlled by the control mechanism.

However, when the control lever is moved to grand-total position a wide pinion 742 mounted on an arm 743 of a three-arm lever 744 (Figs. 61 and 96) will be rocked upwardly into mesh with gears 738 and 739. Thus it is seen that upon movement of shaft 20 both gears 738 and 739 will be operated to actuate their respective cam members. Referring to Fig. 96 it is also seen that the substantially vertical arm 744' of lever 744 is provided with a projection which moves into engagement with gear 740 when pinion 742 is moved to inoperative position. This prevents movement of gear 740 when out of engagement with pinion 742 and also insures proper meshing of latter with gear 740 when it is moved to operative position.

Referring to Figs. 61 and 62 it is seen that fixed to control shaft 185 is segmental disc 745 which is provided with a cam slot 746. Cam slot 746 receives a pin 747 mounted on arm 748 of the three-arm lever 744. Fig. 61 shows the position of the parts when control lever 180 is in the open drawer position of adjustment (for positions see Figs. 96 and 97).

It will be noticed that when control lever 180 is in this position, pin 747 assumes a position in the portion of cam slot 746 which is concentric with shaft 185. Thus no movement of three-arm lever 744 will be effected until segmental disc 745 is moved to bring the cam portion 746' or 789 into engagement with pin 747. The portion 746' of cam slot 746 is brought into engagement with pin 747 when control lever 180 is moved from sub-total position to grand total position. When this occurs, three-arm lever 744 will be rocked in a clockwise direction, as viewed in Fig. 61, thereby causing the engagement of gear 742 with gears 738 and 739.

As shown in Figs. 60 and 61, the cams 741 and 741' engage rollers 750 and 751 respectively, provided on a two-arm lever 752 pivoted on shaft 185. Also pivoted on shaft 185 and fixed to arm 752 at 754 is a gear segment 755 (see also Fig. 62). Segmental gear 755 meshes with a gear segment 756 which is journaled on sleeve 802, as shown in Figs. 62 and 69. Fixed to gear 756 on either side thereof are gear segments 757 and 758.

Referring to Figs. 61 to 68, it will be seen that gear segment 757 cooperates with a gear 759 which is provided with an internal thread for receiving a worm gear 760 formed at the righthand end of shaft 761. Pinned to shaft 761 adjacent worm gear 760 is a pinion 762 which meshes with gear segment 758. Gear 759 and pinion 762 are supported within the hollow portion of a bracket 763 which is fixed to the inner side of supporting frame 13 by screws 764 as shown in Fig. 63. The left-hand end of shaft 761 is journaled in suitable bearings provided in side frame 13 as is also shown in Fig. 61. Adjacent the inner side of frame 13 shaft 761 is provided with a peripheral groove 765 which receives a rectangular key 766 (Figs. 61 and 62) which is fitted within an elongated slot 767 formed in the flange of bracket 763 and lies in close juxtaposition to frame 13.

The shaft 761 is held against axial movement. Pinned to each totalizer shaft 396 (Fig. 63) is a collar 768 which is provided with an enlarged portion 769 at the inner side thereof. This enlarged portion is provided with a slot 770 which receives a pin 771 projecting from its related totalizer frame when the totalizer shaft is in normal position. This mechanism is provided to hold its shaft against rotary movement.

Spaced from enlarged portion 769 is a flange 772, as shown in Figs. 61, 62 and 68, which lies adjacent the inner side of a retaining disc 773 (Fig. 61) near the outer periphery thereof. This disc is loosely mounted on sleeve 802 and is provided to prevent axial movement of the totalizer shafts, during normal operations of the machine. An arm 774 is fixed to disc 773 by rivets 775 as shown in Figs. 61, 62, 69, 86 and 92. Arm 774 is provided with pins 774a and 774b (Figs. 86 and 92) which are engaged by a cam 774c fixed to control shaft 185.

Adjacent flange 772 (Fig. 66), collar 768 is provided with an arcuate flanged clutch member 776 (Fig. 61) which is concentric with shaft 386. The cross section of clutch member 776 is substantially T-shaped. This flanged clutch member is adapted to move into engagement with a cooperating clutch portion 777 provided at the inner end of gear 759, as is shown in Fig. 66, when the totalizer reel is rotated to bring a totalizer supported thereby into printing position.

It will be noted in Fig. 65 that gear segment 757 is provided with a concentric portion 778 upon which teeth 779 of gear 759 rest. This forms a lock for the gear 759 until the concentric portion 778 moves past the gear 759 when the teeth of gear segment 757 will engage the teeth of gear 759 to rotate the same.

The operation of the parts just described is as follows. In order to select a totalizer for operation thumb wheel 721 (Fig. 92) is actuated to rotate the reel to select the proper totalizer. By this movement the arcuate clutch member 776 provided at the end of collar 768, which it will be remembered is pinned to totalizer shaft 396, will move into engagement with the cooperating clutch member 777 provided at the inner end of gear 759 as shown in Fig. 66.

Now upon operation of the machine the cams 741 (Fig. 61) and 741' will actuate gears 757 and 758 in a clockwise direction as viewed in Figs. 65 and 67.

From the construction of segments 757 and 758 it will be seen that the latter will engage its pinion 762 and rotate the same immediately while gear 759 remains stationary with the result that upon rotation of pinion 762 (Figs. 63 and 66) worm gear 760 will also be rotated causing gear 759 to move axially thereof due to the action of worm gear 760 with the cooperating internally threaded portion of gear 759. By this movement the totalizer shaft will be moved axially causing notches 780 (Figs. 63 and 64) provided therein to register with their respective spring urged pawls 781 (Fig. 64) provided on the totalizer wheels.

When gear 759 and a totalizer shaft are moved axially, in this manner, it is clear that the slot 770 (Fig. 63) provided in the enlarged portion 769 of collar 768 will be disengaged from the stud 771 projecting from its related totalizer frame. Gear 759 will be moved in this manner until the teeth of gear segment 757 engage the teeth of gear 759 when the latter, as well as gear 762, will then rotate as a unit causing totalizer shaft 396 to rotate in the direction of the arrow shown in Fig. 64 a distance equal to slightly more than nine-tenths of a complete revolution.

Upon the return movement of gears 757 and 758, the totalizer shaft will be rotated in the reverse direction and the notches 780 therein will engage their respective pawls 781 and thereby rotate the totalizer wheels associated therewith to zero, at which time the teeth of gear segment 757 will have moved out of engagement with the teeth of gear 759 and the concentric portion 778 will again prevent said gear from rotating further.

Gear 762, however, will continue to rotate with the result that gear 759 and the totalizer shaft connected thereto will be moved axially to the right to restore the parts to normal position as shown in Fig. 63. The mechanism just described is so timed with the printing mechanism that printing occurs before a resetting operation is effected.

Referring to Fig. 63, it can be seen that shaft 396 is provided with a long notch 780'. This notch is provided to engage the pick-up pawls provided in the special counter wheels mounted on this shaft. Thus the special counter will be reset simultaneously with the resetting of its associated totalizer.

As shown in Fig. 70, disc 773 is provided with a notched portion 782 which when brought into position adjacent a flange 772 permits, the associated totalizer shaft to move axially. Notch 782 is normally out of registering position with the resetting mechanism. However, when the control lever is moved toward a total taking position, disc 733 will be moved by a cam 774c (Fig. 92) thereby alining notch 782 with the resetting mechanism, and upon operation of the machine the totalizer shaft will be shifted axially to effect resetting of the associated totalizer wheels.

It will be seen by reference to Fig. 34 that the item type wheels have a larger diameter than the totalizer wheels and, accordingly, the radial distance from the shaft 376, supporting the item type carriers, to the center of the reel is slightly less than the radial distance of any one of the totalizer shafts to the center of the reel.

Therefore, in order to reset the consecutive counter that is mounted on the same shaft therewith it will be necessary to provide a slightly modified construction. To this end shaft 376 (Fig. 70) has pinned thereto a plate 783 carrying a laterally projecting stud 784 near the upper end thereof which is adapted to engage in slot 785 (Fig. 68) of clutch portion 777 provided in gear 759. A ring 786 (Fig. 70) is provided with a notch 786' which lies immediately below plate 783 when the parts are in normal position.

The customer counter in axial alignment with the item type wheels on shaft 376, like the special counters provided on totalizer shafts 396, is provided with one long notch 780' (Fig. 71) which is adapted to cooperate with a pick-up pawl provided on each counter wheel similar to those associated with each of the totalizer wheels as shown in Fig. 64.

For normal operations of the counter, the counter wheels are rotated in a direction away from the notch portion so that when the pawls register therewith they will simply ratchet over the notch and will not be stopped thereby. However, when the shaft is rotated towards its home position the abrupt portion of notch 780' will engage these pawls and restore each of the wheels to zero. Since stud 784 (Fig. 70) of plate 783 registers in slot 785 (Fig. 68) of gear 759 it is clear that when gear 759 is rotated shaft 376 will also be rotated to restore the consecutive number counter 380 to zero.

When the reel is rotated to bring one of the totalizers (on one of the shafts 396) to printing position the arcuate portion 783' (Fig. 70) will ride on the concentric periphery of ring 786 to hold shaft 376 against movement. It will also be noted that disc 773 is provided with an arcuate notch 783. This permits stud 784 to revolve about shaft 376 as a center during resetting of the counter 380.

As was viewed in Figs. 63 and 66 a small gear 787 is pinned to the left hand end of shaft 761. This gear meshes with a gear segment 788 (Fig. 95) at the forward end of an arm 1080 journaled on a rod 1001 supported between transmission support plates 265 and 1014 (for location of plates see Fig. 3). Segment 788 meshes with a gear 1081 fixed to shaft 1012 which supports the consecutive number counter wheels (not shown in this divisional case) associated with the check and slip printing mechanism.

It is understood that the consecutive counter provided in the reel corresponds at all times with the consecutive counter associated with the check issuing mechanism.

Figure 97:
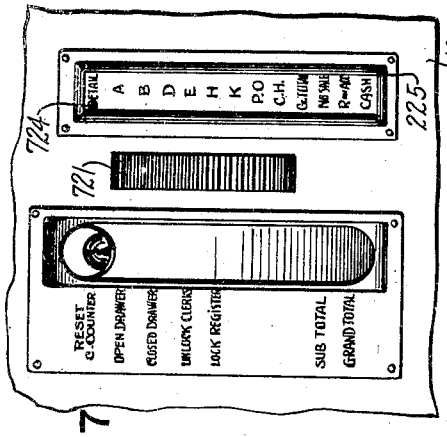
Fig. 97 is a view of the legend plates associated with the control lever and reel operating means.

In the illustrated machine when it is desired to reset the consecutive counter the control lever 180 is moved to reset consecutive counter position, Figs. 96 and 97, the uppermost position thereof, with the result that the cam portion 789 of cam 745 shown in Fig. 59, will rock three-armed lever 744 clockwise, thereby bringing pinion 742 (Fig. 96) into engagement with the gears 738 and 739 (Fig. 4).

Now, to release the machine for operation, it is simply necessary to depress the no sale key and a clerk's key and the motor bar, with the result that the machine will operate to first effect a printing from the consecutive counter 380 and then reset the same to zero. It is not necessary to disengage the transmission line from the actuating gears of the reel for this operation, as is the case when total taking and resetting of the totalizers and special counters associated therewith is to be effected, since it will be remembered that the consecutive counter 380 (Fig. 33) on the shaft 376 (Figs. 70 and 71) is reset without effecting any axial movement of said shaft, the stud 784 provided on the plate 783 being long enough to permit the gear 759 (Figs. 63 and 66) to move axially without disengaging it from the slot 785 (Fig. 68) provided in the gear 759.

When a sub-total is taken, gear 742 (Fig. 96) is not moved into engagement with gears 738 and 739 (Fig. 4) and thus only printing will be effected from the selected totalizer. However, when the control lever is moved to grand-total position, pinion 742 will be moved into engagement with gears 738 and 739 with the result that the resetting gears will be caused to operate and consequently the totalizer and special counter associated therewith will be reset to zero after printing has been effected therefrom. This mechanism, it is clear, is so constructed that totals can be printed from each of the totalizers and associated special counters and the totalizers and counters can be reset by successively bringing them to printing position, and then releasing the machine for operation. This procedure is repeated until a printing impression has been taken from all of the totalizers and counters of the reel.

Resetting of the no sale counter is effected in the same manner as are the totalizers. The shaft supporting this counter is also provided with a clutch 776, such as that shown in Fig. 66, which engages in the clutch portion 777 of the gear 759. Thus, when the no sale counter is brought into printing position, printing from and resetting thereof will occur in the manner just described.

In order to prevent movement of the reel during a total taking operation of the machine or to prevent operation of the machine when a totalizer has not been properly brought to printing position the following mechanism is provided. As shown in Figs. 61, 62, and 69, it is seen that a bell crank lever 790 is pivoted on a stud 791 provided on the inner side of frame 13. The substantially horizontal arm 792 thereof is provided with a nose portion 793 which is adapted to engage in any one of a plurality of notches 794 provided in a disc 795 fixed to sleeve 802.

Fixed to shaft 145, (Fig. 61) which shaft it will be remembered has pinned thereto the arm 30 (Figs. 4 and 23) associated with the motor switch control mechanism, is a substantially horizontal arm 796 (Fig. 61). Bell crank lever 790 is provided with a depending arm 798 which is adapted to move into engagement with arm 796.

From this construction it is obvious that when the reel is rotated and the nose portion 793 of arm 792 rests upon the high portion between the notches of disc 795, bell crank lever 790 will be rocked in a clockwise direction as viewed in Fig. 49 thereby bringing the lower end of arm 798 over arm 796 and thus preventing shaft 145 from rocking in a counterclockwise direction to release the motor switch control mechanism.

It also follows that when the machine is released for operation shaft 145 will be rocked in a counterclockwise direction which will bring the end of arm 796 into engagement with the left side of depending arm 798 thereby preventing rotation of the reel. This mechanism forms an effective interlock to insure against any misoperation of the associated parts.

It will also be remembered that the disc 667 (Fig. 95), which is provided with arcuate slot 669 for receiving a pin 670 provided at the rearward end of transmission side frame 265, is also moved with the reel. Consequently, when the transmission line has been disengaged and the reel rotated to bring any one of the totalizers or counters to printing position, the concentric portion of disc 667 will engage stud 670 and thereby prevent restoration of the transmission line to operative position until the reel has been restored to its normal position. Thus, an effective interlock is also provided between the control lever and the reel, which prevents restoration of the transmission line until the reel has been properly positioned.

Referring to Figs. 3, 32, 35 and 50, it will be seen that cam 431 (Figs. 35 and 50) is provided with a pair of laterally extending studs 431a which are adapted to engage in an arcuate slot 470a (Figs. 3, 32 and 50) provided in the hub portion of intermittent gear 470. The arcuate slot 470a is concentric with shaft 386 (Fig. 3). Thus, it is clear that when the reel is rotated in the manner aforesaid studs 431a will move out of engagement with intermittent gear 470 which, it will be remembered is journaled in frame 14 (Figs. 3 and 50). Intermittent gears 162 and 470 (Fig. 32) are held in fixed position by the virtue of their specific construction. These gears cooperate to form a lock when in normal position.

Therefore, it is seen that since the parts are held against movement during movement of the reel, studs 431a will again move into engagement properly with arcuate slot 470a when the reel is restored to normal position.

Drawer control mechanism

The drawer control mechanism provided in the illustrated machine is so constructed that a drawer may be selected either by adjustment of the differential segment 242 associated with the clerk's bank of keys or by rotating the reel to bring a selected clerk's totalizer to printing position. The illustrated machine is provided with six drawers, (Fig. 101), one for each clerk, although it is obvious that by slightly modifying the mechanism any number of drawers may be provided.

The drawer selecting mechanism will now be described in detail. Referring to Figs. 69 and 86 to 90, it will be seen, as was pointed out before, that a semi-circular disc 800 is fastened to the sleeve 387, mounted on shaft 386, by screws or any other suitable means. In the same plane with disc 800 is a second semi-circular disc 801 which is fixed to the sleeve 802 also mounted on shaft 386. Sleeve 802 is provided with an enlarged bearing portion 803 which is journaled in intermediate supporting frame 13.

Journaled on sleeve 802 is a gear 294 which has fixed thereto a cup shaped disc 805 formed with a flange 806 (Figs. 69 and 88) which bears against the outer sides of discs 800 and 801. A pawl 807 (Fig. 87) is pivoted to disc 801 at 808 and carries a laterally projecting stud 809 which extends through a radial slot 810 (Fig. 89) provided in disc 801. Stud 809 is adapted to engage into a notch 811 provided in a disc 812 (see also Figs. 69 and 88), which disc is fixed to disc 773 previously described. Flange 806 of disc 805 is also provided with a notch 813 (Fig. 87) which is adapted to receive a nose portion 814 formed on pawl 807. Fig. 87 shows the parts in normal position, in which position it will be noted that stud 809 on pawl 807 is in engagement with notch 811 in disc 812.

As shown in Fig. 86, gear 294 meshes with a gear segment 293 which gear, it will be remembered, is fixed to gear 292 of the transmission line.

Gear 292 is driven by a small pinion 291 fixed to shaft 268 which, it will be remembered, receives its motion from the differential segment 242 associated with the clerk's bank of keys.

When the differential segment 242 associated with the clerk's bank of keys is operated the movement thereof will be transmitted through shaft 268 to pinion 291 and gear 292, thereby causing segment 293 to actuate gear 294 a corresponding amount. Gear 294 meshes with an idler gear 816 which in turn meshes with a gear 817 fixed to the shaft 818 which, as shown in Fig. 4, is journaled in supporting frames 13 and 14.

Also pinned to shaft 818 is a beveled gear 819 which meshes with a beveled gear 820 fixed to the upper end of a shaft 821' (Figs. 4 and 86). Shaft 821' is journaled in a long sleeve 832, which, in turn, is supported by a bracket 822. Bracket 822 is provided with a pair of apertured legs for receiving shaft 818, one leg thereof being fastened to supporting frame 14 by any suitable means such as screws or rivets. The lower end of shaft 821' (Fig. 86) is provided with a long notch which matches with a similar notch provided in the upper end of a shaft 821a which also projects into sleeve 832. These shafts are spaced in this manner to permit relative axial movement of shaft 821a with respect to shaft 821'. A sleeve 833 (Figs. 86 and 104) is pinned to the lower end of shaft 821a. The upper end of a finger shaft 821 is also fixed to sleeve 833.

The parts are constructed in this manner to facilitate assembling thereof in the machine. A disc 831 is provided with an enlarged aperture through which the upper end of sleeve 833 extends. Disc 831 is also provided with a number of screws, the heads of which rest upon a flange provided at the top of sleeve 833. These screws, however, do not bind the flange of sleeve 833 with the disc 831, for a relative movement between these latter two parts is desired, as will be later apparent. The lower end of sleeve 833 rests upon the base plate 10 of the machine proper.

As shown in Fig. 69, the enlarged portion 803 of sleeve 802 has fastened thereto, as was pointed out before, a gear 668 (see also Fig. 92) which meshes with a gear 723. Gear 723, it will be remembered, is actuated by the pinion 722 fixed to thumb wheel 721.

From this series of connections it will be seen that when the control lever is moved toward subtotal or grand total position, shaft 185 will be rocked in a clockwise direction, causing cam 774c fixed thereto to rock disc 773 in a counterclockwise direction, as viewed in Figs. 86 and 92. By this action the cam edge of notch 811 (Figs. 87 and 89) in disc 812 will engage stud 809 carried by pawl 807 thereby rocking the latter downwardly and bringing the nose portion 814 thereof into notch 813 formed in the flange of disc 805. Disc 805 is now coupled to the semi-circular plate 801, which plate it will be remembered, is fixed to sleeve 802.

When the parts are in this position it is seen that upon actuation of thumb wheel 721 (Fig. 92) gear 668 will also be actuated, which, in turn, will rotate sleeve 802 (Fig. 69). This movement is imparted from sleeve 802 to semi-circular discs 801, 800, and to sleeve 387 which, it will be remembered, is fixed to end plate 383 of the reel.

The reel 375 will also be rotated. By this action gear 294 (Fig. 86) which is fixed to disc 805 will also be actuated with the result that said gear will actuate idler gear 816. Gear 816 which meshes with gear 817 will impart movement thereto and thereby rotate finger shaft 821 a distance corresponding to the distance through which the reel has been rotated.

From the description of the above parts, it is clear that an effective mechanism has been provided for selecting a drawer either by movement of the clerk's differential segment or the manual means for selecting a clerk's totalizer for total printing.

After a drawer has been selected by either of the series of connections described above, finger shaft 821 will be elevated to release the selected drawer, by the following mechanism.

As shown in Fig. 86, a cam 825 is fixed to the main driving shaft 20. This cam engages a roller 825' attached to the forward end 826 of a two-arm lever 827 pivoted on a rod 835 supported in intermediate frames 13 and 14. The lower arm of lever 827 is provided with an open slot which receives a stud 828' provided at the upper end of an arm 828 fixed to a shaft 829 journaled in frames 13 and 14. Also fixed to shaft 829 is a forwardly extending arm 830 which engages the bottom surface of disc 831. By this series of connections, it is clear that when shaft 20 is rotated arm 830 will elevate shaft 821 to release the selected drawer which is then actuated to exposed position by the usual drawer spring. The drawer latches and bell mechanism associated with finger shaft 821 will now be described.

Figure 101:
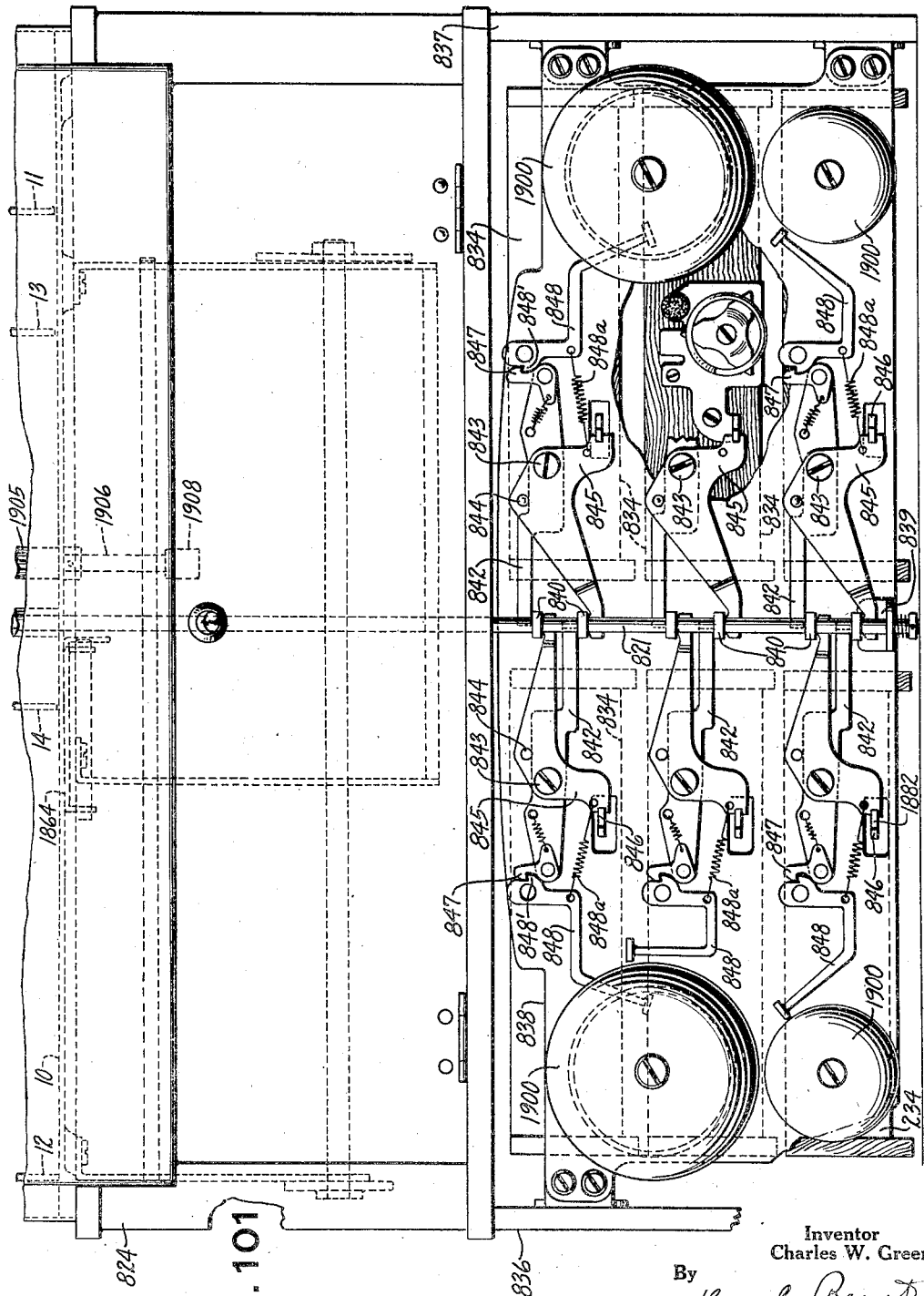
Fig. 101 is a rear elevational view showing the drawer latches and controls therefor. This view also shows the signal bells and their operating mechanisms.

Referring to Figs. 101, 103 and 104, it will be seen that six drawers 834, one for each clerk, are provided. These drawers are arranged in two rows, three in each row and are located some distance below base plate 10 in order to provide a suitable space beneath the base plate 10 to accommodate the card perforating mechanism, which will be described hereinafter.

The cabinet 824, enclosing the card perforating mechanism and the drawers 834, is provided with main side frames 836 and 837. Fixed to suitable brackets provided along the rear edge of frames 836 and 837 by screws or any other suitable means is a back plate 838 which carries the drawer latches and bell mechanisms. As shown in Fig. 101, the lower end of finger shaft 821 is guided in an aperture provided in a bracket 839 fixed to back plate 838. A collar is pinned to the lower end of shaft 821 to limit the upward movement thereof. A compression spring is also provided at the lower end of shaft 821 between the collar and bracket which assists in restoring shaft 821 to normal position.

Finger shaft 821 has fixed thereto six spaced collars 840 each of which is formed with a finger 841 (Fig. 105). The fingers 841 are arranged spirally around shaft 821. Each finger 841 is adapted to be positioned beneath the inner end of a related lever 842 (Figs. 101, 104 and 105). Each lever 842 is pivoted to a stud 843 (Fig. 101) provided on back plate 838 and is adapted to engage a stud 844 provided on a related latch lever 845 also pivotally supported on stud 843. The lower end of lever 845 is adapted to engage in a notch 846' (Fig. 103) provided near the rearward end of a related drawer catch 846. The inner end of each latch lever 845 (Fig. 101) normally lies beneath a collar 840.

The outer end of each lever 842 has pivoted thereon a spring-urged pawl 847, the hook portion of which engages a shoulder 848' of a bell sounding hammer 848. A spring 848a connects each latch lever 845 with a related hammer 848. Each hammer 848 is adapted when actuated to strike a related bell 1900 also attached to back plate 838.

The operation of the parts just described will now be briefly summarized. Upon an operation of the machine, finger shaft 821 (Figs. 86 and 105) is first adjusted to bring a finger 841 (Fig. 105) beneath the end of a related lever 842 associated with the drawer corresponding to the clerk who is operating the machine. Shaft 821 will then be elevated in the manner previously described causing finger 841 to rock lever 842 (Fig. 101) upwardly. Lever 842 when rocked in this manner will engage stud 844 of a related latch lever 845 thus also rocking the latter upwardly to disengage the lower end thereof from notch 846' (Fig. 103) of its related drawer catch 846. The associated drawer spring will then actuate the drawer to exposed position.

When the lever 842 is rocked in the manner just described, pawl 847 by its engagement with shoulder 848' of a related hammer 848 will rock the latter about its pivot against the tension of its spring 848a. This movement continues until pawl 847 is disengaged from shoulder 848' of hammer 848, when spring 848a will then cause the hammer to strike its associated bell 1900.

It is often desirable to operate the machine without sounding a bell, and to this end mechanism has been provided to disable the bell sounding mechanism. Referring to Fig. 104, it will be seen that the bottom surface of disc 831 is formed with a reduced portion 1902 and an enlarged portion 1903. When it is desired to sound a bell the enlarged portion 1903 of disc 831 is brought over the end of arm 830.

Now upon an operation of the machine shaft 821 will be elevated sufficiently by the engagement of arm 830 with the enlarged portion of disc 831 to cause pawl 847 (Fig. 101) carried at the outer end of lever 842 to become disengaged from shoulder 848' and thus permit spring 848a to operate hammer 848 to sound the bell. However, when the reduced portion 1902 is brought over arm 830 and the latter is operated, due to the clearance between the end of arm 830 and disc 831, shaft 821 will not be elevated sufficiently to cause pawl 847 to become disengaged from shoulder 848'. Thus, the hammer will be restrained from striking the bell.

To position disc 831 to perform the above functions a long pinion 1905 (Figs. 4, 100, and 101) is provided. This pinion is fixed to a shaft 1906 (Fig. 4) which is suitably journaled in base plate 10, and meshes with the tooth portion 1907 (Fig. 100) of disc 831. The lower end of shaft 1906 has fixed thereto a knurled knob 1908 (Fig. 101). When it is desired to operate the machine without the use of the bell signals the operator simply turns the knob 1908 to bring the reduced portion of the disk 831 into registering position with the lever 830, the disk 831 and its screws revolving about the sleeve 833. It also follows that when it is desired to again use the bell signal, the knob 1908 is turned in the opposite direction to restore the enlarged portion 1903 of the disk 831 over the end of the lever 830. Projections 1910 (Fig. 100) are provided on disk 831 to limit the movement of the latter when it has been properly adjusted to either position by the pinion 1905.

Control mechanism

The illustrated machine is provided with a single lock control mechanism which enables the proprietor or other authorized person having a key thereto to condition the machine for its various modes of operation. As shown in Figs. 96 and 97, the control lever may be moved to seven different positions of adjustment. In its uppermost position, the control lever through its associated mechanism will condition the machine for printing from and resetting the consecutive number counter.

When moved to the next position or open drawer position, the machine may be operated regardless of whether the drawer is open or closed. The next position in order is the closed drawer position. When the control lever is in this position the machine is locked against operation when the drawer is open and is not released until the drawer has been fully closed.

The next position in order is the unlock clerk's keys position. When the control lever is in this position the plate supporting the individual locks for the clerk's keys may be shifted so that the clerk's keys may be operated in the usual manner without first releasing them from their individual locks. The control lever must then be moved to either open drawer or closed drawer position to condition the machine for operation.

The next position in order is the lock register position, in which position all of the keys are locked against operation. The next positions in order are the sub-total and grand total positions, respectively.

When the control lever is moved to sub-total position, the keys are locked against operation but the machine may be operated to effect printing, after the reel has been rotated to bring one of the totalizers to printing position, by simply depressing the motor bar.

When the control lever is moved to grand total position, the resetting mechanism is conditioned for operation so that after a total is printed from the selected totalizer, the totalizer will be reset to zero by the resetting mechanism. The mechanisms associated with the control lever for conditioning the machine for the various modes of operation just outlined will now be described in detail.

Referring particularly to Figs. 57, 94, 95 and 78, when the control lever 180 is moved to reset consecutive counter position, cam 650' (Fig. 57) provided therein will rock gear segment 652' in a counterclockwise direction about its pivot 653 to the position shown in this figure. Gear segment 652' meshes with a gear 655 fixed to control shaft 185 and thus the latter will be moved slightly in a clockwise direction with the result that the cam portion 789 (Fig. 61) of slot 746 provided in disc 745, which it will be remembered is also fixed to shaft 185, will rock the three-arm lever 744 in a clockwise direction bringing pinion 742 (Fig. 96) into engagement with gears 738 and 739 (Fig. 4), thereby conditioning the resetting mechanism for operation.

It will also be remembered that cam plate 186 (Fig. 96), which is provided with the notches 187 and 189, is also fixed to shaft 185. Thus, when the control lever is moved to reset consecutive counter position, the first notch 187a provided in plate 186 will register with stud 190 on pitman 181. Now, upon depression of the no sale key, a clerk's key, and the motor bar 43, the motor switch will be tripped and the machine will be operated.

When the motor bar is depressed, stud 126 (Fig. 23) carried by link 127 will rock shaft 123 in a counter-clockwise direction, as viewed in Figs. 23 and 24. Stud 126 will also release latch 138 from engagement with the depending arm 136 fixed to shaft 137, thereby permitting shaft 137 to rock in a counterclockwise direction by the action of spring 147 (Fig. 23) on link 141, with the result that arm 30 will be rocked to release the motor switch control mechanism.

When shaft 123 is rocked in this manner, pitman 181 (Fig. 96) will be elevated slightly, thereby bringing projection 190 thereon into notch 187a. If the notch is out of alignment with projection 190, it is clear that shaft 123 will be held against movement and the machine will thus be locked against operation.

When the control lever is moved to reset consecutive counter position, as was pointed out before, pinion 742 (Fig. 4) is rocked into engagement with gears 738 and 739 which operate, respectively, the printing mechanism and the resetting mechanism.

From the foregoing, it is seen that during an operation of the machine, when the control lever is so positioned, printing first will be effected from the consecutive counter mounted in the reel after which the resetting mechanism will become effective to reset both the consecutive counter mounted in the reel and also that associated with the check and slip printing mechanism.

When the control lever is moved to open drawer position, plate 186 (Fig. 96) will be moved to bring the second notch 187b into registering position with respect to stud 190 provided on pitman 181. Thus, when shaft 123 (Fig. 23) is rocked by link 127 in the manner aforesaid, pitman 181 (Fig. 96) will be elevated to bring stud 190 into notch 187b and the machine will be released for operation.

It will be seen that plate 186 is formed with an opening 850 therein (Figs. 96 and 104). Plate 186 is also provided with an enlarged portion 851 which projects into slot 850 and which is concentric with shaft 185. Pivoted on shaft 145 is an arm 853 which is provided with a laterally extending stud 854.

When the control lever 189 is in either reset consecutive counter position or in open drawer position, stud 854 rests upon the concentric portion 851 of plate 186. Arm 853 has formed at the upper end thereof an ear 857 which is adapted to engage over a rearwardly projecting finger 859 formed on pitman 181 near the lower end thereof. When stud 854 on arm 853 engages the concentric portion 851 of plate 186, ear 857 is held out of engagement with finger 859 and the pitman may then be elevated when shaft 123 is rocked in the manner previously described. Also pivoted on shaft 145 is a three-arm lever 852, one arm 855 thereof being adapted to engage arm 853 at a point intermediate its ends.

Another arm 856 of lever 852 carries a compression spring 858 which engages the rear side of arm 853 at a point intermediate its ends. This spring tends to rock arm 853 in a counterclockwise direction into engagement with arm 855 of lever 852. A depending arm 1860 of lever 852 is provided with an open slot into which projects a stud 1861 carried at the upper end of arm 1862 which is fixed to one end of shaft 1863. Shaft 1863 is journaled in a pair of depending ears provided in a bracket 1864 which is fixed to base plate 10.

Also fixed to shaft 1863 at the opposite end thereof is a depending arm 1865 (Fig. 104) carrying a stud 1866 at the lower end thereof which projects into a closed cam slot 1867 provided at the forward end of arm 1869 of a lever 1868. Lever 1868 is pivoted on a stud 1870 provided in another depending ear formed in bracket 1864. A rearwardly extending arm 1871 of lever 1868 has pivoted thereto at 1872 a two-arm pawl 1873. A spring 1874 normally urges pawl 1873 against a projection 1875 formed in lever 1868. A projection 1876 is formed in arm 1871 to limit the movement of pawl 1873 in a clockwise direction about its pivot 1872. Pinned to shaft 821 is collar 1880 provided with a substantially frusto conical surface 1881. The lever 1868 lies adjacent shaft 821 and is adapted to be engaged by the upper flat end of collar 1880.

When control lever 189 (Fig. 96) is moved to closed drawer position the enlarged portion 851 of plate 186 is moved to the position shown in Fig. 96. It is also seen that notch 187c of plate 186 is brought into registering position with respect to stud 190 on pitman 181.

When these parts are thus positioned and the machine is operated, the elevating of the finger shaft 821 (Figs. 86 and 104) during the operation causes collar 1880 to engage lever 1868 and rock the same in a counterclockwise direction. By this action cam 1867 will rock arm 1865 and shaft 1863 in a counterclockwise direction (Fig. 104, and clockwise as viewed in Fig. 96) with the result that arm 1862 will rock lever 852 and the arm 853 in a counterclockwise direction bringing ear 857 over finger 859 of pitman 181, the pitman and finger having been returned by this time to their original positions shown in Fig. 96. This movement of arm 853 is permitted because stud 854 thereon will enter the depression to the left of the enlarged portion 851 of plate 186.

The selected drawer will be released when the shaft 821 is elevated in the manner, as previously described, and its spring will project it to exposed position. Since the ear 857 now lies over the finger 859 of pitman 181, shaft 123 (Figs. 23 and 96) will be held against further operation and the machine cannot be again released for operation.

Toward the end of an operation of the machine shaft 821 (Fig. 104) will be lowered to normal position. Lever 1868 will remain in operated position while shaft 821 is lowered to normal position with the result that the inner end of pawl 1873 carried thereby will be engaged by the enlarged portion of collar 1880 and will thus be rocked in a clockwise direction about its pivot.

No motion, however, will be imparted to lever 1868, because the spring 1874 will exert a force only great enough to restore pawl 1873 to normal position against projection 1875. Since lever 1868 remains in operated position ear 857 will remain over the finger 859, and the machine, as before stated, cannot be operated until these parts are moved to normal position.

When the released drawer is moved to closed position, however, the cam surface 1882 (Fig. 104), provided at the end of the related drawer catch 846 will engage the end of its associated latch lever 845 and rock the same upwardly. The inner end of each latch lever 845, it will be remembered, engages a collar 849 pinned to the finger shaft 821 and consequently the latter, by this action, will be elevated slightly to bring the slanting surface of member 1881 into engagement with the inner end of pawl 1873, which at this time will be lying in the dotted line position shown in Fig. 104.

When pawl 1873 is in this position the point of contact thereof with member 1881 is on a line with the pivot point 1872 of said pawl and consequently as the shaft 821 rises, the member 1881 will rock lever 1868 clockwise to normal position, thereby causing arm 855 of lever 852 to rock arm 853 in a clockwise direction (Fig. 96) to bring ear 857 thereof out of alignment with finger 859 of pitman 181. The movement of shaft 821 by cam 1882 (Fig. 104) when the drawer is moved to closed position is not as great as the movement imparted thereto by arm 330 to release a selected drawer for operation and thus collar 1880 will not engage lever 1868 as is done in the latter case. The machine may now be operated in the usual manner.

When the control lever 180 (Fig. 96) is moved to unlock clerk's position plate 186 will be moved so as to bring the unnotched portion thereof located substantially midway between notch 187c and notch 189a, between studs 190 and 191 of pitman 181.

Figure 98:
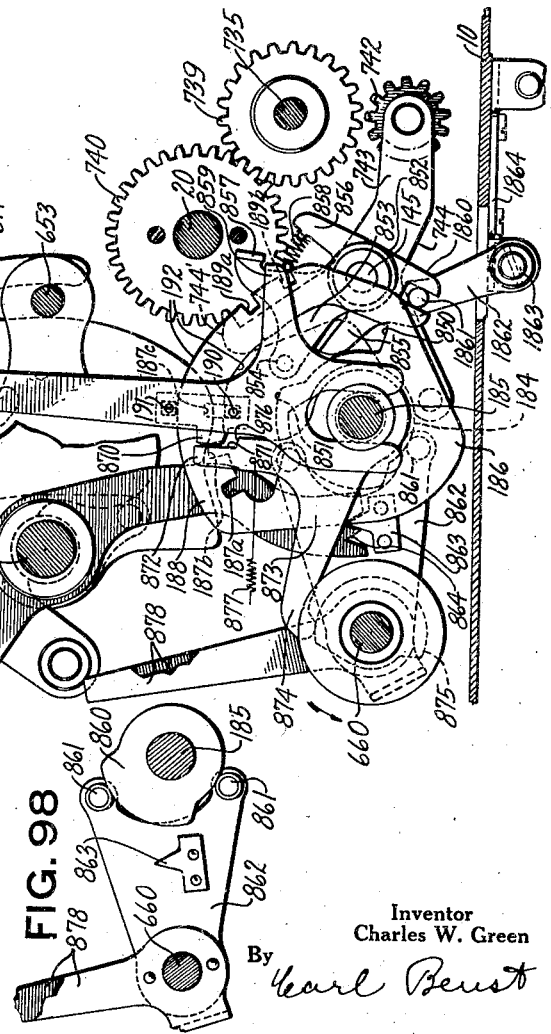
Fig. 98 is a detail view of the cam which is fixed to the control shaft for locking the clerks' and transaction differentials during total taking.

When moved in this position it is obvious that shaft 123 will not be permitted to rock in the usual manner to release the machine for operation. Fixed to shaft 185 (Fig. 98) is a cam 860 which engages a pair of rollers 861 provided at the rearward end of an arm 862 pivoted on shaft 660. Lever 862 is provided with a detent 863 intermediate its ends which is adapted to engage in either one of two notches 864 (Fig. 96) provided at the lower end of a bell crank lever 865 pivoted on shaft 240. The upper forwardly extending arm of bell crank lever 865 is provided with an open slot 866 which receives a stud 867 fixed to supporting plate 215 for the individual clerk's locks 214, (Fig. 27). A spring 868 tends to rock bell crank lever 865 in a clockwise direction.

When the control lever is moved to unlock clerk's keys position cam 860 will rock arm 862 downwardly thereby bringing detent 863 out of engagement with the notches 864 of bell crank lever 865. Plate 215 which supports the individual clerk's locks 214 may now be moved downwardly against the tension of spring 868 to bring the projecting portions 219 (Fig. 29) of the lock bolts out of engagement with their corresponding laterally projecting studs 218 provided on the keys 41 (Fig. 28).

Now, upon movement of the control lever back to either open drawer or closed drawer position detent 863 (Fig. 27) will be brought into the forward notch 864 of bell crank lever 865 thereby positively holding plate 215 in unlocked position. This mechanism is provided to enable the proprietor to release all of the clerk's keys from locking engagement with the individual locks 214 when it is not desired to make use of these locks.

When the control lever is moved to lock register position the inner cam surface 192 (Fig. 96) of plate 186 will engage stud 190, thereby moving pitman 181 downwardly. By this action arm 183 will rock shaft 123 in a clockwise direction with the result that arm 124 (Fig. 23) will also be moved in a clockwise direction bringing the top side thereof adjacent stud 126 carried by plate 127. When shaft 123 is rocked in this manner it will be remembered that all of the keys are locked against operation due to the engagement of the lower arms 195, 193 and 196 (Fig. 14) of detents 96, 86 and 107 respectively with their respective release arms 93, 83 and 104.

When the control lever has been fully moved to lock register position notch 189a (Fig. 96) will register with projection 191 of pitman 181. This also is the position of notch 189a in plate 186 when the control lever has been moved to sub-total position since, as will be pointed out hereinafter, shaft 185 does not move during movement of control lever 180 from lock register position to sub-total position. To prevent release of the machine when the control lever is in lock register position, the following mechanism is provided.

As shown in Fig. 96, a forwardly extending projection 870 is provided on pitman 181. Projection 870 is adapted to engage in an open notch 871 provided in the substantially vertical arm 872 of a two-arm lever 873 which is loosely pivoted on shaft 185. A substantially horizontal arm 874 of lever 873 is provided with a nose portion which engages a cam 875 fixed to shaft 660.

It will be remembered that during movement of the control lever 180 from reset consecutive counter position to lock register position shaft 660 remains stationary since stud 672 (Fig. 94) provided on the upper arm of segment 674 for actuating shaft 660 is then still in engagement with the concentric portion of cam 671. Thus, no motion is imparted to shaft 660 during this period. However, by movement of control lever 180 between the positions just mentioned shaft 185 will be rocked by gear segment 652' (Fig. 57) to position plates 186 in the manner just described.

Thus, when control lever 180 is moved to lock register position cam 875 (Fig. 96) remains stationary and holds arm 874 of two-arm lever 873 in the position shown in Fig. 78. During this movement of the control lever pitman 181 as was pointed out before will be cammed downwardly by the inner cam surface 192 engaging stud 190 in the manner just described. When this occurs the end of projection 870 will just engage shoulder 876 and thus prevent further downward movement of pitman 181 which is necessary to release the machine for operation.

It, therefore, is seen that if the motor bar 43 (Fig. 23) is now depressed the motor switch will not be closed since shaft 123 is held against movement by the engagement of projection 870 (Fig. 96) on pitman 181 with the shoulder 876 of lever 873. Thus, when the control lever is moved to lock register position all of the keys are locked against operation and by virtue of projection 870 engaging shoulder 876 of lever 873 downward movement of pitman 181 is prevented, which, as was stated before, is necessary to effect release of the machine for operation.

It will be remembered that when control lever 180 is moved to unlock clerk's keys position cam 860 (Fig. 98) will rock arm 862 downwardly to release detent 863 from engagement with a notch 864 (Fig. 96) provided at the lower end of bell crank lever 865.

Figure 100:
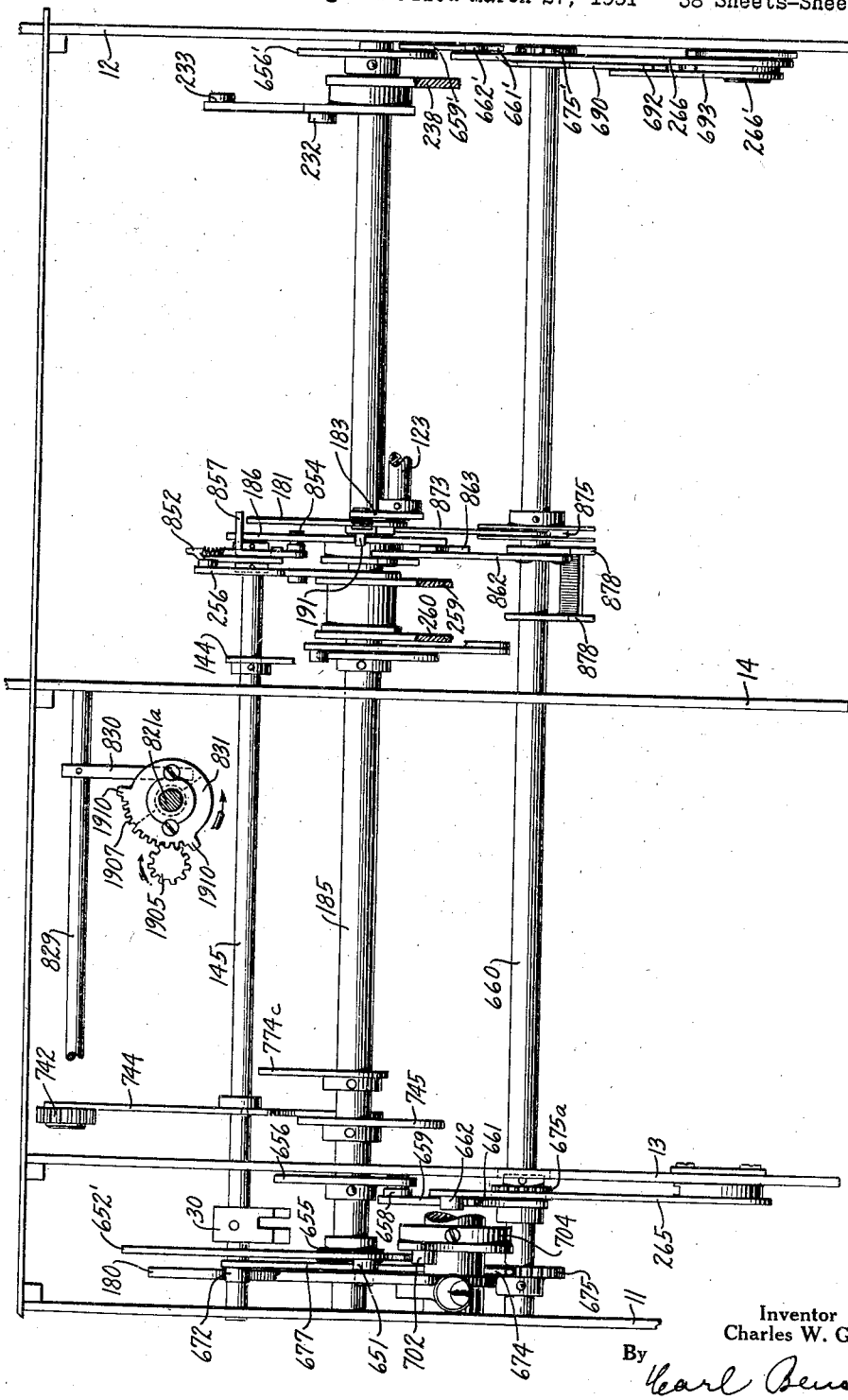
Fig. 100 is a general plan view of the control mechanism.

Referring to Figs. 11, 96 and 100, it will be seen that also fixed to arm 362 (Fig. 96) and journaled on shaft 660 are a pair of substantially vertical arms 878. These arms act as zero stops for the differential segments 242 for the clerk's and transaction banks of keys, respectively, during total taking operation of the machine. Thus, it is seen that when control lever 180 is moved to unlock clerk's key position arms 878 will be moved under studs 316 provided on the differential segments 242 for the clerk's and transaction banks of keys. Cam 860 for rocking arm 862 and arms 878 is so constructed that it will hold these arms in operated position when the control lever is also moved to lock register, sub-total and grand total positions.

When the control lever is moved to sub-total position the dwell portion of cam slot 650' (Fig. 57) will engage stud 651' in segment 652' and thus no movement will be imparted to gear segment 652', with the result that plate 186 (Fig. 96) will remain in the same position that it occupied when the control lever had been moved to lock register position.

However, when the control lever is moved from lock register position to sub-total position cam portion 671 (Fig. 94) on the upper edge of control lever 180 will engage stud 672 on an arm 673 of segment 674 with the result that the latter will be rocked in a clockwise direction thereby rotating shaft 660 in a counterclockwise direction. When this occurs pinions 675a and 675b will actuate side frames 265 and 266 of the transmission line to swing the latter outwardly to disengage the gears thereof from the cooperating gears of the machine, in the manner described hereinbefore.

At the same time cam 875 (Fig. 96) fixed to shaft 660 will be moved in the direction of the arrow, causing a cutaway portion thereof to register with the end of arm 874 of two-arm lever 873. Spring 877 attached to the lever 873 will then rock the latter in a counterclockwise direction removing the shoulder 876 from engagement with projection 870 of pitman 181. Thus, when one of the totalizers on the reel is moved to printing position and the motor bar 43 (Fig. 23) is operated, the shaft 123 may be rocked in clockwise direction to permit release of the motor switch control mechanism. When this occurs the printing mechanism will be operated to effect a printing impression from the selected totalizer, upon the detail record strip.

From the foregoing description, it is seen that upon operation of the machine, for a total taking operation, the latch pawls 245 (Fig. 10) associated with the clerk's and transaction differential segments 242 will be disengaged from their drivers in the zero position. The drivers for these differential segments 242 however, will continue their movement to operated position and will then return to normal position as in other operations of the machine.

It is not necessary to provide an arm 878 (Fig. 96) for each of the amount differentials 242 since each of these segments, it will be remembered, has associated therewith a zero stop pawl 72 (Fig. 10) which is effective to break the associated differential latch in zero position when no key has been depressed as was pointed out hereinbefore.

Since all of the keys are locked against operation from the time the control lever is moved to lock register position the drivers associated with the amount banks of keys will also have an idle movement similar to the drivers associated with the clerk's and transaction differential segments 242 for total taking operation.

As pointed out hereinbefore the machine is provided with an auditor's lock by which the grand total printing and resetting is controlled. The control lever is moved to each of the above referred to positions by means of a key inserted in a lock 893 (Fig. 94). An arcuate notched plate 887 is fixed to the inner side of the frame 11 (Fig. 69). The lock 893 is provided with a tubular bolt 892', having a locking portion 894 which is normally adapted to register with a series of notches 887' formed in plate 887. There is one notch 887' for each position of the control lever except the unlock clerk's position and the grand total position. Fixed to the plate 887 at the front thereof is a block 888.

The lock 893 is adapted to be operated in two different manners with two different keys in the following manner:

Referring to Figs. 78 and 79, it will be noted that the bolt 892' of the lock 893 has been provided with two peripheral grooves 890. These two grooves are alined and extend substantially 90° to the left (Fig. 78) of the two lower tumblers 890'. Therefore, if a key is provided for unlocking all of the tumblers 890' except the two associated with the grooves 890, the bolt of the lock may be rotated, but in only one direction and to the extent or limit of the peripheral grooves 890. Such a key is provided and placed in the hands of an authorized person such as the manager of the store.

Consequently, the manager has a limited access to the lock 893, with the result that he can only move the locking portion 894 to the right as indicated by the arrow in Fig. 77. This locking portion 894 projects from a collar 892 secured to the bolt 892'. When the lock is used thus, it will be noted that the locking portion 894 thereof will abut against block 888 when the control lever has been brought to sub-total position.

Therefore, it will be seen that it is not possible to bring the control lever to grand total position, wherein, as pointed out hereinbefore, the totalizer may be printed from and reset to zero. However, if a proper key is inserted in the bolt 892' of the lock 893, viz., one capable of setting all of the plungers 890' in line with the outer surface of the bolt, it will permit the rotation of the said bolt 892' in either direction.

Thus, a key of this type is entrusted to an auditor and he may remove the locking portion 894 from engagement with the plate 887 by a counter-clockwise rotation of the bolt 892' with the result that the control lever may now be brought to grand total position as is clearly seen by the dash and dot position of the portion 894 in Fig. 77.

It will be noted that when an auditor's key is placed in the lock bolt 892' (Fig. 78) the breaking point between the tumblers and the revolving parts is at the point 893' between sleeve 892a and the lock housing 893. Thus, if the bolt of the lock is rotated to the right at this time the tumblers 890' will be prevented from entering the grooves 890 by virtue of the sleeve 892a which it is seen will be engaged with the tumblers 890a and will move therewith. However, when the lock is operated by the manager's key the sleeve 892a will not move, being held by the two lower tumblers 890'.

In order to locate the different positions of adjustment of the control lever 180 (Fig. 94) in respect to the plate 887, control lever 180 is provided with a spring detent 889. Detent 889 is adapted to register with the notches 889' provided in the under concentric portion of plate 887. There is one notch 889' for each of the positions of the control lever and by this means the manager or auditor can readily aline the locking portion 894 with the notches 887'.

Now, when the control lever is moved to grand total position, by means of the auditor's key, shaft 185 will be given an additional rocking movement in a counterclockwise direction by the action of the cam portion provided at the lower end of slot 650' engaging stud 651' of segment 652' (Fig. 57). When shaft 185 is moved in this manner plate 186 (Fig. 96) will also be moved in the same direction to bring notch 186b into registering position with respect to projection 191 provided on pitman 181.

During movement of the control lever from sub-total to grand total position shaft 660, however, will be held stationary since during this movement a second concentric portion 671c provided on cam edge 671 of control lever 180 will have moved into registering position with stud 672 of segment 674 (Fig. 94). When shaft 185 is moved upon movement of the control lever from sub-total to grand total position, portion 746' (Fig. 61) of the cam 746 will engage stud 747 on three-arm lever 744 thereby rocking the latter in a clockwise direction to engage pinion 742 (Fig. 4) with gears 738 and 739 to condition the resetting mechanism for operation.

Now, when the reel is rotated to bring a totalizer to printing position and the motor release bar 43 is depressed, a printing impression will be effected from the selected totalizer and its related special counter, after which resetting of the totalizer and of the special counter associated therewith will be effected by the resetting mechanism in the manner described hereinbefore.

Figure 99:
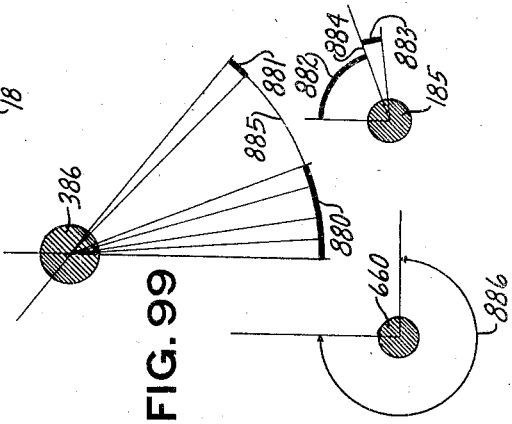
Fig. 99 is a diagrammatical view illustrating the relative movements of the control shafts during the movement of the control lever.

Fig. 99 illustrates diagrammatically the relative movements of shafts 185 and 660 during movement of the control lever 189 to its various positions of adjustment. The heavy portion 880 illustrates the movement of the control lever from reset consecutive counter position to lock register position while the heavy portion 881 illustrates the movement thereof from sub-total position to grand total position.

The heavy portion 882 associated with shaft 185 illustrates the angular movement of shaft 185 during movement of the control lever from reset consecutive counter position, to lock register position, while the heavy portion 883 shows the angular movement of shaft 185 during movement of control lever 180 from sub-total to grand total position. The radial line 884 connecting the heavy portions 882 and 883 illustrates the dwell in cam slot 650' (Fig. 94) during which time motion is transmitted to shaft 660 by cam 671.

The light line 885, shown in Fig. 99, illustrates the movement of control lever 180 from lock register position to sub-total position and light portion 886, shown in connection with shaft 660, illustrates the angular movement of shaft 660 during movement of the control lever from lock register position to sub-total position which is a distance equal to substantially 270°.

During movement of control lever 180 from reset consecutive counter to grand total position, shaft 185 is intermittently moved through an angle of substantially 90° while shaft 660 is moved through an angle of substantially 270°. During movement of the control lever from lock register to sub-total position, it is seen, is the only time at which motion is imparted to shaft 660.

A novel construction is shown in the machine for identifying the sub or grand totals which are printed upon the record strip. This identification protects the record to the extent that when the grand total symbol is printed, it is a proof that the corresponding totalizer is reset to zero. This construction will now be described. Referring to Figs. 33, 63, 72 and 73, it will be noted that a disc 4501 is keyed to each totalizer shaft 396 and is positioned adjacent the aforementioned type disc 450 which, it was pointed out, is located adjacent each special counter associated with each totalizer.

As was seen in the description of the resetting mechanism, each shaft 396 is adapted to be moved axially to the left (Fig. 63) and is then rotated clockwise (Fig. 64). It will be remembered that this movement does not disturb the setting of the totalizer wheels. This movement of shaft 396 takes place in the present machine before the printing mechanism has effected an imprint of the total standing on the totalizer wheels.

Therefore, it will be clear that if a type 4501', as shown in Figs. 72 and 73 is provided on the disc 4501, it will be moved around to printing position by the aforesaid movement of the shaft 396 and when the printing mechanism is subsequently operated this type will also appear adjacent the printed total.

By keying the disc 4501 to the shaft 396 in the manner shown in Figs. 72 and 73, a relative movement between the disc 4501 and the shaft 396 is permitted to allow for the axial movement of said shaft. It will, of course, be understood that when no resetting of the totalizers takes place, such as in the sub-total position of the control lever, the shaft 396 will remain stationary and thus the disc 4501 will not be moved. To identify this sort of total the disc 4501 is provided with another raised character 4502 which is normally printed for identifying a sub-total. This character in the present machine represents the letter S, as will be viewed in Fig. 61. The character designating a grand total, as will also be viewed in the above figures, represents the letter G.

By the above arrangement a positive means is provided to distinguish the totals so that the presence of the letter G adjacent to any printed total is proof that the corresponding totalizer has been reset to zero.

It will also be remembered that when the control lever is moved to lock register position, the transmission line is still in normal position, but the cam shaft 430 (Fig. 54) provided in the reel, as well as the other moving parts therein are locked against operation. The keys are also locked against operation. The shoulder 876 (Fig. 96) of three-arm lever 873 is still in alignment with projection 879 of pitman 181 and therefore the machine will not be released for operation upon depression of motor bar.

However, if by any chance the machine were accidentally operated when the parts are in this position several of the locked parts would be damaged. In order to insure against any such mishaps, mechanism is provided which compels rotation of the reel to release the machine for operation when the parts have been adjusted to this position. To this end, as will be seen in Figs. 61 and 62, a bell crank lever 900 is provided. Bell crank lever 900 is pivoted on 791 and is provided with an upper arm 901 having a projecting portion 902 which is adapted to engage in a notch 903 of plate 904, which plate is fixed to notched disc 795. The lower arm 905 of bell crank lever 900 is formed with an ear 906 which is adapted to engage the outer edge of cam plate 745. Intermediate the pivot 791 and ear 906 arm 905 is provided with a shoulder 907 which is adapted to engage arm 796 which arm it will be remembered is fixed to shaft 145. A spring 908 urges bell crank lever 900 in a clockwise direction. The edge of cam plate 745 is so constructed that during movement of the control lever from reset consecutive counter position to unlock clerk's keys position, ear 906 will ride on the concentric portion of cam plate 745.

Upon movement of control lever 180 to lock register position, however, the cutaway portion 909 of cam plate 745 will register with ear 906 and permit spring 908 to rock bell crank lever 900 in a clockwise direction bringing nose portion 902 into notch 903 of disc 904. At the same time, shoulder 907 provided on bell crank lever 900 will move over the end of lever 796 and thereby prevent rocking of shaft 145 to release the machine for operation.

It will also be remembered that during movement of the control lever from lock register position to sub-total position shaft 185 carrying cam plate 745 will not be moved.

Movement of the control lever to this position simply causes the transmission line to be swung out of normal position.

Thus, upon rotation of the reel to bring a selected totalizer to total printing position notch 903 of disc 904 will cam bell crank lever 900 in a counter clockwise direction removing the shoulder 907 thereof from engagement with arm 796. The nose portion 902 will then engage the concentric portion of disc 904 and ride thereon until the reel is restored to normal position, when the nose portion 902 will again be moved into notch 903 by spring 908. This condition also exists when the control lever is moved to grand total position, since it will be seen in Fig. 61, that the cutaway portion 909 extends to the end part of cam 745 which allows for the further movement of cam 745 when the control lever is moved from sub-total to grand total position. From the above it is clear that an effective interlocking mechanism is provided which prevents any mis-operations of the machine by making it necessary to rotate the reel to properly position a totalizer into printing position before the machine can be released for operation.

General Summary of Operations

The nature of the present invention is such that in order to make the foregoing description as clear as possible it was necessary to state the structure and operation of each feature considerably in detail. A complete restatement of the operation of the present invention is therefore believed to be unnecessary, however, a résumé of the general operation of the machine will now be given to coordinate the operation and functions of the various parts which have been described in detail.

Let us assume that all of the parts of the machine are in normal position, and that the control lever 180 (Figs. 1 and 97) is in open drawer position, and that the A clerk has just made a sale amounting to $1.25. In order to operate the machine, the A clerk will first insert his key into his lock 214 (Figs. 27 to 29) and then rotate the bolt to bring the projection 219 of the bolt out of engagement with the stud 218 attached to that key.

He then will depress the 5-key in the penny bank, the 2-key in the dime bank, the 1-key in the dollar bank, the A-key and the cash key, and then the motor bar 43. The machine is now released for operation and the motor will operate the machine to enter this item in the A totalizer, the cash totalizer, and the grand totalizer, and record the machine upon the detail record strip.

When the 5-key in the penny bank is depressed, the segmental cam plate 58 (Figs. 10, 17 and 30) associated with that bank of keys will be cammed upwardly thus rocking the zero stop pawl 72 in a clockwise direction about its pivot 73. At the same time, the associated detent plate 57 will also be cammed upwardly until the pin 53 moves past the hook-shaped portion 57' associated therewith when spring 68 will move the detent plate downwardly and hold the key in depressed position.

If the operator discovers that he has made a mistake and that he should have depressed another key in that bank, upon depression of the proper key, detent plate 57 will again be moved upwardly, with the result that the previously depressed key will be released and its associated spring 52 will restore it to normal, and the second key will be held in depressed position by its associated detent 57'.

When zero stop pawl 72 (Figs. 8, 14 and 17) is rocked in the manner aforesaid, its arm 74 will be moved away from its associated differential segment 242. At the same time, the arm 76 of pawl 72 will rock the arm 78 and the rod 79 in a counter clockwise direction carrying all of the arms 78 associated with the amount banks of keys downwardly. Thereupon the lever 80 will rock the release arm 83 counter clockwise thus disengaging the projection 84 from the arm 85 of the detent 86 pinned to shaft 123.

Therefore, it is seen that when the 2-key in the dime bank and the 1-key in the dollar bank are depressed, no further movement will be imparted to rod 79. Now, upon depression of the A-key in the clerk's bank, the lever 99 is rocked clockwise (Fig. 16) to rock the release arm 104 counter clockwise to move the projection 105 thereof away from the detent 107 (Fig. 14) which also is fixed to shaft 123. The detent plate 57 associated with this bank of keys will hold the A-key in depressed position.

Now, upon depression of the cash key (Figs. 19 and 20) the cam plate 58 associated therewith will be rocked upwardly thereby rocking its associated bell crank lever 88 clockwise to rock release arm 93 counter clockwise to move the projection 94 away from the detent 96 which also is fixed to shaft 123. It is now seen that release arms 83, 93 and 104 are moved out of engagement with their associated detents 86, 96 and 107.

Referring to Figs. 23 to 26, it will be remembered that pinned to the shaft 123 is an arm 124 with a slot 125 receiving a stud 126 on a link 127 with a foot normally engaging a roller 133 on the plate 43' fixed to a motor bar 43. Now, upon depression of motor bar 43, roller 133 will be moved out of engagement with foot 134 and spring 135 will urge link 127 downwardly and rock the shaft 123 counter clockwise.

When link 127 is moved downwardly by its spring 135, the stud will coact with latch 138 and the latch 138 will be disengaged from arm 136 and spring 147 will urge the link 141 upwardly thereby rocking the shaft 145 clockwise to move the finger 30 away from the motor switch control mechanism and the motor switch will be closed and the machine will be operated.

It will be also remembered that link 127 carries the stud 157, and immediately upon release of arm 136 from latch 138, spring 147 will urge link 141 upwardly thereby rocking shaft 137 and arm 136 counter clockwise causing arm 136 to engage stud 157 and thus move link 127 upwardly slightly beyond normal position. When this occurs, the spring 150 will restore the motor bar 43 to normal position bringing the roller 133 into alinement with the end of foot 134. When shaft 137 is rocked in a counter clockwise direction by spring 147 the arms 154 fixed to shaft 137, through the connections shown in Figs. 30 and 31, will rock their associated bell crank levers 64 counter clockwise causing the detents 62 to further embrace the key pins 53. At the same time the flat surfaces 156 will be brought under the related pins 53 of all of the undepressed keys.

Near the end of an operation of the machine, the stud 163 (Figs. 10 and 23) on the gear 162 will, through the lever 165, lower the link 141 which will rock shaft 137 clockwise substantially 20° beyond its normal position. When this occurs, the arm 136 will cam latch 138 downwardly against the tension of its spring 169 until clearing the end thereof, when spring 169 will restore latch 138 to normal position. When shaft 137 is rocked in this manner, all of the detents 57 through the connections shown in Figs. 30 and 31 will be moved upwardly beyond normal positions to permit the key springs 51 to restore the keys to normal positions.

When shaft 123 is rocked counter clockwise by link 127, the projection 177 thereon will move into engagement with pawl 175 to prevent movement of shaft 20, until link 127 has been moved upwardly by spring 147. It also follows that when the machine is operated, pawl 175 will be moved beneath projection 177 to prevent link 127 from being rocked downwardly during movement of rotation shaft 20. When the arm 30 is moved away from the motor switch control mechanism, the motor switch will be closed and the electric motor 21 will drive the main shaft 20 through one complete revolution.

As shown in Figs. 3, 4, 8 and 10, cams 230 and 231, through the segments 238 and 239, the shaft 240, the driving segments 241 and pawls 245, drive the differential segments 242. Cams 230 and 231 are so designed that the segments 241 will first, be rocked downwardly and then, restored to normal position at each operation of the machine. If no key in the bank is depressed, the zero stop pawl 72 will disengage the pawl 245 from segment 241 and the differential segment 242 will stop in zero position.

When a key is depressed, zero stop pawl 72 is rocked clockwise and the segment 241 then rocks the differential segment 242 downwardly until the end of pawl 245 strikes a depressed key, which disengages said pawl from the segment 241 and the differential segment stops in such position.

When the 5-key in the penny bank is depressed the differential segment 242 is set in the 5 position. In a like manner, the differential segments 242, associated with the dime and dollar banks of keys respectively, will be actuated until stopped by the keys depressed in those banks.

The differential segments 242, through the segments 262, gears 263, shaft 264, side frames 265, 266 and 1014, shafts 270, and pinions 271 (Fig. 2), transmit motion from the amount differential segments 242 to the various mechanisms of the machine.

As shown in Figs. 3, 4, 11 and 12, the driving segments 241′ for actuating the differential segments 242 associated with the clerks' and transaction banks are actuated in a manner similar to the amount differentials as previously described.

The mechanism for selecting and operating the totalizers will now be reviewed. When the keys previously mentioned are depressed, motion of the differential segments 242 associated with the pennies, dimes and dollars banks of keys will be transmitted to the actuating gears 275 which are pivotally mounted on the sleeve 389 provided on shaft 386 in axial alinement with shaft 240 (Figs. 3 and 57). The movement of the differential segment 242 associated with the clerk's bank of keys will be transmitted by shaft 268 to selector plate 283, actuating gear 287, and selector plate 290 to adjust these members to a position corresponding to the key depressed, which in this case, is the A-key.

Motion is also transmitted from the differential segment 242 associated with the transaction bank of keys through shaft 269, to selector plate 300, actuating gear 304 and selector plate 307. These members will also be positioned an amount corresponding with the distance travelled by the transaction differential segment 242 from normal position until stopped by the cash key. During adjustment of the actuating gears 275 in this manner the totalizers are held out of engagement therewith.

Operation of the selected totalizers by the actuating gears 275 takes place during the return movement of these gears. The mechanism for selecting and engaging the totalizers with actuating gears will now be briefly summarized.

Referring to Figs. 33 to 40, it will be recalled that the six clerks' totalizers 372, A, B, D, E, H and K; the four transaction totalizers 373 representing cash received on account, paid out, and charge transactions respectively; and the grand totalizer 374 are rockably supported in the totalizer reel 375 held stationary by suitable locking mechanism. Upon an operation of the machine, when the A-key is depressed, selector plate 283 will be moved substantially 3° to bring the projection 398 thereon associated with the A-totalizer beneath the ear 399 on the rock arm 400. The stud 404 on the lever 402 engages the notch 405 in the operating plate 406 and the cam slot 407 receives the stud 408 in the rock arm 409. The end of the rock arm 409 has the closed cam slot 412 to receive the end of the shaft 495 supporting the A-totalizer.

As shown in Fig. 35, operating plate 406 carries the studs 435 and 436 engaged by the cams 431 and 431′ respectively. At substantially the same time that selector plate 283 is positioned, the selector plate 300 is moved through substantially 3° to bring the projection 398′ beneath ear 399′ of rock arm 400′ associated with the cash totalizer. There are a similar series of connections 402′ and 409′ leading from rock arm 400′ to the cash totalizer shaft 396 as are provided for the A-totalizer just described.

There are a similar series of connections provided for the grand totalizer except that no projection 398 is provided on either of the selecting plates 283 or 300 for the grand totalizer. Instead of stud 425 is provided on the end plate 382 for engaging the ear formed on the rock arm associated with that totalizer. Thus, it is seen that upon rotation of shaft 430, the cams 431 and 431′ will rock plate 406 counter clockwise thereby causing arms 409, 409′ and 413 to engage their respective totalizers with the actuating gears 275. These totalizers will remain in mesh with the actuating gears 275 until the latter are fully restored to normal position. When gears 275 have thus been restored to normal positions the plate 406 is rocked in the reverse direction, which through the connections just described disengages the totalizers from their actuating gears 275.

Interspersed between the actuating gears 275 are the transfer plates 455, each plate being provided with a pair of studs 459 and 459′ which engage the cams 458 and 458′, respectively. There is one pair of cams 458 and 458′ for each transfer plate 455. These cams are fixed to shaft 430 and are arranged spirally therealong so that transfers will be effected from the lowest denominational order to the highest order in seriatim.

Each plate carries a plurality of pins 456; one for the transfer arm 454 of a similar denominational order wheel of each of the totalizers mounted in the reel. Thus, it is seen that upon further rotation of shaft 430, after the totalizers have been disengaged from their actuating gears, cams 458 and 458′ can effect transfers simultaneously in all of the totalizers mounted in the reel.

It will be remembered that a special counter 372′ is mounted on each of the shafts 396 supporting the clerk's totalizers and that a special counter 373′ is mounted on each of the shafts supporting the transaction totalizers 373 and also that a special counter 374′ is mounted on the shaft supporting the grand totalizer 374. A consecutive counter 380 is also mounted on the shaft 376 supporting the item type carriers 377.

Also mounted in the reel in a bracket 381′ is a no sale counter 381 for registering the number of no sale transactions effected in the machine. The counter operating mechanism is so constructed that a unit will be added in the counters 372′, 373′ and 374′ if their associated totalizers are selected for operation regardless of whether these totalizers are rocked into engagement with the actuating gears 275. The consecutive counter 380 is selected and operated for each cash, received on account and paid out transaction entered in the machine.

Upon an operation of the machine when the A-key has been depressed selector plate 290 will be moved substantially 3° in a clockwise direction, as viewed in Fig. 47, to bring the first projection 437 thereon beneath a stud 438 projecting from a floating bell crank lever 439 associated with the A-counter 372′. In the same manner plate 307 when the cash key has been depressed, will be rocked in a counter clockwise direction to bring projection 447 beneath stud 438′ of the floating bell crank lever 439′ associated with the cash counter.

Projection 449a in plate 307 will be brought beneath a stud 438′ projecting from floating lever 439′ associated with the consecutive counter 380. In the same manner, a projection 448 provided on plate 307 will be brought beneath a projection 438′ provided on the floating lever 439′ associated with the counter 474′ for the grand totalizer 474. Floating levers 439 and 439′ are positioned between a fixed plate 432 and a counter operating plate 451, as shown in Fig. 49. Studs 438 and 438′ are guided in related slots 433 and 433′ provided in plate 432.

Operating plate 451 is provided with a series of studs 442; one for each floating lever 439 and 439′. Each stud projects into a substantially L-shaped slot 441 or 441′ provided at the lower end of each bell floating lever 439 or 439′. The outer end of each lever 439 is provided with a stud 444 which operates in a slot 445 provided in a respective counter operating bail 446.

Operating plate 451 is provided with a pair of studs 452 which project into arcuate slots 453 in end plate 383 and engage cams 454 and 454′ respectively, fixed to cam shaft 430. Thus, it is seen that when selector plates 290 and 307 are positioned in the manner aforesaid and cam shaft 430 is rotated, cams 454 and 454′ will rock operating plate 451 in a clockwise direction, as viewed in Fig. 46, causing the studs 442 thereon to rock bell crank levers 439 and 439′ in a counter clockwise direction.

This movement is imparted to the counter operating bails 446 to effect the registration of a unit in each of the selected counters. The levers 439 and 439′ of the unselected counters will not be rocked in this manner since no projection on the selector plates will be brought beneath the studs 438 or 438′ provided thereon.

When operating plate 451 is rocked in the manner aforesaid the studs 442 thereon will traverse the slots 441 of levers 439 and 439′ of the unselected counters thus moving the latter downwardly without imparting any rocking movement thereto. Later, but during the same rotation of shaft 430, operating plate 451 will be rocked in the reverse direction to restore the parts to normal position.

It will be remembered that the selector plates 283 and 300 for the totalizers and the selector plates 290 and 307 for the special counters are actuated by the differential segments 242 associated with the clerks and transaction banks of keys respectively. It was also pointed out before that the segments 242 associated with these banks of keys remain in adjusted position while the differential segments 242 associated with the amount banks of keys are restored to normal position.

It is seen that the mechanism is constructed in this manner to permit the selector plates to remain in adjusted position while the entry of an item is effected in the selected totalizers, which occurs during the return movement of the actuating gears 275. After the totalizers have been thus operated, cams 230′ and 231′ will actuate the drivers 241′ associated with the clerk's and transaction differential segments 242 to restore them also to normal position. When this occurs all of the selector plates will also be restored to normal position therewith.

Cam shaft 430 is connected to an intermittent gear 470 which is driven by a second intermittent gear 162. Gear 162 has fixed thereto a gear 161 which meshes with an idler gear 160 which in turn meshes with a pinion 159 fixed to the main shaft 20.

Upon rotation of shaft 20 cam shaft 430 will also be rotated. Due to the construction of intermittent gears 470 and 162 shafts 430 and 20 will not be moved in synchronism but the latter will be intermittently moved. However, shaft 430 will be brought to rest after a complete rotation at substantially the same time that shaft 20 has been rotated through a complete revolution.

It will be remembered that also supported in reel 375 on shaft 476 are a series of item type carriers 377, a clerk's type carrier 378, and a transaction type carrier 379. The item type carriers 377 are adjusted by movement of gears 275 which in turn are actuated by the differential segments 242 for the amount keys. The clerk's type carrier 378 is adjusted by a gear 287 which received its movement from the clerk's differential segment 242. The transaction type carrier 379 is adjusted by a gear 304 which is actuated by the differential segment 242 from the transaction differential bank of keys.

It will be noted that gears 287 and 304 have diameters slightly less than those of the gears 275. Gears 287 and 304 are constructed in this manner so as not to interfere with the totalizer elements on shafts 396 to the left of those engaged by the actuating gears 275. These additional totalizer elements are provided to receive amounts transferred thereto from the lower order wheels.

The type carriers 377, 378 and 379 and the consecutive counter 380 are normally positioned beneath a platen 493 which effects printing impressions therefrom upon a record strip.

The printer associated with the detail strip is shown particularly in Figs. 74, 75, 76, and 80, wherein it will be seen that the record strip is trained from the supply roll 491 over the compression roll 492, around the platen 493, over the table 494, sleeve 495, and rod 498 to the receiving or storage roll 500. The paper shifting and feeding mechanism shifts the record strip from normal position to bring a definite portion thereof in line to be printed upon. The platen 493 is then operated to effect the impression on the record strip, which is then shifted to normal position and advanced one step, so that a fresh portion thereof will be brought over the type carriers when the paper is again shifted.

The mechanism for shifting and feeding the record strip comprises the pair of members 535 and 536, each carrying a rack 539. Each of these racks meshes with a pinion 540 fixed to the shaft 541. As shown in Fig. 81, the member 55 carries the rack 542 which is normally disengaged from the pinion 543 on the platen shaft 503. The rack 544 normally engages the pinion 543 on the shaft 503. When the slidable members 535 and 536 are moved forwardly by the arm 579, due to the friction between the pressure roll and the platen, the latter will be held stationary until the rack 543 has been moved sufficiently to bring the stud 546 to the end of the slot 549 in the rack 544, which distance is equal to approximately the width of one tooth space. The racks 542 and 544 then move in unison to rotate the pinion 543 and the platen 493. The latter, by its engagement with the roll 492, shifts the paper from the writing position to the printing position, after which the platen is rotated in the reverse direction to shift the paper in the reverse direction.

By referring to Fig. 81 it can be seen that during the forward movement of the racks 542 and 544 the latter will soon move out of mesh with the pinion 543 and the spring 547 will then extend racks 542 and 544, thus leaving a space between them, so that upon return movement thereof the first tooth on the rack 544 engages the second tooth of the pinion 543 from that engaged by the last tooth of the rack 542. Therefore, the platen 543 is rotated a greater distance in reverse direction than it was driven by the forward movement of these racks, and consequently a slight amount of paper is drawn off the supply roll 491. During the forward movement of the members 535 and 536, the arm 529 is rocked counterclockwise (Fig. 83) and brings the pawl 553 into engagement with the next tooth of the ratchet 527. Upon return movement of the member 536, the arm 529 is rocked clockwise, whereupon the pawl 527 and ratchet 526 rotate the storage roll 500 to wind thereon the amount of paper paid off from the supply roll 491.

In the illustrated machine there are six cash drawers 834, as shown in Fig. 101. These drawers are selected by a finger shaft 821 which is adapted to be adjusted to any one of six positions of adjustment by the differential segment 242, associated with the clerk's bank of keys. As shown in Figs. 2 and 3, the transmission shaft 268 associated with the clerk's differential 242 has fixed thereto a pinion 291 which meshes with a gear 292 loosely mounted on shaft 264.

This gear has fixed thereto a segmental gear 293 which meshes with a gear 294. Referring to Figs. 86 and 90, it will be seen that gear 294 is fixed to a cup shaped disc 805 which is loosely mounted on a sleeve 802. Gear 294 meshes with an idler gear 816 which in turn meshes with a gear 817 fixed to a shaft 818 journaled in intermediate supporting frames 13 and 14. Also fixed to shaft 818 is a beveled gear 819 which meshes with a beveled gear 820 fixed to the upper end of a shaft 821'.

This shaft by a suitable clutch mechanism described hereinbefore is adapted to impart rotary movement to finger shaft 821. As shown in Figs. 101 and 105, finger shaft 821 has fixed thereto a series of collars 840. Each collar has formed thereon a finger 841 which is adapted to be moved beneath the inner end of a lever 842 associated with a related latch lever 845, which in turn is adapted to engage in a notch 846' provided in a drawer catch 846 fixed to the related drawer 834.

From the construction of the parts just described, it is seen that when the A-key is depressed and the machine is then operated, the differential segment 242 will be moved downwardly until stopped by the A-key. This motion is transmitted through shaft 268 through gears 292, 294, 816 and 817 to beveled gears 819 and 820 which will position shaft 821 to bring the first finger thereon beneath the inner end of a related lever 842.

Later during the operation of the machine, finger shaft 821 will be elevated by cam 825, which through the connections shown in Fig. 86 is adapted to rock arm 830 to elevate shaft 821, with the result that latch lever 845 will be rocked upwardly, thereby releasing the lower end thereof from notch 846' provided in drawer catch 846, and the usual spring will then urge the A-drawer to exposed position.

When the control lever is in open drawer position, it will be remembered that the enlarged concentric position 851 of plate 186 still engages the stud 854 provided on arm 853 (Fig. 104) thereby holding the ear 857 thereon out of engagement with finger 859 extending from pitman 181. Therefore, it is seen that the machine may be operated without first closing the drawer.

When the control lever is in closed drawer position, it will be remembered, the enlarged portion of 851 will be moved out of engagement with stud 854 provided on arm 853 so that when a cash drawer is open, ear 857 will be moved over finger 859 of pitman 181, and the machine will be locked against operation until ear 857 is moved out of engagement with finger 859 by the cam 1882 provided at the end of catch 846, through the series of connections shown in Fig. 104.

When the A-key is depressed, together with the keys previously mentioned, the A-drawer will be selected for operation during the downward movement of the differential segments 242, at which time the totalizers and counters are also selected for operation and the actuators therefor positioned according to the amount set up on the keyboard. During the latter part of an operation of the machine, the selected drawer will be released and projected to exposed position.

In total printing operations it will be recalled that it is necessary to rotate the totalizer reel 375 to bring the desired totalizer into position to effect either total or sub-total printing therefrom. First the control lever 180 is moved to either sub-total or total position, depending upon whether a sub-total or a total is wanted, after which the totalizer reel is moved by means of the thumb wheel 721 to bring the desired totalizer opposite the platen 493, after which the machine is released by depression of the motor bar 43, and the platen 493, by the mechanism shown in Fig. 63, is moved against the selected totalizer 377 to print either the total or the sub-total therefrom.

To prevent movement of the reel 375 during the taking of either a sub-total or a total from a selected totalizer therein, or to prevent operation of the machine when a totalizer has not been properly brought into its printing position, the bell crank lever 790 (Figs. 61, 62 and 69) is adapted to engage any one of a plurality of notches 794 in the discs 795 of the sleeve 802.

It will be recalled that the arm 30 (Figs. 4 and 23), which is associated with the motor switch control mechanism, is secured to the shaft 145 and that the arm 796 is also secured to this shaft. The bell crank 790 is adapted to be moved into engagement with this arm 796 and therefore it is obvious that when the reel is rotated and the arm 792 of the lever 790 rests upon the high portion between the notches of the disc 795, the lever 790 will be rocked clockwise, thus bringing its lower end over the arm 796 and preventing operation of the shaft 145, which is necessary to release the machine.

From the above it also follows that when the machine is released for operation and the shaft 145 is rocked counter-clockwise, the arm 796 will be brought into engagement with the arm 798, thus preventing rotation of the reel, this mechanism forming an effective interlock to prevent misoperation of the associated parts.

The control mechanism, or single lock control, has been described in full detail near the end of this specification and it is therefore felt that it is not necessary to give any further discussion in connection with this mechanism at this time.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of cash drawers; a plurality of keys; a differentially movable actuator common to all of said keys and controlled as to the extent of movement by said keys; a plurality of latches, one for each drawer; drawer selecting means including a differentially movable member carrying a series of projections, one for each of said latches; means to operate the selecting means by the actuator to position the member to select a drawer for operation; a movable totalizer reel; means for moving the reel; a series of printing totalizers mounted in said reel, one for each cash drawer, the total standing on each of said totalizers representing the cash contained in its related cash drawer; means to operate the selecting means by the reel moving means so that upon movement of said reel to select a totalizer for a printing operation, said differentially movable member will also be adjusted a corresponding amount to select a drawer corresponding to the selected totalizer; and a control means for selectively controlling the operation of the selecting means by the differentially movable actuator or by the reel moving means.

2. In a machine of the class described, a plurality of selecting keys; a differentially movable actuator common to all of said keys, the extent of movement thereof being controlled by said keys; a drawer selecting mechanism; a normally stationary totalizer reel; a plurality of printing totalizers mounted therein; means for rotating said reel to bring the totalizers to printing position; a control means; and means controlled thereby for selectively connecting the drawer selecting mechanism for operation by the actuator or by the means for rotating the reel.

3. In a machine of the class described, the combination of a plurality of cash drawers; selecting mechanism for said drawers; a plurality of keys; a differentially movable actuator controlled by said keys; a normally stationary totalizer reel; means for rotating said reel; means selecting operable to operate the drawer selecting means by the differentially movable actuator or by said mechanism for rotating the totalizer reel; and control means for controlling the operation of the selectively operable means for selectively determining which of the operating means will be effective to operate the drawer selecting mechanism.

4. In a machine of the class described, the combination of a plurality of keys; a differentially movable member, the extent of movement thereof being controlled by said keys; a finger shaft; means for adjusting said finger shaft by said differentially movable actuator; a totalizer reel; means for rotating said reel; means for adjusting said finger shaft by said reel rotating means; a control means; and means controlled by the control means for simultaneously preventing the adjustment of the finger shaft by one of said adjusting means and for enabling the positioning of said finger shaft by the other of said adjusting means.

5. In a machine of the class described, the combination of a plurality of cash drawers; a plurality of latches one for each drawer; cash drawer selecting means including a differentially adjustable member having a plurality of projections thereon, one for each drawer latch; a bank of keys; a differentially movable actuator controlled by said keys; means operated by said differentially movable actuator for adjusting the cash drawer selecting means; a control member; a normally stationary totalizer reel; means for rotating said reel; a clutch provided between said cash drawer selecting means and said means for rotating said reel; and means operated by said control member for effecting a driving connection between said means for rotating said reel and said cash drawer selecting means and for disabling the control of said cash drawer selecting means by the differential member.

6. In a machine of the class described, the combination of a plurality of cash drawers; a plurality of latches one for each drawer; a differentially movable member having a plurality of projections thereon one for each drawer latch; a plurality of clerks' keys; a differentially movable actuator controlled by said keys; means for moving said member upon movement of said actuator to bring one of the projections thereof into cooperative relationship with respect to its associated latch lever; means for lifting said shaft to release the selected drawer for operation; and a plurality of drawer catches one for each drawer; said latch being operated by said drawer catch upon movement of the drawer to closed position and operable to elevate said shaft.

7. In a machine of the class described, a cash drawer; a drawer catch provided thereon; a latch lever cooperating with said catch to retain the drawer in closed position; a second lever adjacent said latch lever; a differentially movable member having a projection thereon; means for moving said member to bring said projection beneath said second mentioned lever; means provided on said first mentioned lever adapted to be engaged by said second mentioned lever; and means for actuating said member to rock said levers and thereby release the cash drawer for operation.

8. In a machine of the class described, a plurality of cash drawers; a plurality of keys; a differentially movable actuator controlled by said keys; means operated by said actuator for selecting any one of said drawers; means for actuating said first mentioned means to release the selected drawer; additional means for actuating said first-mentioned means to select a drawer; and means to selectively determine whether the differentially movable actuator or the additional means will operate the drawer selecting means.

9. In a machine of the class described, the combination of a control member movable to a plurality of positions of adjustment; a cash drawer having a catch provided thereon; a latch lever cooperating with said catch to retain the drawer in closed position; a second lever adjacent said latch lever; a differentially movable member having means thereon adapted to cooperate wtih said second mentioned lever to actuate the said levers to release said drawer for operation; a latch to lock the machine against operation whenever the drawer is open and the control member is in a certain one of its positions of adjustment; means to shift the latch to locking and unlocking position; means provided on said differentially movable member for actuating the latch shifting means to shift the latch to lock the machine against operation; and means actuated by said drawer catch through said latch lever and said differentially movable member for operating said latch shifting means to shift said last mentioned latch to unlatching position to permit operation of the machine.

10. In a machine of the class described, the combination of a control member movable to a plurality of positions of adjustment; a main operating mechanism; a cash drawer; a latch for retaining said drawer in closed position; a drawer catch engaged by said latch; a shaft having a projection thereon adapted to release said latch; locking means being effective to lock said main operating mechanism against operation when said drawer is opened and said control lever is in one of its positions of adjustment; and means operated by said drawer catch through said latch and shaft for moving said locking means to ineffective position when said drawer is moved to closed position.

11. In a machine of the class described, the combination of a main operating mechanism; a control member movable to a plurality of positions of adjustment; a plurality of drawers; a latch for each drawer; a drawer catch fixed to each drawer cooperating with a related latch member for retaining said drawers in closed position; a shaft provided with a plurality of projections thereon one for each drawer latch; means for adjusting said shaft to select any one of said drawers for operation; means for operating the shaft to release the selected drawer latch; means for locking said main operating mechanism against operation when any one of said drawers is opened and said control member occupies one of its positions of adjustment; and means including the latches and the shaft operated by the drawer catches for moving said locking means to unlocking position to release said main operating mechanism for operation when said drawer is moved to closed position.

12. In a machine of the class described, the combination of a main operating mechanism; a drawer; a latch therefor; means provided on said drawer cooperating with said latch to retain said drawer in closed position; means operated by said main operating mechanism for releasing said drawer; means for projecting said drawer to open position; means for locking said main operating mechanism against operation when said drawer is open; and means operated by the means provided on said drawer engaging said latch and operable through the means operated by the main operating means to release the locking means to allow said main operating mechanism to be released for operation after said drawer is moved to closed position.

13. In a machine of the class described, the combination of a main operating mechanism; a drawer; a latch therefor; a drawer catch cooperating with said latch to retain said drawer in closed position; a differentially movable member; a rockable member provided with means cooperating with said differentially movable member, said rockable member being also provided with means for locking said main operating mechanism against operation when said differentially movable member is adjusted to certain positions and when said drawer is in open position; and means operated by said drawer catch through said latch for actuating said rockable member to release said main operating mechanism for operation when said drawer is moved to closed position.

14. In a machine of the class described, the combination of a main operating mechanism; a drawer; a latch therefor; a catch provided on said drawer cooperating with said latch to retain said drawer in closed position; a shaft; a projection on said shaft for releasing said latch upon operation of the machine to release said drawer; a lever; a rockable member for locking said operating mechanism against operation when said drawer is opened; and additional means provided on said shaft, a portion of said additional means engaging said lever to effect locking of said main operating mechanism by said rockable member when the drawer is released; said drawer catch engaging said latch to actuate said shaft to cause another portion of said additional means thereon to restore said lever to normal position thereby moving said locking means to ineffective position to release said main operating mechanism for operation when said drawer is moved to closed position.

15. In a machine of the class described, the combination of a main operating mechanism; a plurality of drawers; a latch for each drawer; a catch provided on each drawer cooperating with a related latch to retain its drawer in closed position; a shaft provided with means for selecting any one of the drawers for operation; a rockable member for locking said main operating mechanism against operation when a drawer is open; means for moving the rockable member to locking and unlocking position; means provided on said shaft for actuating said means for moving the rockable member to move the rockable member to locking position; and additional means on the shaft and actuated by said drawer catch through said latch and shaft for actuating said moving means to restore said rockable member to unlocking position to release said operating mechanism for operation when said drawer is moved to closed position.

16. In a machine of the class described, a main operating mechanism; a rockable member for locking said main operating mechanism against operation; a cash drawer; a latch therefor; a drawer catch provided on said drawer cooperating with said latch to retain said drawer in closed position; a shaft; means provided on said shaft for releasing said latch upon operation of said main operating mechanism; a lever; a cam provided on said lever; means provided on said shaft for engaging said lever to cause said cam to rock said rockable locking member to lock said main operating mechanism against operation when said shaft is elevated to release said drawer; a pawl pivoted on said lever, said pawl being so constructed as to permit said shaft to be moved to normal position without effecting any movement of said lever; and additional means on the shaft operated by said drawer catch through the latch and shaft, to engage said pawl to rock said lever to normal position, thereby rocking said rockable locking member to ineffective position to release said main operating mechanism for operation when said drawer is moved to closed position.

17. In a machine of the class described, the combination of a plurality of selecting keys; a differentially movable actuator common to all of said keys, the extent of movement of said actuator being controlled by said keys; a plurality of cash drawers, a latch for each drawer; a drawer selecting mechanism; a normally stationary reel; totalizer selecting means carried by said reel; a plurality of printing totalizers mounted therein; a printing mechanism; means operable by the actuator in item entering operations for simultaneously actuating the totalizer selecting means and the drawer selecting means to cause the selection of a totalizer for operation and also a drawer for operation; means for rotating said reel to select a totalizer for a printing operation; means operated by the reel rotating means to actuate said drawer selecting mechanism to select a drawer corresponding to the selected totalizer; a mode of operation lever settable to a plurality of positions; and means operated by said lever for selectively controlling the operation of the drawer selecting mechanism by the key controlled differential actuator or by the reel rotating means.

18. In a machine of the class described, the combination of a plurality of cash drawers; a drawer selecting mechanism; a plurality of keys; differential mechanism controlled by said keys; a rotatable totalizer reel; reel rotating means; and means for selectively connecting the drawer selecting mechanism to either the means controlled by the keys or the means for rotating the reel for operation thereby.

CHARLES W. GREEN.